(12) United States Patent
Katz et al.

(10) Patent No.: US 9,441,072 B2
(45) Date of Patent: Sep. 13, 2016

(54) METAL COLLOIDS WITH ACCESSIBLE METAL SURFACES

(75) Inventors: Alexander Katz, El Sobrante, CA (US); Namal De Silva, Wilmington, DE (US); Andrew Solovyov, Berkeley, CA (US); Jeong-Myeong Ha, Seoul (KR)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 785 days.

(21) Appl. No.: 13/505,977

(22) PCT Filed: Nov. 5, 2010

(86) PCT No.: PCT/US2010/055686
§ 371 (c)(1),
(2), (4) Date: Aug. 16, 2012

(87) PCT Pub. No.: WO2011/057109
PCT Pub. Date: May 12, 2011

(65) Prior Publication Data
US 2012/0316347 A1    Dec. 13, 2012

Related U.S. Application Data

(60) Provisional application No. 61/258,814, filed on Nov. 6, 2009.

(51) Int. Cl.
| | | |
|---|---|---|
| C08G 61/02 | (2006.01) | |
| B01J 31/24 | (2006.01) | |
| B01J 31/06 | (2006.01) | |
| B01J 31/16 | (2006.01) | |
| B01J 31/18 | (2006.01) | |

(52) U.S. Cl.
CPC .............. *C08G 61/02* (2013.01); *B01J 31/066* (2013.01); *B01J 31/1625* (2013.01); *B01J 31/1683* (2013.01); *B01J 31/1875* (2013.01); *B01J 31/24* (2013.01); *B01J 31/2409* (2013.01); *B01J 2231/641* (2013.01); *B01J 2231/70* (2013.01); *B01J 2531/0211* (2013.01); *B01J 2531/0288* (2013.01); *B01J 2531/18* (2013.01); *B01J 2540/10* (2013.01); *B01J 2540/66* (2013.01); *C08G 2261/226* (2013.01); *C08G 2261/3424* (2013.01)

(58) Field of Classification Search
CPC   B01J 31/2409; B01J 31/066; B01J 31/1625; B01J 31/24; B01J 31/1683; B01J 31/1875; C08G 61/02
USPC ....... 556/1, 21; 548/591, 101; 420/392, 591; 75/392, 414
See application file for complete search history.

(56) References Cited

U.S. PATENT DOCUMENTS

| | | |
|---|---|---|
| 5,763,731 A | 6/1998 | McVicker et al. |
| 6,380,266 B1 | 4/2002 | Katz et al. |
| 2005/0255332 A1 | 11/2005 | Katz et al. |

FOREIGN PATENT DOCUMENTS

JP    2013-508145    3/2013

OTHER PUBLICATIONS

Alexeev, O. et al., "Iridium Clusters Supported on γ-Al2O3: Structural Characterization and Catalysis of Toluene Hydrogenation", *Journal of Catalysis*, 176(2) 310-320 (1998).
Alexeev, O. et al., "Partially Decarbonylated Tetrairidium Clusters on MgO: Structural Characterization and Catalysis of Toluene Hydrogenation", *J. Mol. Catal.*, 162, 67-82 (2000).
Argo, A.M. et al., "Observation of ligand effects during alkene hydrogenation catalysed by supported metal clusters", *Nature*, 415, 623-626 (2002).
Bäumer, M. et al., "On the role of oxygen in stabilizing low-coordinated Au atoms", *Chem. Phys. Chem.*, 7, 1906-1908 (2006).
Becerril, H.A. et al., "DNA-templated nanofabrication", *Chem. Soc. Rev.*, 38, 329-337 (2009).
Bjørnholm, T. et al., "Directed Assembly of Gold Nanoparticles", *Current Opinion in Colloids and Interface Science*, 14, 126-134 (2009).
Böhmer, V., "Calixarenes, Macrocycles with (Almost) Unlimited Possibilities", *Angew. Chem. Int. Ed. Engl.* 34:713 (1995).
Bond, G.C. et al., "Hydrogenation over supported gold catalysts", *J. Chem. Soc. Chem. Commun.*, 44-45 (1973).
Byrne, M., "Electrocatalytic reduction of ethylene on gold and other substrates", *J. Chem. Soc. Faraday Transactions I*, 68, 1898 (1972).
Corma, A., et al., "Gold Nanoparticles in Organic Capsules: A Supramolecular Assembly of Gold Nanoparticles and Cucurbituril", *Chemistry—A European Journal*, 13 (22), 6359-6364 (2007).
Choudhary, T.V. et al., "Oxidation catalysis by supported gold nano-clusters", *Top. Catal.*, 21, 25-34 (2002).
Crooks et al., "Dendrimer-Encapsulated Metal Nanoparticles: Synthesis, Characterization, and Applications to Catalysis", *Accounts of Chemical Research*, 34(3) 181-190 (2001).

(Continued)

*Primary Examiner* — Porfirio Nazario Gonzalez
(74) *Attorney, Agent, or Firm* — Morgan, Lewis & Bockius LLP; Jeffry S. Mann

(57) ABSTRACT

The invention provides complexes in which ligands (e.g., calixarene-related compounds) are coordinated to a metal colloid, e.g. a gold colloid. In exemplary embodiments, two or more ligands complexed to the metal colloid are larger than the metal colloid, thus providing an accessible metal center. The complexes can be immobilized on a substrate. The complexes of the invention are useful as tunable and highly robust isolated metal colloids that find use in binding of molecules and catalysis of chemical reactions.

55 Claims, 27 Drawing Sheets

(56) References Cited

OTHER PUBLICATIONS

Csok, Z. et al., "Carobonylation (hydroformylation and hydrocarbalkoxylation) reactions in the presence of transition metal: p-tert-butyl-calix[4]arene-based phosphine and phophinite systems", *Journal of Organometallic Chemistry*, 570: 23-29 (1998).
Denicourt-Nowicki, A. et al., "Methylated cyclodextrins: an efficient protective agent in water for zerovalent ruthenium nanoparticles and a supramolecular shuttle in alkene and rene hydrogenation reactions", *Dalton Transactions*, 48, 5714-5719 (2007).
Denicourt-Nowicki, A. et al., "Carbon-Supported Ruthenium Nanoparticles Stabilized by Methylated Cyclodextrins: A New Family of Heterogeneous Catalysts for the Gas-Phase Hydrogenation of Arenes", *Chemistry—A European Journal*, 14: 8090-8093 (2008).
De Silva et al., "Patterned Metal Polygedra Using Calixarnenes as Organizational Scaffolds: $Ir_4$-based Cluster Assemblies", Dalton Transacionts, 39(9), 2194-2197 (2010).
Deutsch, S.E. et al., "Near Absence of Support Effects in Toluene Hydrogenation Catalyzed by MgO-Supported Iridium Clusters", *Journal of Catalysis*, 170(1) 161-167 (1997).
Dieleman, C.B. et al., "Facile Synthetic Route to Cone-shaped Phosphorylated [CH2P(O)Ph2] Calix[4]arenes", *Journal of the Chemical Society, Dalton Transactions: Inorganic Chemistry*, 18, 3097-3100 (1995).
Dieleman, C.B. et al., "Arranging phosphoryl ligands on a calixarene platform", *Journal of Organometallic Chemistry*, vols. 545-546, pp. 461-473 (1997).
Dijkstra, P.J. et al., "Kinetically stable complexes of alkali cations with rigidified calix[4]arenes: synthesis, x-ray structures, and complexation of calixcrowns and calixspherands", *J. Am. Chem. Soc.*, 111: 7567-7575 (1989).
Fischer, R. et al., "Pd@MOF-5: limitations of gas-phase infiltration and solution impregnation of $[Zn_4O(bdc)_3]$ (MOF-5) with metal-organic palladium precursors for loading with Pd nanoparticles", *J. Materials Chem.*, 19: 1314-1319 (2009).
Friend, C.M. et al., "Effects of chlorine and oxygen coverage on the structure of the Au(111) surface", The Journal of Chemical Physics, 130, 3232-3238 (2009).
Gates, B.C. et al., "Faujasite-Supported $Ir_4$ Clusters: A Density Functional Model Study of Metal-Zeolite Interactions", *J. Phys. Chem. B*, 103: 5311-5319 (1999).
Gates, B.C. et al., "Xe NMR Spectroscopy of Metal Carbonyl Clusters and Metal Clusters in Zeolite NaY", *J. Am. Chem. Soc.*, 121: 7674-7681 (1999).
Gates, B.C. et al., "Metal Carbonyl Cluster Synthesis in Nanocages: Spectroscopic Evidence of Intermediates in the Formation of $Ir_4(CO)_{12}$ in Zeolite NaY", *J. Phys. Chem. B*, 108: 11259-11264 (2004).
Gates, B.C. et al., "Size-Dependent Catalytic Activity of Zeolite-Supported Iridium Clusters", *J. Phys. Chem. C*, 111, 262-267 (2007).
Giannini, L. et al., "Organometallic Reactivity on a Calix[4]arene Oxo Surface. Synthesis and Rearrangement of Zr—C Functionalities Anchored to a Calix[4]arene Moiety", *J. Am. Chem. Soc.*, 119, 9198 (1997).
Giannini, L. et al., "Olefin Rearrangements Assisted by a Molecular Metal-Oxo Surface: The Chemistry of Calix[4]arene Tungsten(IV)", *J. Am. Chem. Soc.*, 121: 2797-2807 (1999).
Goodman, W. et al., "Catalytically active gold: From colloids to ultrathin films", *Acc. Chem. Res.*, 39, 739-746 (2006).
Gopidas, K.R. et al., "Nanoparticle-Cored Dendrimers: Synthesis and Characterization", *J. Am. Chem. Soc.*, 125, 6491-6502 (2003).
Gutsche, C.D. et al., "Calixarenes 9: Conformational isomers of the eters and esters of calix[4]arenes", *Tetrahedron*, 39(3), 409-426 (1983).
Haratua, A. et al., "When gold is not noble: Catalysis by nanoparticles", *Chemical Record*, 3, 75-87 (2003).

Hughes, M.D. et al., Tunable gold catalysts for selective hydrocarbon oxidation under mild conditions, *Nature*, 437, 1132-1135 (2005).
Iwamoto, K. et al., "Remarkable metal template effects on selective synthesis of p-t-butylcalix[4]arene conformers", *Tetrahedron Letters*, 31: 7169-7172 (1990).
Katz, A. et al., "Grafted Metallocalixarenes as Single-Site Surface Organometallic Catalysts", *J. Am. Chem. Soc.*, 126:16478-16486 (2004).
Katz, A. et al., "Energetics of Small Molecule and Water Complexation in Hydrophobic Calixarene Cavities", 22:4004-4014 (2006).
Katz, A. et al., "The Role of Outer-Sphere Surface Acidity in Alkene Epoxidation Catalyzed by Calixarene-Ti(IV) Complexes", *J. Am. Chem. Soc.*, 129: 15585-15595 (2007).
Katz, A. et al..., "Structural Assessment and Catalytic Consequences of the Oxygen Coordination Environment in Grated Ti-Calixarenes", *J. Am. Chem. Soc.*, 129: 1122-1131 (2007).
Katz, A. et al., "Vanadocalixarenes on Silica: Requirements for Permanent Anchoring and Electronic Communication", *Chemistry of Materials*, 21: 1852-1860 (2009).
Lee, S. et al., "Selective Propene Epoxidation on Immobilized Au6-10 Clusters: The Effect of Hydrogen and Water on Activity and Selectivity", *Agnew. Chem. Int. Ed.*, 48, 1467-1471 (2009).
Li H.Y. et al., "Nanofabrication by DNA self-assembly", *Mater. Today*, 12, 24-32 (2009).
Mallouk, T. et al., "Chemistry at the Nano-Bio Interface", *Journal of Org. Chem.*, 131, 7937-7939 (2009).
Maloney, S.B. et al., "A Well-Defined Supported Metal Catalysts: $Ir_4$/MgO", *Catal. Lett.*, 5, 161-168 (1990).
Marmor, R. et al., "Synthesis of hydroxymethyl(diphenyl)phosphine oxide and substituted .alpa.-hydroxybenzyl(diphenyl)phosphine oxides", *The Journal of Organic Chemistry*, 34(3), 748-749 (1969).
Naito, S. et al., "Mechanism of deuterium addition and exchange of propene over silica-supported gold and silver catalysts", *J. Chem. Soc. Faraday Transactions I*, 84, 4115-4124 (1988).
Neri et al., "Study on the Alkylation of p-tert-Butycalix[8]arene, Partially O-Alkylated Calix[8]arenes", *The Journal of Organic Chemistry*, 59: 3880-3889 (1994).
Nowicki, A. et al., "Supramolecular shuttle and protective agent: a multiple role of methylated cyclodextrins in the chemoselective hydrogenation of benzene derivatives with ruthenium nanoparticles", *Chem. Commun.*, 296-298 (2006).
Ozerov, O. et al., "Highly Regioselective [2+2+2] Cycloaddition of Terminal Alkynes Catalyzed by $\eta^6$-Arene Complexes of Titanium Supported by Dimethylsilyl-Bridged p-tert-Butyl Calix[4]arene Ligand", *J. Am. Chem. Soc.*, 122:6423-6431 (2000).
Patra, C.R., et al., "Application of gold colloids for targeted therapy in cancer", *Journsl of Biomedical Nanotechnology.*, 4, 99-132 (2008).
Riviere, C. et al., "Nanosystems for medical applications: Biological detection, drug delivery, diagnosis and therapy", *Annales de Chimie-science des Materiaux*, 31, 351-367 (2006).
Roldán, A. et al., "Critical Size for O-2 Dissociation by Au Colloids", *Chem. Phys. Chem.*, 10, 348 (2009).
Scodeller, P., et al., "Wired-Enzyme Core-Shell Au Colloid Biosensor", *J. Am. Chem. Soc.*, 12690-12697 (2008).
Sermon, P.A. et al., "Hydrogenation of alkenes over supported gold", *J. Chem. Soc. Faraday Transactions I*, 75, 385-394 (1979).
Somorjai, G. et al., "Lithographic Fabrication of Model Systems in Heterogeneous Catalysis and Surface Science Studies", *Langmuir*, 14(6), 1458-1464 (1998).
Sylvestre, J. et al., "Stabilization and Size Control of Gold Nanoparticles during Laser Ablation in Aqueous Cyclodextrins", *Journal of the American Chemical Society*, 126, 7176-7177 (2004).
Triantafillou, N.D. et al., "Magnesia-Supported Tetrairidium Clusters Derived from $[Ir_4(CO)_{12}]$", *J. Phys. Chem.*, 98, 8431-8441 (1994).
Turner, M. et al., "Selective oxidation with dioxygen by gold colloid catalysts derived from 55-atom clusters", *Nature*, 454, 981-U31 (2008).

(56) References Cited

OTHER PUBLICATIONS

Van Son, F.B.M. et al., "Structure and nature of the metal-support interface: characterization of iridium clusters on magnesium oxide by extended x-ray absorption fine structure spectroscopy", *Journal of the American Chemical Society*, 115, 10317-10326 (1993).
Vicens J. et al., "Synthesis of mono-, di- and tetra-alkyne functionalized calix[4]arenes: reactions of these multipodal ligands with dicobalt octacarbonyl to give complexes which contain up to eight cobalt atoms", *Dalton Transactions*, 2999-3008 (2009).
Vuori, H. et al., "Beta Zeolite-Supported Iridium Catalysts by Gas Phase Deposition", *Catalysis Letters*, 131:7-15 (2009).
Wang, G.L. et al., "DNA binding of an ethidium intercalcator attached to a monolayer-protected gold cluster", *Anal. Chem.*, 17, 4320-4327 (2002).
Wang, L.H. et al., "Gold colloid-based optical probes for target-responsive DNA structures", *Gold. Bull.*, 41, 37-41 (2008).
Watson et al., "Diphosphine ligand chelation and bridging and regiospecific ortho metalation in the reaction of 4,5-bis(diphenylphosphino)-4-cyclopenten-1,3-dione (bpcd) with $Ir_4(CO)_{12}$: X-ray diffraction structures of $Ir_4(CO)_7(\mu-CO)_3(bpcd)$, $Ir_4(CO)_5(\mu-CO)_3(bpcd)(\mu-bpcd)$, and $HIr_4(CO)_4(\mu-CO)_3(bpcd)[\mu-PhP(C_6H_4)C=$<img border="0"alt="double bond; length as m-dash" src="http://origin-cdn.els-cdn.com/sd/entities/dbnd"class="glyphImg">$C(PPh_2)C(O)CH_2C(O)]$", *Journal of Organometallic Chemistry*, 693, 1439-1448 (2008).
Wei, A. et al., "Prenucleation and coalescence of cobalt nanoclusters mediated by multivalent calixarene complexes", *Chemical Communications*, 4254-4256 (2009).
Wegener, W., "Zur Darstellung der Sulfonsäureester von Hydroxymethylphosphorylverbindungen", *Zeitschrift für Chemie*, 11: 262 (1971).
Xu,Z . et al., "Size-dependent catalytic activity of supported metal clusters", *Nature*, 372: 346-348 (1994).
Young, K. et al, "Experimental realization of catalytic $CH_4$ hydroxylation predicted for an iridium NNC pincer complex, demonstrating thermal, protic, and oxidant stability", *Chem. Commun.*, 3270-3272 (2009).
Zhao, W., et al., "DNA Aptamer Folding on Gold Colloids: From Colloid Chemistry to Biosensors", *J. Am. Chem. Soc.*, 130, 3610-3618 (2008).
Zhang, Q. et al., "Effect of Ph on the Interaction of Gold Nanoparticles with DNA and Application in the Detection of Human p53 Gene Mutation", *Nanoscale Research Letters*, 4: 216-220 (2009).
Chen, M. et al., "Phase transition of silver nanoparticles from aqueous solution to chloroform with the help of inclusion complexes of *p*-sulfonated calix[4]arene and alkanethiol molecules and its application in the sie sorting of nanoparticles", *Nanotechnology*, 18, 1-7 (2007).
De Silva, N. et al., "A bioinspired approach for controlling accessibility in calix[4]arene-bound metal cluster catalysts", *Nature Chemisty*, 2, 1062-1068 (2010).
Ha, J-M. et al., "Accessibility in Calix[8]arene-Bound Gold Nanoparticles: Crucial Role of Induced-Fit Binding", *J. Phys. Chem.*, 114, 16060-16070 (2010).
Liu, W. et al., "Size-controlled gold nanocolloids on polymer microsphere-stabilizer via interaction between functional groups and gold nanocolloids", *Journal of Colloid and Interface Science*, 313, 494-502 (2007).
Astruc (Ed) et al., "Gold Nanoparticles-catalyzed Oxidations in Organic Chemistry", *Nanoparticles and Catalysts*, Chapter 13, pp. 438-439 (2008).
Chetcuti et al., "Synthesis of mono-, di- and tetra-alkyne functionalized calix[4]arenes: Reactions of these multipodal ligands with dicobalt octacarbonyl to give complexes which contain up to eight cobalt atoms", *Dalton Transactions*, Issue 16, pp. 2999-3008 (2009).

Gates, "Supported Metal Clusters: Synthesis, Structure, and Catalysis", *Chemical Reviews*, vol. 95, No. 3, pp. 51-522 (1995).
Ha et al., "Postsynthetic Modification of Gold Nanoparticles with Calix[4]arene Enantiomers: Origin of Chiral Surface Plasmon Resonance", *Langmiur* 25(1), pp. 153-158 (2009).
Ha et al., "Mercaptocalixarene-Capped Gold Nanoparticles via Postsynthetic Modification and Direct Synthesis: Effect of Calixarene Cavity-Metal Interactions", *J. Phys. Chem. C*, vol. 113, No. 4, pp. 1137-1142 (2009).
Ha et al., "Synthesis and Characterization of Accessible Metal Surfaces in Calixarene-Bound Gold Nanoparticles", *Langmuir*, vol. 25, No. 8, pp. 10548-10553 (2009).
Wei et al., "Calixerene-Encapsulated Nanoparticles: Self-Assembly Into Functional Nanomaterials", *Chemical Communications*, Issue 15, pp. 1581-1591 (2006).
Bagatin, I. and Matt, D., "Calix[4] arene Ligands with Phosphorus-Containing Groups Tethered at the Upper Rim" *Inorg. Chem.*, vol. 38, pp. 1585-1591 (1999).
Danil de Namor, A. et al., Reaction of tetrakis[(3-pyridylmethyl)oxy] *p-tert*-butycalix(4)arene with $KAuCl_4$ and $K_2PtCl_6$. New pyridinocalix(4)arene adducts of gold(III) and platinum(IV) *Polyhedron*, vol. 16, No. 11, pp. 1885-1888 (1997).
Fahlbusch, T. et al., "N-Heterocyclic Carbene Complexes of Mercury, Silver, Iridium, Platinum, Ruthenium, and Palladium Based on the Calix[4]arene Skeleton" *Organometallics*, vol. 28, pp. 6183-6193 (2009).
He, X. et al., "Design and Syntheis of Calixarene-Based Bis-alkynyl-Bridged Dinuclear Au Isonitrile Complexes as Luminescent Ion Probes by the Modulation of Au—Au Interactions" *Chem. Eur. J.*, vol. 15, pp. 8842-8851 (2009).
Ishii, Y. et al., "Site-selective and stepwise complexation of two M(cod)+(M=Rh, Ir) frag,emts with calix[4]arene" ChemComm, pp. 1150-1151 (2002).
Plourde, F. et al., "Syntheses and Characterization of Upper Rim 1,2- and 1,3-Diphosphinated Calix[4]arenes and Their Corresponding 1,5-Cycloctadienylrhodium(I) Complexes: Comparison of the Catalytic Hydroformylation Properties of Terminal Alkenes" *Organometallics*, vol. 22, pp. 2862-2875 (2003).
Sameni, S. et al., "Calix[4]arene-Phosphine Dimers: Precursors of Flexible Metallo-Capsules and Self-Compacting Molecules" *Chem. Eur. J.*, vol. 15, pp. 10446-10456 (2009).
Staffilani, M. et al., "Anion Binding within the Cavity of π-Metalated Calixarenes" *J. Am. Chem. Soc.*, vol. 119, pp. 6324-6335 (1997).
Wieser-Jeunesse, C. et al., "Directed Positioning of Organometallic Fragments Inside a Calix[4]arene Cavity" Angew. Chem. Int. Ed., vol. 37, No. 20, pp. 2861-2864 (1998).
Xu, W. et al., "Propargyl calix[4]arenes and their complexes and with silver(I) and gold(I)" *Can. J. Chem.*,vol. 74, No. 5, pp. 766-774 (1996).
Chini, P. et al., "New Tetrahedral Cluster Compounds of Iridium. Synthesis of the Anions $[Ir_4(CO)_{11}X]^-$ (X=Cl, Br, I, CN, SCN) and X-Ray Structure of $[PPh_4]$ $[IR_4(CO)_{11}$ $Br]$", *Journal of Organometallic Chemistry*, 152, C35-C38 (1978).
Cotton, F. et al., "Dinuclear $Ti^{IV}$ and $Ti^{iii}$ complexes supported by calix[4]arene ligands. Binding alkali-metal cations inside and outside the cavity of calix[4]arenes", *Inorganic Chimica Acta*, 332, 41-46 (2002).
Liu, Y. et al., "A Noncentrosymmetric 3D Coordination Polymer of Metallocalix[4]arene", *Inorganic Chemistry*, 47, 11514-11518 (2008).
Redshaw, C. et al., "Rhenium Calix[4]arenes: Precursors to Novel Imaging and Cancer Therapy Agents", *Eur. J. Inorg. Chem.*, 2698-2712 (2008).
Webb, H. et al., "Scandium(III) Coordination Polymers Containing Capsules Based on Two *p*-Sulfonatocalix[4]arenes", *Chem. Eur. J.*, 7, No. 16 (2001).

Mass Spectra of 1a-red

(a)

(b)

METAL COLLOIDS WITH ACCESSIBLE METAL SURFACES

CROSS-REFERENCE TO RELATED APPLICATIONS

This application claims under 35 USC 119(e)(1) the benefit of U.S. Application 61/258,814, filed Nov. 6, 2009, which is incorporated by reference in its entirety for all purposes.

TECHNICAL FIELD

This invention relates to metal colloids, more specifically, those formed by a ligand coordinated to a metal colloid through a linker component of the ligand, which includes a coordinating atom coordinated to at least one atom on the colloid. The resulting ligand-bound colloids can be immobilized on the surface of a substrate and can be used as catalysts.

BACKGROUND calixarenes are a well-known class of cyclic oligomers that are usually made by condensing formaldehyde with p-alkylphenols under alkaline conditions. V. Bohmer summarized the chemistry of calixarenes in an excellent review article (*Angew. Chem., Int. Ed. Engl.* 34: 713 (1995). Early transition metal complexes in which the four oxygen atoms of calix[4]arenes or O-methylated calix[4]arenes chelate to the metal are now known (see, e.g., *J. Am. Chem. Soc.* 119: 9198 (1997)).

Metal colloids constitute a group of compounds which have favorable properties as catalysts and catalyst precursors. In U.S. Pat. No. 4,144,191, a bimetallic carbonyl cluster compound catalyst for producing alcohols by hydroformylation is disclosed; either $Rh_2CO_2(CO)_{12}$ or $Rh_3Co(CO)_{12}$ is used, bound to an organic polymer containing amine groups. The catalyst operates at low temperature and produces almost exclusively alcohols.

In the Finnish patent application No. 844634 the observation is made that a mixture of the monometal cluster compounds $Rh_4(CO)_{12}$ and $Co_4(CO)_{12}$ bound to an amine resin carrier serves as the extremely selective catalyst in producing alcohols. An advantage of the cluster mixture catalyst is that it is simpler to prepare and its activity can be optimized as a function of the mole proportion of the metals. When supported on inorganic oxide surfaces, iridium metal colloids in the form of clusters such as $Ir_4$ and nanoparticles are active catalysts for olefin hydrogenation (*Nature* 415: 623 (2002)) and toluene hydrogenation (*Journal of Catalysis* 170: 161 (1997) and *Journal of Catalysis* 176: 310 (1998)). Besides olefin hydrogenation, iridium is in general used for a variety of catalytic processes that include propane hydrogenolysis, CO hydrogenation, toluene hydrogenation, decalin ring opening and related conversion of methylcyclohexane to dimethylpentanes (See Catalysis Letters 131: 7 (2009)), methanation, intramolecular hydroamination, asymmetric isomerization of primary allylic alcohols, allylic amination, hydroamination, hydrothiolation, C—H bond arylation of heteroarenes using iodoarenes, [2+2+2] cycloadditions, carbonylation of methanol, methane hydroxylation (See Chemical Communications 3270-3272 (2009)), and selective naphthenic ring opening without significant dealkylation of pendant substituents on the right (See U.S. Pat. No. 5,763,731).

It is known that the chemical properties of metal clusters such as catalytic activity or electronic properties such as electron binding energy vary depending on the size of cluster (aggregate of atoms) and the nature and number of ligands. It is further known that a critical limitation that prevents industrial application of metal clusters and, in general, metal colloid catalysts is lack of stability against aggregation (Gates et al., *Nature* 372: 346 (1994)). One method of dealing with lack of stability of metal clusters is to deposit them on a support such as a planar surface of an inorganic oxide or the interior microporosity of a zeolite. These surfaces can impart additional stability to metal clusters, and this has been demonstrated previously for $Ir_4$ metal colloid species inside of zeolites even when decarbonylated (Gates et al., *J. Phys. Chem.* B 103: 5311 (1999), Gates et al., *J. Am. Chem. Soc.* 1999 121: 7674 (1999), Gates et al., *J. Phys. Chem.* B 108: 11259 (2004), and Gates et al., *J. Phys. Chem.* C 111: 262 (2007)). However, as ligands, zeolitic and inorganic oxide surfaces lack the ability to widely tune the catalytic and electronic properties of the cluster in large part because of the lack of available functional groups for interacting with the cluster (limited to be O, Si, and Al for zeolite), when compared with an organic ligand. In addition, it would be highly desirable to pattern discrete numbers of clusters in an organized spatial fashion relative to one another, because such organization can in principle also be used to affect catalysis. This is not possible to accomplish using the planar surface of an inorganic oxide or the interior microporosity of a zeolite as a template because more or less random deposition of cluster results throughout. The same is true when using the interior microporosity of a metal-organic framework material (See J. Materials Chem. 19: 1314 (2009)). Lithographic fabrication methods that have been used in the semiconductor industry have been used to prepare arrays of metal particles that are uniform in size, but these particles are typically larger than 100 nm in diameter (See Somorjai et al., *Langmuir* 14: 1458 (1998)). Recently, calixarenes have been successfully used as ligands to pattern up to eight cobalt colloids using the calixarene molecule as an organizational scaffold (See Vicens, et al., *Dalton Transactions* 2999-3008 (2009) and Wei et al., *Chem Comm* 4254-4256 (2009)). These colloids were synthesized via direct reaction of either $Co_2(CO)_8$ or $Co_4(CO)_{12}$ with alkyne-containing resorcinarene, under conditions that are identical to those used for non-calixarene ligands consisting of a single alkyne group. However, this type of direct reaction approach failed to synthesize a well-defined, characterizable set of products when reacting with the metal polyhedron, when using $Co_4(CO)_{12}$, and also fails at synthesizing calixarene-bound iridium colloids. An additional advantage when using a calixarene as ligand for a metal colloid is that the calixarene can be used to confine the nucleation and growth of the colloid during synthesis to be a small size via geometric restrictions and/or multivalency (See Wei et al., *Chem Comm* 4254-4256 (2009)). This type of confinement during metal colloid nucleation and growth has also been demonstrated previously using dendrimers as ligands for metal colloids (See Crooks et al., Accounts of Chemical Research 34: 181 (2001)); however, dendrimers do not allow control of patterning discrete numbers of less than eight colloids. The current invention offers the ability to pattern colloids in an organized assembly while also offering tenability of environment.

Some catalytic effects of transition metals complexed with calixarenes have been shown for olefin rearrangements [Giannini et al., *J. Am. Chem. Soc.* 121: 2797 (1999)], cycloadddition of terminal alkanes [Ozerov et al., *J. Am.*

Chem. Soc. 122: 6423 (2000)] and hydroformylation [Csok et al., *J. Organometallic Chem.* 570: 23 (1998)]. The calixarenes in those investigations were coordinated with one or more metal cations that do not contain interactions between reduced metals as in a metal colloid. Calixarenes coordinated to metal cations that are grafted on oxide surfaces enforce isolation of the grafted metal cation by preventing aggregation into extended oxide structures [Katz et al., *J. Am. Chem. Soc.* 126: 16478 (2004)], [Katz et al., *J. Am. Chem. Soc.* 129: 15585 (2007)], and [Katz et al., *Chem. Mater.* 21: 1852 (2009)], and also afford the ability to tune catalysis of the grafted cation by virtue of the nature of coordinating groups as substituents on the calixarene skeleton [Katz et al, *J. Am. Chem. Soc.* 129: 1122 (2007)].

Coordinating a calixarene ligand to metal clusters offers numerous advantages including, but not limited to, more resiliency against aggregation due to the role of the calixarene as a sterically bulky barrier and, perhaps more importantly, opens the synthesis of new classes of highly tailorable functional materials, in which the calixarene serves as a nanoscale organizational scaffold for the assembly of complex active sites. The calixarene can also affect electron density on the metal colloid core by virtue of coordinating functional groups and substituents on the calixarene skeleton. In addition, metal colloids bound with calixarene contain void spaces either in between calixarenes on the surface or directly below the calixarene cavity, which can be used for binding and catalysis of molecules. All of the effects above have been previously demonstrated for calixarene-bound gold colloids [Ha et al., *Langmuir* 25: 10548 (2009)].

The continuing pursuit for smaller gold colloids that are stabilized with organic ligands is driven in large part by their use as building blocks for the assembly of functional materials in a variety of areas, such as drug and gene delivery ((a) Rivere, C., Roux, S., Tillement, O., Billotey, C., Perriat, P. Nanosystems for medical applications: Biological detection, drug delivery, diagnosis and therapy. *Annales de Chimie-science des Materiaux*, 31, 351-367 (2006) (b) Wang, G. L., Zhang, J., Murray, R. W. DNA binding of an ethidium intercalator attached to a monolayer-protected gold cluster. *Anal. Chem.* 17, 4320-4327 (2002) (c) Patra, C. R., Bhattacharya, R., Mukhopadhyay, D., Mukherjee, P. Application of gold colloids for targeted therapy in cancer. *J.B.N.* 4, 99-132 (2008)), biosensing ((a) Zhao, W., Chiuman, W., Lam, J. C. F., McManus, S. A., Chen, W., Yuguo, C., Pelton, R., Brook, M. A.; $L_1$, Y. DNA Aptamer Folding on Gold Colloids: From Colloid Chemistry to Biosensors. *J. Am. Chem. Soc.* 130, 3610-3618 (2008) (b) Scodeller, P., Flexer, V., Szamocki, R., Calvo, E. J., Tognalli, N., Troiani, H., Fainstein, A. Wired-Enzyme Core-Shell Au Colloid Biosensor. *J. Am. Chem. Soc.* 130, 12690-12697 (2008). (c) Wang, L. H., Zhang, J., Wang, X., Huang, Q., Pan, D., Song, S. P., Fan, C. H. Gold colloid-based optical probes for target-responsive DNA structures. *Gold. Bull.*, 41, 37-41 (2008)), nanofabrication ((a) Li, H. Y., Carter, J. D., LaBean, T. H. Nanofabrication by DNA self-assembly. *Mater. Today*, 12, 24-32 (2009) (b) Becerril, H. A., Woolley, A. T. DNA-templated nanofabrication. *Chem. Soc. Rev.* 38, 329-337 (2009) and references therein) and heterogeneous catalysis ((a) Choudhary, T. V., Goodman, D. W. Oxidation catalysis by supported gold nano-clusters. *Top. Catal.* 21, 25-34 (2002). (b) Turner, M., Golovko, V. B., Vaughan, 0. P. H., Abdulkin, P., Berenguer-Murcia, A., Tikhov, M. S., Johnson, B. F. G., Lambert, R. M. Selective oxidation with dioxygen by gold colloid catalysts derived from 55-atom clusters. *Nature*, 454, 981-U31 (2008). (c) Lee, S., Molina, L. M., Lopez, M. J., Alonso, J. A., Hammer, B., Lee, B., Seifert, S., Winans, R. E., Elam, J. W., Pellin, M. J., Vajda, S. Selective Propene Epoxidation on Immobilized Au6-10 Clusters: The Effect of Hydrogen and Water on Activity and Selectivity. *Angew. Chem., Int. Ed.*, 48, 1467-1471 (2009). (d) Hughes, M. D., Xu, Y.-J., Jenkins, P., McMorn, P., Landon, P., Enache, D. I., Carley, A. F., Attard, G. A., Hutchings, G. J., King, F., Stitt, E. H., Johnston, P., Griffin, K., Kiely, C. J. Tunable gold catalysts for selective hydrocarbon oxidation under mild conditions. *Nature*, 437, 1132-1135 (2005). (e) Haruta, A. When gold is not noble: Catalysis by colloids. *Chemical Record*, 3, 75-87 (2003).). Previous research has been done on the catalytic activity of metal clusters on solid supports. Xu Z et al., Nature, 1994, 372: 346-348; and Argo et al., Nature, 2002, 415: 623-626. To the extent that these references disclose metal clusters on a metal oxide support that in some sense might be considered a ligand, the references disclose metal clusters complexed to only one ligand.

In these applications small gold colloids are advantageous from the perspectives of penetrating into confined spaces such as intracellular compartments that are inaccessible with larger colloids offering greater surface-to-volume and electronic tenability via choice of surface ligands enabling assembly of materials at a higher resolution and information density and exhibiting preferred catalytic properties that are different from those of bulk. The passivation of small metal colloids with organic ligands decreases their ubiquitous tendency to aggregate into larger and more stable colloids. The ideal for such a passivating layer is to facilitate two at first site mutually incompatible functions: (i) stabilize a small metal colloid, while also (ii) offering access to the metal surface for ease of binding and conjugation to other molecules. Large (4 nm) gold colloids that are bound with bulky calixarene ligands have been previously shown to have greater stability against aggregation and sintering, tunable electron density via interactions with coordinating calixarene substituents, and accessible metal surfaces that serve as small-molecule binding sites located between adsorbed ligands (Ha J M, Solvyov A, Katz A, Synthesis and characterization of accessible metal surfaces in calixarene-bound gold colloids. Langmuir, 25, 10548-10553 (2009) and references therein). All of the effects above have been previously demonstrated for calixarene-bound gold colloids [Ha et al., *Langmuir* 25: 10548 (2009)].

Quite surprisingly, we have discovered that complexation of metal atoms with a ligand, e.g., a calixarene, allows the formation of metal colloids smaller than those previously produced. Moreover, counterintuitively, it has been discovered that the smaller colloids have a greater fraction of surface atoms accessible than larger colloids. As exposed metal surface atoms are an important element of the chemical, e.g., catalytic and adsorptive (binding) properties of the metal colloids, this discovery increases the utility and versatility of metal colloids.

Previously known gold clusters include those that have been encapsulated in cucurbituril. Corma A et al., Chem. Eur. J., 2007, 13: 6359-6364. The encapsulated ligands, however, were inaccessible to cyanide anion as a gold leaching agent. The stoichiometry of these enapsulated clusters would be one ligand per gold core. Using cucurbiturals with smaller cavity sizes led to larger gold clusters (4 nm), but with metal cores considerably larger than the size of the ligand.

Nowicki A et al., Chem. Commun., 2006, 296-298; Denicourt-Nowicki A et al., Dalton Trans., 2007, 5714-5719 (Denicourt-Nowicki I); and Denicourt-Nowicki A et al., Chem. Eur. J., 2008, 14: 8090-8093 (Denicourt-Nowicki II) investigated cyclodextrin-complexed ruthenium nanoparticles. The histogram in FIG. 1 of Denicourt-Nowicki I shows all metal cores to be larger than the size of the beta-cyclodextrin used as ligand. This is consistent with the schematic in Nowicki labelled as Scheme 2, which suggests a larger Ru(0) core surrounded by smaller cyclodextrin ligands.

Sylvestre J-P et al., J. Am. Chem. Soc., 2004, 126: 7176-7177 describe the preparation of gold particles using cyclodextrin ligands akin to Denicourt-Nowicki I. Again, as in Denicourt-Nowicki I, the size of the metal core is larger than the cyclodextrin and ranges from 2-2.5 nm.

Goldipas K R et al., J. Am. Chem. Soc., 2003, 125: 6491-6502 disclose nanoparticle-cored dendrimers that, according to the authors, consist of Au cores larger than the dendritic wedge that comprises the ligand to which they are complexed, thus making encapsulation not physically possible.

SUMMARY OF INVENTION

Provided herein are complexes of ligands with metal colloids in which the size differential between the ligands and the metal colloid plays an important role in providing an accessible metal core. Exemplary colloids of the present invention have metal cores smaller than the ligands to which they are bound and, surprisingly, have a greater percentage of their metal surface atoms accessible to various probe molecules smaller than the ligands, as compared to analogous larger colloids. Prior to the present invention, metal colloids bound to a ligand have not allowed for such potentially extensive access to the core of a ligand-metal colloid complex. Exemplary embodiments of the complexes described herein are accessible in the sense that a complex is able to bind a molecule from solution or gas phase without aggregating and/or decomposing the complex during the binding event. This is in contrast to many art-known clusters, which either have no accessible sites or decompose via sintering (aggregation) during ligand exchange processes accompanying binding a molecule from solution or gas phase. Because the complexes disclosed herein have at least two ligands complexed thereto, the risk of encapsulation is avoided as compared to previously known complexes.

Exemplary compounds of the invention provide (i) protection against aggregation and sintering with the ligand acting as a sterically bulky ligand on the surface, (ii) accessibility to the metal surface by virtue of exposed metal located in areas between ligands, and (iii) a moiety that can be used to tune the electronic and steric properties of the colloid core by virtue of substituent functional groups on the ligand. Also provided are ligands, such as calixarene-related compounds, that act as easily variable ligands, tunable to achieve a particular desired property in a colloid coordinated to the ligand. Methods of making these ligands and coordinating them with colloids are also provided. Moreover, methods for making the compounds and methods for their use are also provided in both their free and immobilized states. Complexes of calixarene-related compounds and metal colloids of the invention can be used to catalyze processes including those known in the art to be catalyzed by metal-mediated processes.

The present invention is exemplified relying on a calixarene-like moiety as an exemplary ligand. The invention is further exemplified by reference to a noble metal, e.g., a gold, colloid with bound calixarene-like moieties. The bound ligands provide protection of the metal moiety against aggregation/decomposition while also simultaneously providing for accessibility to molecules that can bind and/or react at the surface of the metal colloid. In an exemplary embodiment of the invention, the ligand, e.g., the calixarene can be used to tune the electronic environment, steric access, patterning, and, ultimately, catalytic activity of the metal colloid core. Moreover, there is provided a generalizable approach for the synthesis of metal colloids, ligands (such as calixarene-related molecules) and complexes thereof. In exemplary embodiments, the invention also provides a method of controlling aspects of the reactivity of metal colloids, e.g., gold-containing colloids, by coordination with the ligands, e.g., calixarene-related moieties.

DESCRIPTION OF EMBODIMENTS

Definitions

Figure 1:
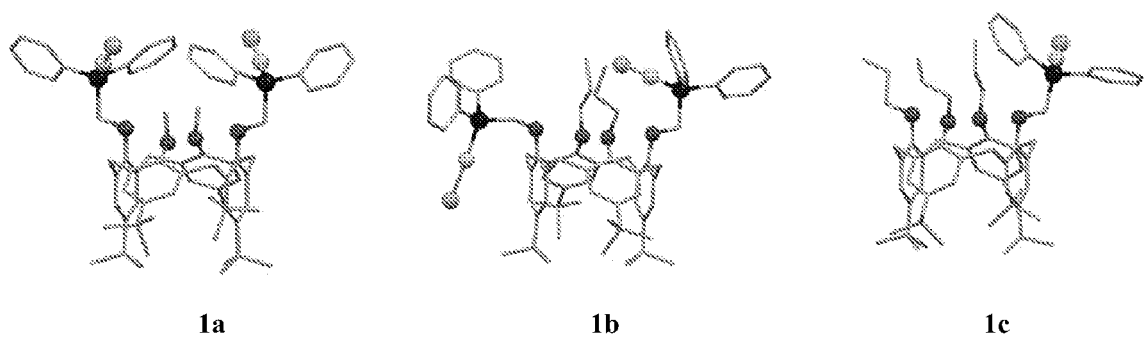
FIG. 1 displays single crystal X-ray crystallographic structures of 1a, 1b and 1c.

The term "alkyl," by itself or as part of another substituent, means a straight or branched chain, or cyclic hydrocarbon radical, or combination thereof, which may be fully saturated, mono- or polyunsaturated and includes mono-, di- and multivalent radicals, having the number of carbon atoms optionally designated (i.e. $C_1$-$C_{10}$ means one to ten carbons). Examples of saturated hydrocarbon radicals include, but are not limited to, groups such as methyl, ethyl, n-propyl, isopropyl, n-butyl, t-butyl, isobutyl, sec-butyl, cyclohexyl, (cyclohexyl)methyl, cyclopropylmethyl, homologs and isomers of, for example, n-pentyl, n-hexyl, n-heptyl, n-octyl, and the like. An unsaturated alkyl group is one having one or more double bonds or triple bonds (i.e., alkenyl and alkynyl moieties). Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. Alkyl groups that are limited to hydrocarbon groups are termed "homoalkyl". The term "alkyl" can refer to "alkylene", which by itself or as part of another substituent means a divalent radical derived from an alkane, as exemplified, but not limited, by —CH$_2$CH$_2$CH$_2$CH$_2$—, and further includes those groups described below as "heteroalkylene." Typically, an alkyl (or alkylene) group will have from 1 to 24 carbon atoms, with those groups having 10 or fewer carbon atoms being sometimes preferred. A "lower alkyl" or "lower alkylene" is a shorter chain alkyl or alkylene group, generally having eight or fewer carbon atoms. In some embodiments, alkyl refers to any combination (including singles) selected from $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, $C_{24}$, $C_{25}$, $C_{26}$, $C_{27}$, $C_{28}$, $C_{29}$ and $C_{30}$ alkyl. In some embodiments, alkyl refers to $C_1$-$C_{20}$ alkyl. In some embodiments, alkyl refers to $C_1$-$C_{10}$ alkyl. In some embodiments, alkyl refers to $C_1$-$C_6$ alkyl.

The terms "alkoxy," "alkylamino" and "alkylthio" (or thioalkoxy) are used in their conventional sense, and refer to those alkyl and heteroalkyl groups attached to the remainder of the molecule via an oxygen atom, a nitrogen atom (e.g., an amine group), or a sulfur atom, respectively.

The term "heteroalkyl," by itself or in combination with another term, means, unless otherwise stated, a stable straight or branched chain, or cyclic alkyl moiety, or combinations thereof, consisting of one or more carbon atoms and at least one heteroatom selected from the group consisting of O, N, Si, B and S, and wherein the nitrogen and sulfur atoms may optionally be oxidized and the nitrogen heteroatom may optionally be quaternized. The heteroatoms O, N, S, B and Si may be placed at any interior position of the heteroalkyl group or at the position at which the alkyl group is attached to the remainder of the molecule. Examples include, but are not limited to, —CH$_2$—CH$_2$—O—CH$_3$, —CH$_2$—CH$_2$—NH—CH$_3$, —CH$_2$—CH$_2$—N(CH$_3$)—CH$_3$, —CH$_2$—S—CH$_2$—CH$_3$, —CH$_2$—CH$_2$, —S(O)—CH$_3$, —CH$_2$—CH$_2$—S(O)$_2$—CH$_3$, —CH═CH—O—CH$_3$, —Si(CH$_3$)$_3$, —CH$_2$—CH═N—OCH$_3$, and —CH═CH—N(CH$_3$)—CH$_3$. Up to two heteroatoms may be consecutive, such as, for example, —CH$_2$—NH—OCH$_3$ and —CH$_2$—O—Si(CH$_3$)$_3$. Similarly, the term "heteroalkylene" by itself or as part of another substituent means a divalent radical derived from heteroalkyl, as exemplified, but not limited by, —CH$_2$—CH$_2$—S—CH$_2$—CH$_2$— and —CH$_2$—S—CH$_2$—CH$_2$—NH—CH$_2$—. For heteroalkylene groups, heteroatoms can also occupy either or both of the chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula —C(O)₂R'— represents both —C(O)₂R'— and —R'C(O)₂—.

The terms "cycloalkyl" and "heterocycloalkyl", by themselves or in combination with other terms, represent, unless otherwise stated, cyclic versions of "alkyl" and "heteroalkyl", respectively. Additionally, for heterocycloalkyl, a heteroatom can occupy the position at which the heterocycle is attached to the remainder of the molecule. Examples of cycloalkyl include, but are not limited to, cyclopentyl, cyclohexyl, 1-cyclohexenyl, 3-cyclohexenyl, cycloheptyl, and the like. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like.

The term "acyl" refers to a species that includes the moiety —C(O)R, where R has the meaning defined herein. Exemplary species for R include H, halogen, substituted or unsubstituted alkyl, substituted or unsubstituted aryl, substituted or unsubstituted heteroaryl, and substituted or unsubstituted heterocycloalkyl.

The terms "halo" or "halogen," by themselves or as part of another substituent, unless otherwise stated, mean, a fluorine, chlorine, bromine, or iodine atom. Additionally, terms such as "haloalkyl," are meant to include monohaloalkyl and polyhaloalkyl. For example, the term "halo($C_1$-$C_4$)alkyl" is mean to include, but not be limited to, trifluoromethyl, 2,2,2-trifluoroethyl, 4-chlorobutyl, 3-bromopropyl, and the like.

The term "aryl" means, unless otherwise stated, a polyunsaturated, aromatic, substituent that can be a single ring or multiple rings (preferably from 1 to 3 rings), which are fused together or linked covalently. The term "heteroaryl" refers to aryl groups (or rings) that contain from one to four heteroatoms selected from N, O, and S, wherein the nitrogen and sulfur atoms are optionally oxidized, and the nitrogen atom(s) are optionally quaternized. A heteroaryl group can be attached to the remainder of the molecule through a heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below.

For brevity, the term "aryl" or "heteroaryl" when used in combination with other terms (e.g., aryloxy, arylthioxy, arylalkyl) includes both aryl and heteroaryl rings as defined above. Thus, the term "arylalkyl" is meant to include those radicals in which an aryl group is attached to an alkyl group (e.g., benzyl, phenethyl, pyridylmethyl and the like) including those alkyl groups in which a carbon atom (e.g., a methylene group) has been replaced by, for example, an oxygen atom (e.g., phenoxymethyl, 2-pyridyloxymethyl, 3-(1-naphthyloxy)propyl, and the like).

In some embodiments, any of alkyl, heteroalkyl, cycloalkyl, heterocycloalkyl, aryl and heteroaryl may be substituted. Preferred substituents for each type of radical are provided below.

Substituents for the alkyl and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) are generically referred to as "alkyl group substituents". In some embodiments, an alkyl group substituent is selected from —OR', =O, =NR', =N—OR', —NR'R", —SR', -halogen, —SiR'R"R'", —OC(O)R', —C(O)R', —CO₂R', —CONR'R", —OC(O)NR'R", —NR"C(O)R', —NR'—C(O)NR"R'", —NR"C(O)₂R', —NR—C(NR'R"R'")=NR"", —NR—C(NR'R")=NR'", —S(O)R', —S(O)₂R', —S(O)₂NR'R", —NRSO₂R', —CN and —NO₂ in a number ranging from zero to (2 m'+1), where m' is the total number of carbon atoms in such radical. In one embodiment, R', R", R'" and R"" each independently refer to hydrogen, substituted or unsubstituted heteroalkyl, substituted or unsubstituted aryl, e.g., aryl substituted with 1-3 halogens, substituted or unsubstituted alkyl, alkoxy or thioalkoxy groups, or arylalkyl groups. In one embodiment, R', R", R'" and R"" are each independently selected from hydrogen, unsubstituted alkyl, unsubstituted heteroalkyl, unsubstituted cycloalkyl, unsubstituted heterocycloalkyl, unsubstituted aryl, unsubstituted heteroaryl, alkoxy, thioalkoxy groups, and arylalkyl. In one embodiment, R', R", R'" and R"" are each independently selected from hydrogen and unsubstituted alkyl. When a compound of the invention includes more than one R group, for example, each of the R groups is independently selected as are each R', R", R'" and R"" groups when more than one of these groups is present. When R' and R" are attached to the same nitrogen atom, they can be combined with the nitrogen atom to form a 5-, 6-, or 7-membered ring. For example, —NR'R" can include 1-pyrrolidinyl and 4-morpholinyl. In some embodiments, an alkyl group substituent is selected from substituted or unsubstituted aryl, substituted or unsubstituted heteroaryl and substituted or unsubstituted heterocycloalkyl.

Similar to the substituents described for the alkyl radical, substituents for the aryl and heteroaryl groups are generically referred to as "aryl group substituents." In some embodiments, an aryl group substituent is selected from —OR', =O, =NR', =N—OR', —NR'R", —SR', -halogen, —SiR'R"R'", —OC(O)R', —C(O)R', —CO₂R', —CONR'R", —OC(O)NR'R", —NR"C(O)R', —NR'—C(O)NR"R'", —NR"C(O)₂R', —NR—C(NR'R"R'")=NR"", —NR—C(NR'R")=NR'", —S(O)R', —S(O)₂R', —S(O)₂NR'R", —NRSO₂R', —CN and —NO₂, —R', —N₃, —CH(Ph)₂, fluoro($C_1$-$C_4$)alkoxy, and fluoro($C_1$-$C_4$)alkyl, in a number ranging from zero to the total number of open valences on the aromatic ring system; and where R', R", R'" and R"" are in some embodiments independently selected from hydrogen, substituted or unsubstituted alkyl, substituted or unsubstituted heteroalkyl, substituted or unsubstituted aryl and substituted or unsubstituted heteroaryl. In some embodiments, R', R", R'" and R"" are independently selected from hydrogen, unsubstituted alkyl, unsubstituted heteroalkyl, unsubstituted aryl and unsubstituted heteroaryl. In some embodiments, R', R", R'" and R"" are independently selected from hydrogen and unsubstituted alkyl. When a compound of the invention includes more than one R group, for example, each of the R groups is independently selected as are each R', R", R'" and R"" groups when more than one of these groups is present. In some embodiments, an aryl group substituent is selected from substituted or unsubstituted alkyl, substituted or unsubstituted heteroalkyl, substituted or unsubstituted heterocycloalkyl, substituted or unsubstituted aryl and substituted or unsubstituted heteroaryl.

Two of the substituents on adjacent atoms of the aryl or heteroaryl ring may optionally be replaced with a substituent of the formula -T-C(O)—(CRR')$_q$—U—, wherein T and U are independently —NR—, —O—, —CRR'— or a single bond, and q is an integer of from 0 to 3. Alternatively, two of the substituents on adjacent atoms of the aryl or heteroaryl ring may optionally be replaced with a substituent of the formula -A-(CH$_2$)$_r$—B—, wherein A and B are independently —CRR'—, —O—, —NR—, —S—, —S(O)—, —S(O)$_2$—, —S(O)$_2$NR'— or a single bond, and r is an integer of from 1 to 4. One of the single bonds of the new ring so formed may optionally be replaced with a double bond. Alternatively, two of the substituents on adjacent atoms of the aryl or heteroaryl ring may optionally be replaced with a substituent of the formula —(CRR')$_s$—X—(CR"R''')$_d$—, where s and d are independently integers of from 0 to 3, and X is —O—, —NR'—, —S—, —S(O)—, —S(O)$_2$—, or —S(O)$_2$NR'—. The substituents R, R', R" and R''' are preferably independently selected from hydrogen or substituted or unsubstituted (C$_1$-C$_6$)alkyl.

The term "heteroatom" includes oxygen (O), nitrogen (N), sulfur (S), silicon (Si) and boron (B).

Unless otherwise specified, the symbol "R" is a general abbreviation that represents a substituent group that is selected from acyl, substituted or unsubstituted alkyl, substituted or unsubstituted heteroalkyl, substituted or unsubstituted cycloalkyl, substituted or unsubstituted heterocycloalkyl, substituted or unsubstituted aryl and substituted or unsubstituted heteroaryl.

The term "salt(s)" includes salts of the compounds which are prepared with relatively nontoxic acids or bases, depending on the particular substituents found on the compounds described herein. When compounds of the present invention contain relatively acidic functionalities, base addition salts can be obtained by contacting the neutral form of such compounds with a sufficient amount of the desired base, either neat or in a suitable inert solvent. Examples of base addition salts include sodium, potassium, calcium, ammonium, organic amino, or magnesium salt, or a similar salt. When compounds of the present invention contain relatively basic functionalities, acid addition salts can be obtained by contacting the neutral form of such compounds with a sufficient amount of the desired acid, either neat or in a suitable inert solvent. Examples of acid addition salts include those derived from inorganic acids like hydrochloric, hydrobromic, nitric, carbonic, monohydrogencarbonic, phosphoric, monohydrogenphosphoric, dihydrogenphosphoric, sulfuric, monohydrogensulfuric, hydriodic, or phosphorous acids, and the like, as well as the salts derived from relatively nontoxic organic acids like acetic, propionic, isobutyric, butyric, maleic, malic, malonic, benzoic, succinic, suberic, fumaric, lactic, mandelic, phthalic, benzenesulfonic, p-tolylsulfonic, citric, tartaric, methanesulfonic, and the like. Also included are salts of amino acids such as arginate, and the like, and salts of organic acids like glucuronic or galactunoric acids and the like (see, for example, Berge et al., *Journal of Pharmaceutical Science*, 66: 1-19 (1977)). Certain specific compounds of the present invention contain both basic and acidic functionalities that allow the compounds to be converted into either base or acid addition salts. Hydrates of the salts are also included.

Certain compounds of the present invention possess asymmetric carbon atoms (optical centers) or double bonds; the racemates, diastereomers, geometric isomers and individual isomers are encompassed within the scope of the present invention. Optically active (R)- and (S)-isomers and d and l isomers may be prepared using chiral synthons or chiral reagents, or resolved using conventional techniques. When the compounds described herein contain olefinic double bonds or other centers of geometric asymmetry, and unless specified otherwise, it is intended that the compounds include both E and Z geometric isomers. Likewise, all tautomeric forms are included.

The compounds disclosed herein may also contain unnatural proportions of atomic isotopes at one or more of the atoms that constitute such compounds. For example, the compounds may be radiolabeled with radioactive isotopes, such as for example tritium ($^3$H), iodine-125 ($^{125}$I) or carbon-14 ($^{14}$C). All isotopic variations of the compounds of the present invention, whether radioactive or not, are intended to be encompassed within the scope of the present invention.

Embodiments

In one aspect, the invention provides metal colloids, ligands (e.g. calixarene-related compounds) and complexes thereof. In one aspect, a complex comprises: (a) a metal colloid comprising a plurality of metal atoms; and (b) two or more ligands, each ligand comprising a linker, wherein the linker comprises a coordinating atom coordinated to one of the plurality of metal atoms. In exemplary embodiments, a complex comprises: (a) a metal colloid comprising a plurality of metal atoms; and (b) two or more ligands, each ligand comprising a linker, wherein the linker comprises a coordinating atom coordinated to one of the plurality of metal atoms, wherein at least two of the ligands are larger than the metal colloid. In exemplary embodiments, a complex comprises: (a) a metal colloid comprising a plurality of metal atoms; and (b) two or more ligands, each ligand comprising a linker, wherein the linker comprises a coordinating atom coordinated to one of the plurality of metal atoms, wherein the metal colloid is accessible to a probe molecule smaller than the ligand. In exemplary embodiments, a complex comprises: (a) a metal colloid comprising a plurality of metal atoms; and (b) two or more ligands, each ligand comprising a linker, wherein the linker comprises a coordinating atom coordinated to one of the plurality of metal atoms, wherein at least two of the ligands are larger than the metal colloid and the metal colloid is accessible to a probe molecule smaller than the ligand.

The term "metal colloid" refers to a particle that includes at least two metal atoms joined by a bond having substantial metal-metal bond character. An exemplary metal colloid of the invention is a metal colloid comprising a plurality of noble metal atoms, e.g., a metal colloid comprising a plurality of gold atoms. Useful metal atoms for the metal colloid include those selected from Ir, Pt, Pd, Ni, Mo, W, Co and Au.

The size of the metal colloid can vary. In some embodiments, a metal colloid has a diameter that is about a length selected from 0.5 nm, 0.6 nm, 0.7 nm, 0.8 nm, 0.9 nm, 1.0 nm, 1.1 nm, 1.2 nm, 1.3 nm, 1.4 nm, 1.5 nm, 1.6 nm, 1.7 nm, 1.8 nm, 1.9 nm, 2.0 nm, 2.1 nm, 2.2 nm, 2.3 nm, 2.4 nm and 2.5 nm. In some embodiments, a metal colloid has a diameter that is less than about a length selected from 0.5 nm, 0.6 nm, 0.7 nm, 0.8 nm, 0.9 nm, 1.0 nm, 1.1 nm, 1.2 nm, 1.3 nm, 1.4 nm, 1.5 nm, 1.6 nm, 1.7 nm, 1.8 nm, 1.9 nm, 2.0 nm, 2.1 nm, 2.2 nm, 2.3 nm, 2.4 nm and 2.5 nm. In some embodiments, a metal colloid has a diameter that is less than about 1.0 nm. In some embodiments, a metal colloid has a diameter that is less than about 0.9 nm. In some embodiments, the metal colloid comprises 1, 2, 3, 4, 5, 6, 7, 8, 9, 10, 11, 12, 13, 14, 15, 16, 17, 18, 19 or 20 metal atoms. In exemplary embodiments, the metal colloid comprises 11 metal atoms, such as 11 Au atoms.

In exemplary embodiments, a metal colloid is bound to one or more ligands (e.g., calixarene-like moieties). The colloid can include two or more ligands, and these moieties can be the same or different. In various embodiments, the metal colloid is bound to as many ligands as can be bound to the metal colloid. Typical mole ratios of coordinating atom to metal atom are near unity and usually between 1 and 2. Typical ligand to metal atom ratios are near 0.5 and in exemplary embodiments are between 0.5 to 1.

In exemplary embodiments, at least two of the ligands are larger than the metal colloid. The determination of the size differential can be determined in any number of ways as understood by one of skill in the art. For example, in some embodiments, two ligands are larger than a metal colloid if the ligands are each characterized by a length that is larger than the diameter of the metal colloid, wherein the length is measured along a vector that is parallel to a tangent to the surface of the metal colloid, the tangent being perpendicular to a normal at the surface of the metal colloid, the normal directed to or through the center of the ligand. In another example, each of the diameters of a ligand in at least 2 dimensions is larger than the diameter of the metal colloid.

In exemplary embodiments, the metal colloid of a complex is accessible to a probe molecule smaller than the ligand. In other words, in one aspect, a complex comprises: (a) a metal colloid comprising a plurality of metal atoms; and (b) two or more ligands, each ligand comprising a linker, wherein the linker comprises a coordinating atom coordinated to one of the plurality of metal atoms, wherein at least two of the ligands are larger than the metal colloid and the metal colloid is accessible to a probe molecule smaller than the ligand.

In these contexts, a metal colloid is "accessible" if a complex is able to bind a molecule from solution or gas phase without losing stability of the complex via aggregation and/or decomposition processes during the binding event. Accessibility can be assessed in numerous ways. In some embodiments, at least about a percentage selected from 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39% and 40% of the surface metal atoms are accessible to a probe molecule smaller than the ligand. In some embodiments, at least about a percentage selected from 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39% and 40% of the surface area of the metal atoms is accessible to a probe molecule smaller than the ligand. In exemplary embodiments, at least about 5%, or about 5% to 25% of the surface metal atoms are accessible to a probe molecule smaller than the ligand. In an exemplary embodiment, the metal colloid cannot be further bound through a metal atom to additional ligands.

A standard measure for the amount of accessible surface area of a metal colloid bound to a ligand is the determination and quantification of the binding of 2-naphthalenethiol (2-NT) to the surface. Other probes that are smaller than the ligand bound to the metal core are also of use. For example, thiolated DNA and RNA can be used as probe molecules.

The term "ligand" has the meaning ordinarily ascribed to it in the art. Exemplary ligands include sterically bulky species, such as macrocycles (e.g., calixarene-like ligands, polyamine macrocycles, porphyrins), dendrimers and other branched oligomeric or polymeric species. In some embodiments, a ligand is an organic ligand. The term "organic" refers to a compound that includes carbon and hydrogen, with the optional inclusion of other atoms commonly found in an organic molecule as understood in the art, such other atoms including nitrogen, oxygen, phosphorous and sulfur. As described below, a ligand generally comprises a linker, and in exemplary embodiments, a ligand comprises one linker or two linkers, which can be the same or different.

In exemplary embodiments, at least one (e.g., two or more) of the ligands is a calixarene-related compound. The term "calixarene-related compound" or "calixarene-like ligand" is meant to include calixarenes and compounds similar to calixarene in that they contain aryl or heteroaryl groups linked by bridging moieties to form a "basket", as well as "basket"-type compounds formed by similarly linking other cyclic groups. The text "Calixarenes Revisited" (C. David Gutsche, Royal Society of Chemistry, 1998) describes some of these compounds, for instance on pp. 23-28, and this text is hereby incorporated by reference herein. "Calixarene-related compounds" is meant to include the types of compounds mentioned in that text. It thus includes compounds referred to as "homocalixarenes", in which one or more bridges between the phenolic groups contain two or more carbon atoms. One example given in Gutsche is no. 62, which includes cyclobutyl bridges.

"Calixarene-related compounds" also includes, for example, oxacalixarenes, azacalixarenes, silicacalixarenes and thiacalixarenes, which contain one or more oxygen, nitrogen, silicon or sulfur bridges, respectively, between phenolic groups, as well as calixarene compounds having one or more platinum bridges. This term also includes compounds such as those termed "calixarene-related cyclooligomers" in Gutsche (1998), for instance similar structures formed from furan or thiophene rather than phenolic residues. Other calixarene-related compounds include, for example, calix[n]pyrroles, calix[m]pyridino[n]pyrroles or calix[m]pyridine. A "calix[n]pyrrole," is a macrocycle having "n" pyrrole rings linked in the α-positions. "Calix[m]pyridino[n]pyrroles" are macrocycles having "m" pyridine rings and "n" pyrrole rings linked in the α-positions. A "calix[m]pyridine" is a macrocycle having "m" pyridine rings linked in the α-positions.

The framework of the calixarene ligand can be substituted with other atoms that do not interfere with the ability of the ligand to form complexes with transition metals. For example, the framework of the calixarene ligand can be substituted with alkyl, aryl, halide, alkoxy, thioether, alkylsilyl, or other groups.

Exemplary calixarene-related compounds have four, six, or eight phenolic moieties; thus preferred calixarenes are calix[4]arenes, calix[6]arenes, and calix[8]arenes. Calix[4]arenes are more preferred. In some preferred catalyst systems, the calixarene-related compound is a p-alkylcalixarene, more preferably a p-t-butylcalixarene. The synthetic procedures for making these materials have been finely honed and optimized, and the starting materials, e.g., p-t-butylphenol, are readily available.

Also provided are ligands readily converted to calixarene-related moieties upon complexation with a colloid. In this embodiment, the invention provides calixarene-related compounds that are derivatized at one or more position of one or more aryl moiety with a linker comprising a coordinating atom, which is capable of coordinating with at least one metal atom of the colloid.

Exemplary calixarene-related compounds are calixarenes, which are cyclic oligomers of phenol and substituted phenols condensed with formaldehyde, and are characterized by the general structure:

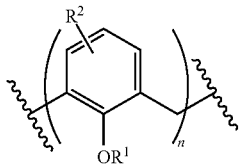

in which n is 3, 4, 5, 6, 7, 8, 9, 10, 11, 12, 13, 14, 15 or 16 in various embodiments. In exemplary embodiments, n is 4. The wavy lines represent the attachment of a plurality of these monomeric units to form a closed ring. General information about such molecules can be found, for example in Bauer et JACS 107, 6053 (1985) and the texts "Calixarenes" by C. David Gutsche, which is part of the Monographs in Supramolecular Chemistry (J. Fraser Stoddart, ed.; Royal Society of Chemistry, 1989) and "Calixarenes Revisited" (1998) by the same author. Calixarenes are in the form of a cyclical oligomer having a "basket" shape, where the cavity can serve as a binding site for numerous guest species, including ions and molecules.

In some embodiments, the group $R^2$ may be hydrogen, or may be any of a number of aryl substituent groups including, but not limited to, alkyl, alkenyl, alkynyl, allyl, aryl, heteroaryl, alcohol, sulfonic acid, phosphine, phosphine oxide, phosphonate, phosphonic acid, thiol, ketone, aldehyde, ester, ether, amine, quaternary ammonium, imine, amide, imide, imido, nitro, carboxylic acid, disulfide, carbonate, isocyanate, carbodiimide, carboalkoxy, carbene, sulfoxide, phosphonium, carbamate, acetal, ketal, boronate, cyanohydrin, hydrazone, oxime, oxazole, oxazoline, oxalane, hydrazide, enamine, sulfone, sulfide, sulfenyl and halogen. In exemplary calixarenes, $R^2$ typically represents a single substituent at the position para to the $OR^1$ group. However, calixarenes of use in the present invention can include one or more $R^2$ substituent. When more than one substituent is present, the substituents can be the same or different. An exemplary class of calixarene compounds with two substituents is known in the art as the calix[n]resorcinarenes, which comprise resorcinol moieties that are joined to each other, and typically possess phenoxy groups in a different arrangement around the ring.

Exemplary $R^1$ substituents include substituted or unsubstituted alkyl, substituted or unsubstituted heteroalkyl, substituted or unsubstituted aryl and substituted or unsubstituted heteroaryl moieties. $R^1$ can also be H.

In exemplary embodiments, at least one $R^1$ comprises one or more coordinating atoms. A "coordinating atom" is a component that is capable of coordinating (or forming a coordinate bond) with a metal atom, especially a metal atom of a metal colloid. Exemplary "coordinating atoms" include nitrogen, oxygen, sulfur, phosphorus and carbon (for example, as in carbene). The coordinating atom can be neutral or charged, e.g., a component of a salt or derived therefrom.

A "calixarene-related moiety" is a structure derived from a "calixarene-related compound or molecule" by its coordination to a metal colloid through a linker comprising a coordinating atom.

The term "metal colloid" refers to a species of metal particle composed of at least two metal atoms, which can be the same or different metal. A metal colloid typically includes at least one other organic ligand (e.g., CO). Multiple ligands on a metal colloid can be the same or different.

Thus, in a further exemplary aspect, the invention provides a complex comprising a metal colloid complexed to a calixarene-related moiety. An exemplary compound of the invention has the structure:

M-L-C in which M is a metal colloid and L is a zero- or higher-order linker joining the metal colloid to C, the calixarene-related moiety.

In exemplary embodiments, a complex comprises: (a) a metal colloid comprising a plurality of gold atoms; and (b) two or more calixarene-related compounds comprising a linker, wherein the linker comprises a coordinating atom coordinated to one of the plurality of gold atoms. In exemplary embodiments, at least two of the calixarene-related compound are larger than the metal colloid. In further exemplary compounds, the metal colloid is accessible, for example, to a probe molecule smaller than the calixarene-related compound.

In any embodiment described herein, one or more calixarene-related compound has the formula:

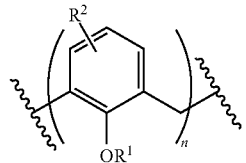

wherein n is an integer selected from 3, 4, 5, 6, 7, 8, 9, 10, 11, 12, 13, 14, 15 and 16. In some embodiments, n is an integer selected from 4, 5, 6, 7 and 8. In exemplary embodiments, n is 4.

In some embodiments, $R^1$ is a moiety selected from substituted or unsubstituted alkyl, substituted or unsubstituted heteroalkyl, substituted or unsubstituted aryl, substituted or unsubstituted heteroaryl, and a linker. In exemplary embodiments, at least one $R^1$ comprises a coordinating atom. In exemplary embodiments, two $R^1$ comprise a coordinating atom. In some embodiments, $R^1$ is substituted or unsubstituted alkyl. In some embodiments, $R^1$ is selected from $C_1$, $C_2$, $C_3$, $C_4$, $C_5$ or $C_6$ alkyl. In some embodiments, $R^1$ is propyl. In some embodiments, $R^1$ is methyl. In some embodiments, $R^1$ is H.

In some embodiments, $R^2$ is a moiety selected from hydrogen, substituted or unsubstituted alkyl, substituted or unsubstituted aryl, substituted or unsubstituted heteroaryl, alcohol, sulfonic acid, phosphine, carbene, phosphonate, phosphonic acid, phosphine oxide, thiol, sulfoxide, ketone, aldehyde, ester, ether, amine, quaternary ammonium, phosphonium, imine, amide, imide, imido, nitro, carboxylic acid, disulfide, carbonate, isocyanate, carbodiimide, carboalkoxy, carbamate, acetal, ketal, boronate, cyanohydrin, hydrazone, oxime, oxazole, oxazoline, oxalane, hydrazide, enamine, sulfone, sulfide, sulfenyl, halogen and a combination thereof. In some embodiments, $R^2$ is substituted or unsubstituted alkyl. In some embodiments, $R^2$ is selected from $C_1$, $C_2$, $C_3$, $C_4$, $C_5$ and $C_6$ alkyl. In some embodiments, $R^2$ is tert-butyl. In some embodiments, $R^2$ is in the para position relative to $—OR^1$.

In some embodiments, at least one $R^1$ is a linker. In exemplary embodiments, one $R^1$ is a linker. In exemplary embodiments, two $R^1$ are linkers, which can be the same or different. The term "linker" as used herein refers to a single covalent bond ("zero-order") or a series of stable covalent bonds incorporating 1-30 nonhydrogen atoms selected from the group consisting of C, N, O, S, Si, B and P that covalently link together the components of the invention disclosed herein, e.g., linking a solid support to a calixarene-related compound, or linking a calixarene-related compound to a metal colloid. Exemplary linkers include 1, 2, 3, 4, 5, 6, 7, 8, 9, 10, 11, 12, 13, 14, 15, 16, 17, 18, 19, 20, 21, 22, 23, 24, 25, 26, 27, 28, 29 or 30 non-hydrogen atoms. Unless otherwise specified, "linking," "linked," "linkage," "conjugating," "conjugated" and analogous terms relating to attachment refer to techniques utilizing and species incorporating linkers. A calixarene-related compound can comprise multiple linkers, thus conferring higher levels of denticity.

In some embodiments, a linker is a moiety selected from phosphine, substituted or unsubstituted alkyl, substituted or unsubstituted heteroalkyl, substituted or unsubstituted aryl and substituted or unsubstituted heteroaryl.

In exemplary embodiments, a linker comprises a coordinating atom. In exemplary embodiments, the coordinating atom is selected from phosphorus, carbon, nitrogen and oxygen. Coordinating atoms can be provided through a large number of various moieties known in the art. For convenience, these moieties can be referred to as P-, C-, N- and O-containing moieties.

In exemplary embodiments, a linker is a P-containing moiety. One particularly useful P-containing moiety is phosphine. In various exemplary embodiments, the coordinating atom on the linker is the phosphorus atom of a phosphine moiety. In some embodiments, the term "phosphine" generically refers to $-Y^1P(Y^2)(Y^3)$, wherein $Y^1$ is selected from a bond, substituted or unsubstituted alkyl, substituted or unsubstituted heteroalkyl, substituted or unsubstituted aryl and substituted or unsubstituted heteroaryl; and $Y^2$ and $Y^3$ are independently selected from substituted or unsubstituted alkyl, substituted or unsubstituted heteroalkyl, substituted or unsubstituted aryl and substituted or unsubstituted heteroaryl. In some embodiments, $Y^2$ and $Y^3$ are each substituted or unsubstituted aryl. In exemplary embodiments, $Y^2$ and $Y^3$ are each phenyl. In some embodiments, $Y^1$ is substituted or unsubstituted alkyl. In some embodiments, $Y^1$ is $C_1$, $C_2$, $C_3$, $C_4$, $C_5$ or $C_6$ alkyl. In some embodiments, $Y^1$ is methyl. In some embodiments, $Y^1$ is a bond.

In various exemplary embodiments, the coordinating atom on the linker between the ligand and the colloid is the phosphorus atom of a phosphine moiety. In an exemplary embodiment, the present invention provides gold colloids containing calixarene phosphine ligands, e.g., monodentate tert-butyl-Calix(OPr)$_3$(O—CH$_2$—PPh$_2$) and bidentate tert-butyl-Calix(OMe)$_2$(O—CH$_2$—PPh$_2$)$_2$ calixarene ligands, and metal colloids complexed with such ligands.

Similar to phosphine ligands, phosphinite, phosphonite and phosphites have recently emerged as versatile ligands in transition metal catalyzed reactions. Positioning of adjacent electronegative heteroatoms such as N and O (but not limited thereto) allow subtle modulation of electronic properties of these ligands that are often beneficial to catalytic reactions. The presence of adjacent O and N provides additional oxidative stabilities to these ligands compared to their phosphine analogues. These ligands are easy to make in high yield due to availability of large natural and synthetic chiral pool derived amino alcohols and chiral diols (for a modular approach, see Velder, J.; Robert, T.; Weidner, I.; Neudorfl, J.-M.; Lex, J.; Schmalz, H-G. *Adv. Synth. Catal.* 2008, 350, 1309-1315; for a review on synthesis of phosphites, see Montserrat Diéguez, Oscar Pàmies, Aurora Ruiz, and Carmen Clayer, *Methodologies in Asymmetric Catalysis*, Chapter 11, 2004, pp 161-173 ACS Symposium Series, Volume 880 for synthesis of phosphites. See Adriaan J. Minnaard, Ben L. Feringa, Laurent Lefort and Johannes G. de Vries *Acc. Chem. Res.*, 2007, 40 (12), pp 1267-1277 for the synthesis of phosphoramidites)

Examples where phosphinite ligands have been used are Rh catalyzed asymmetric hydrogenation of olefin (Blankenstein, J.; Pflatz, A. *Angew Chem. Int. Ed.*, 2001, 40, 4445-47) and Pd catalyzed Suzuki cross coupling reaction (Punji, B.; Mague, J. T.; Balakrishna, M. S. *Dalton Trans.*, 2006, 1322-1330).

Pflatz and coworkers used an oxazoline based phosphonite ligand for Ru catalyzed asymmetric cyclopropanation of styrene using ethyl diazoacetate as carbene source. The same catalyst was also capable of transfer hydrogenation reaction in the presence of 2-propanol and corresponding sodium alkoxide (Braunstein, P.; Naud, F.; Pflatz, A.; Rettig, S. *Organometallics,* 2000, 19, 2676-2683). Pringle, Ferringa and coworkers have shown enantioselective conjugate addition of diethyzinc to enones with Cu(I)-phosphonite based catalyst (Martorell, A.; Naasz, R.; Ferringa, B. L.; Pringle, P. G. *Tetrahedron Asymmetry,* 2001, 12, 2497-2499). Ding and coworkers have used ferrocene based bidentate phosphonite ligands for enantioselective hydroformylation reactions. (Peng, X.; Wang, Z.; Xia, C.; Ding, K. *Tetrahedron Lett.,* 2008, 49, 4862-4864)

Rajanbabu and coworkers have used nickel phosphinite, phosphite and phosphoramidite ligands for asymmetric hydrovinylation reaction (Park, H.; Kumareswaran, R.; Rajanbabu, T. V. R. *Tetrahedron,* 2005, 61, 6352-67). Sandoval et al., have used Rh(I) diphosphite ligands for asymmetric hydrogenation of dehydroamino acid derivatives (Sandoval, C. A.; Liu, S. *J. Molecular. Catalysis. A,* 2010, 325, 65-72). Pd phosphite catalyzed dehalogenation of arenes was reported by Lee et al., (Moon, J.; Lee, S. *J. Organometal. Chem.,* 2009, 694, 473-77). Pd-triphenyl phosphite was shown to catalyze dehydrative allylation using allyl alcohol (Kayaki, Y.; Koda, T.; Ikariya, T. *J. Org. Chem.,* 2004, 69, 2595-97). Pd-based biaryl phosphite catalyst is known to be effective in asymmetric allylic substitution reactions of allyl acetate, carbonate and halides (Dieguez, M.; Pamies, O. *Acc. Chem. Res.,* 2010, 43, 312-22). Calixarene phosphites have been used as hemispherical chelator ligands for obtaining high linear to branched ratio of olefin in Rh(0) catalyzed hydroformylation reaction (Monnereau, L.; Semeril, D.; Matt, D.; Toupet, L. *Adv. Synth. Catal.* 2009, 351, 1629-36)

Phosphoramidite ligands have been used in catalytic asymmetric hydrogenations (Minnaard, A. J.; Feringa, B. L.; Lefort, L.; de Vries, J. G. *Acc. Chem. Res.,* 2007, 40, 1267-77), conjugate addition to enones (Jagt, R. B. C.; de Vries, J. G.; Ferringa, B. L.; Minnaard, A. J. *Org. Lett.*, 2005, 7, 2433-35), and allylic alkylation with diethyl zinc (Malda, H.; van Zijl, A. W.; Arnold, L. A.; Feringa, B. L. *Org. Lett.*, 2001, 3, 1169-1171).

Accordingly, in some embodiments, a linker is selected from phosphinite, phosphonite, phosphite and phosphoramidite. In some embodiments, a linker comprises any of these moieties. For example, a linker can be an alkyl (e.g., $C_1$, $C_2$, $C_3$, $C_4$, $C_5$ or $C_6$ alkyl), heteroalkyl, aryl or a heteroaryl that is substituted by any of these moieties.

In some embodiments, a linker is a C-containing moiety. In some embodiments, a linker is a carbene. Particularly useful carbenes include Arduengo carbenes. One example is a diaminocarbene with the general formula: C(R'N)(R"N), where R' and R" are various functional groups (such as R generically described above) that are optionally bridged to form a heterocycle, such as imidazole or triazole. In exemplary embodiments, a carbene is an alkyl (e.g., $C_1$, $C_2$, $C_3$, $C_4$, $C_5$ or $C_6$ alkyl) substituted by an imidazolium moiety. In some embodiments, the carbene is methyl substituted by an imidazolium moiety. In some embodiments, a linker comprises any of these moieties. For example, a linker can be an alkyl (e.g., $C_1$, $C_2$, $C_3$, $C_4$, $C_5$ or $C_6$ alkyl), heteroalkyl, aryl or a heteroaryl that is substituted by any of these moieties.

In exemplary embodiments, a linker is an N-containing moiety. Various useful N-containing moieties include amine (Inorganica Chimica Acta, 2005, 358, 2327-2331), isonitrile (Organometallics, 1994, 13: 760-762), bis(pyrazol-1-yl) methane (Dalton Trans., 2004, 929-932, for example of a complex with Pd—similar complexes are possible with Ir), pyridine (Dalton Trans., 2003, 2680-2685 describing example of pyridine-gold complex—another noble metal like Ir), bipyridine (Inorganic Chemistry, 2008, 47(12): 5099-5106, describing calixarene-based bipyridine complexes involving platinum—another noble metal like Ir as well as Inorganica Chimica Acta, 1989, 165: 51-64 describing bipyridine complex involving gold—another noble metal like Ir), terpyridine (see J. Am. Chem. Soc. 1999, 121: 5009-5016 for example of iridium terpyridine complex), tetramethylethylinediamine (TMEDA) (Inorganic Chemistry, 2003, 42(11): 3650-61 for Pd complex with TMEDA—similar complexes are anticipated for iridium metal), and 1-10-phenanthroline (see Inorganic Chemistry, 2003, 42(11): 3650-61 for Pd complex with 1-10-phenanthroline—similar complexes are anticipated for iridium metal). Other N-containing moieties include amide, amine, amine oxide, nitroso, nitro, carbamate and pyrazole. In some embodiments, a linker comprises any of these moieties. For example, a linker can be an alkyl (e.g., $C_1$, $C_2$, $C_3$, $C_4$, $C_5$ or $C_6$ alkyl), heteroalkyl, aryl or a heteroaryl that is substituted by any of these moieties.

In exemplary embodiments, a linker is an O-containing moiety. Various useful O-containing moieties include alkoxide (Dalton Trans., 2004, 929-932 for example of a complex with Pd—similar complexes are possible with Ir), hydroxide (Inorganic Chemistry, 2003, 42(11): 3650-61 for example of hydroxide complex of Pd—similar complexes are possible for Ir), phenoxide (phenoxy would be native to all calixarene lower-rim ROH groups as a ligand), acetylacetonate (acac) (Polyhedron, 2000, 19: 1097-1103), carboxylate (Inorg. Chem. 1993, 32: 5201-5205 for carboxylate-Ir complex and Dalton Trans. 2003, 2680-2685 and Verlag der Zeitschrift fur Naturforschung, 2002, 57b: 605-609 describing example of carboxylate-gold complex—another noble metal like Ir), carbon dioxide and carbonate (J. Am. Chem. Soc. 1989, 111: 6459-6461). Other O-containing moieties include peroxo, ester and ether. In some embodiments, a linker comprises any of these moieties. For example, a linker can be an alkyl (e.g., $C_1$, $C_2$, $C_3$, $C_4$, $C_5$ or $C_6$ alkyl), heteroalkyl, aryl or a heteroaryl that is substituted by any of these moieties.

In some embodiments, the linker is a moiety selected from alkyl and heteroalkyl, which is optionally substituted with one or more alkyl group substituents, as described herein, in addition to the coordinating atom. In some embodiments, the linker is substituted with a moiety selected from alcohol, sulfonic acid, phosphine, phenyl, imidazolium, carbene, phosphonate, phosphonic acid, phosphine oxide, thiol, sulfoxide, ketone, aldehyde, ester, ether, amine, quaternary ammonium, phosphonium, imine, amide, imide, imido, nitro, carboxylic acid, disulfide, carbonate, isocyanate, carbodiimide, carboalkoxy, carbamate, acetal, ketal, boronate, cyanohydrin, hydrazone, oxime, oxazole, oxazoline, oxalane, hydrazide, enamine, sulfone, sulfide, sulfenyl, halogen and a combination thereof.

In some embodiments, a ligand, e.g. a calixarene-related compound, is functionalized with one or more linker. In various embodiments, the linkers include one or more coordinating atom that is capable of coordinating to at least one metal atom. The linker-functionalized calixarene-related compounds can be prepared by art-recognized methods. For example, in various embodiments, the calixarene-related compound includes at least one phenol subunit. The phenol hydroxyl is deprotonated and the phenoxide ion is reacted with a linker precursor having a reactive functional group with reactivity complementary to that of the phenoxide ion, thereby functionalizing the phenol oxygen atom of the calixarene-related compound. As those of skill in the art will appreciate, reactive functional groups other than phenols can function as substituents on calixarene-related compounds and can serve as attachment points for linkers.

Exemplary reactive functional groups of use in forming linker-functionalized ligands (e.g. calixarene-related compounds) of the invention are set forth below.

In some embodiments, the core of a ligand and the linker are joined by reaction of a first reactive functional group on the ligand core and a second reactive functional group on a precursor of the linker. The reactive functional groups are of complementary reactivity, and they react to form a covalent link between two components compound.

Exemplary reactive functional groups can be located at any position on these precursors, e.g., an alkyl or heteroalkyl an aryl or heteroaryl nucleus or a substituent on an aryl or heteroaryl nucleus. Similarly, a reactive functional group is located at any position of an alkyl or heteroalkyl chain. In various embodiments, when the reactive group is attached to an alkyl (or heteroalkyl), or substituted alkyl (or heteroalkyl) chain, the reactive group is preferably located at a terminal position of the chain.

Reactive groups and classes of reactions useful in practicing the present invention are generally those that are well known in the art of bioconjugate chemistry. Currently favored classes of reactions available with reactive precursors of the oligomers of the invention are those which proceed under relatively mild conditions. These include, but are not limited to nucleophilic substitutions (e.g., reactions of amines and alcohols with acyl halides, active esters), electrophilic substitutions (e.g., enamine reactions) and additions to carbon-carbon and carbon-heteroatom multiple bonds (e.g., Michael reaction, Diels-Alder addition). These and other useful reactions are discussed in, for example, March, ADVANCED ORGANIC CHEMISTRY, 3rd Ed., John Wiley & Sons, New York, 1985; Hermanson, BIOCONJUGATE TECHNIQUES, Academic Press, San Diego, 1996; and Feeney et al., MODIFICATION OF PROTEINS; Advances in Chemistry Series, Vol. 198, American Chemical Society, Washington, D.C., 1982.

By way of example, reactive functional groups of use in the present invention include, but are not limited to olefins, acetylenes, alcohols, phenols, ethers, oxides, halides, aldehydes, ketones, carboxylic acids, esters, amides, cyanates, isocyanates, thiocyanates, isothiocyanates, amines, hydrazines, hydrazones, hydrazides, diazo, diazonium, nitro, nitriles, mercaptans, sulfides, disulfides, sulfoxides, sulfones, sulfonic acids, sulfinic acids, acetals, ketals, anhydrides, sulfates, sulfenic acids isonitriles, amidines, imides, imidates, nitrones, hydroxylamines, oximes, hydroxamic acids thiohydroxamic acids, allenes, ortho esters, sulfites, enamines, ynamines, ureas, pseudoureas, semicarbazides, carbodiimides, carbamates, imines, azides, azo compounds, azoxy compounds, and nitroso compounds. Reactive functional groups also include those used to prepare bioconjugates, e.g., N-hydroxysuccinimide esters, maleimides and the like. Methods to prepare each of these functional groups are well known in the art and their application to or modification for a particular purpose is within the ability of one of skill in the art (see, for example, Sandler and Karo, eds. ORGANIC FUNCTIONAL GROUP PREPARATIONS, Academic Press, San Diego, 1989).

Useful reactive functional group conversions include, for example:

(a) carboxyl groups which are readily converted to various derivatives including, but not limited to, active esters (e.g., N-hydroxysuccinimide esters, N-hydroxybenzotriazole esters, thioesters, p-nitrophenyl esters), acid halides, acyl imidazoles, alkyl, alkenyl, alkynyl and aromatic esters;
(b) hydroxyl groups, which can be converted to esters, ethers, halides, aldehydes, etc.
(c) haloalkyl groups, wherein the halide can be later displaced with a nucleophilic group such as, for example, an amine, a carboxylate anion, thiol anion, carbanion, or an alkoxide ion, thereby resulting in the covalent attachment of a new group at the site of the halogen atom;
(d) dienophile groups, which are capable of participating in Diels-Alder reactions such as, for example, maleimido groups;
(e) aldehyde or ketone groups, such that subsequent derivatization is possible via formation of carbonyl derivatives such as, for example, imines, hydrazones, semicarbazones or oximes, or via such mechanisms as Grignard addition or alkyllithium addition;
(f) sulfonyl halide groups for subsequent reaction with amines, for example, to form sulfonamides;
(g) thiol groups, which can be, for example, converted to disulfides or reacted with acyl halides;
(h) amine or sulfhydryl groups, which can be, for example, acylated, alkylated or oxidized;
(i) alkenes, which can undergo, for example, cycloadditions, acylation, Michael addition, etc;
(j) epoxides, which can react with, for example, amines and hydroxyl compounds; and
(k) phosphoramidites and other standard functional groups useful in nucleic acid synthesis.

The reactive functional groups can be chosen such that they do not participate in, or interfere with, the reactions necessary to assemble the oligomer of the invention. Alternatively, a reactive functional group can be protected from participating in the reaction by the presence of a protecting group. Those of skill in the art understand how to protect a particular functional group such that it does not interfere with a chosen set of reaction conditions. For examples of useful protecting groups, see, for example, Greene et al., PROTECTIVE GROUPS IN ORGANIC SYNTHESIS, John Wiley & Sons, New York, 1991.

An exemplary calixarene-like compound of use in the invention is:

in which $R^a$ and $R^b$ are independently selected from H, substituted or unsubstituted alkyl, substituted or unsubstituted heteroalkyl, substituted or unsubstituted aryl, substituted or unsubstituted heteroaryl and substituted or unsubstituted heterocycloalkyl. Z is an integer selected from 3, 4, 5, 6, 7 and 8.

Additional ligands include:

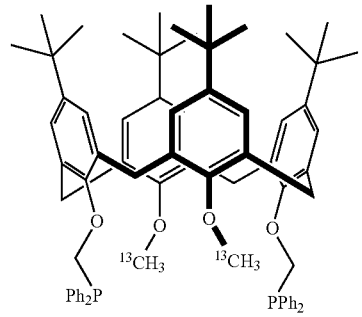

(2d)

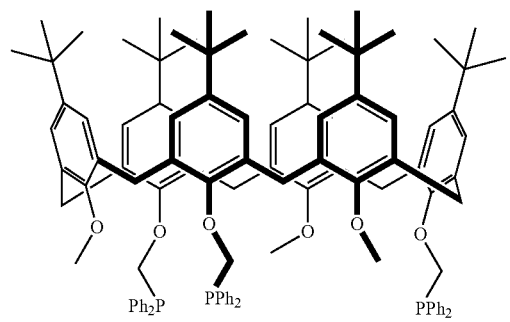

(3)

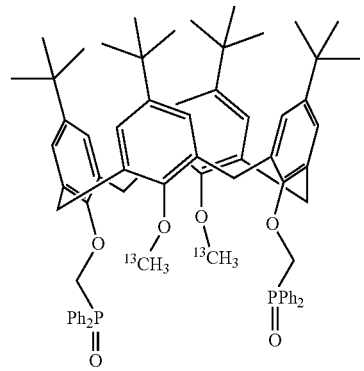

(4)

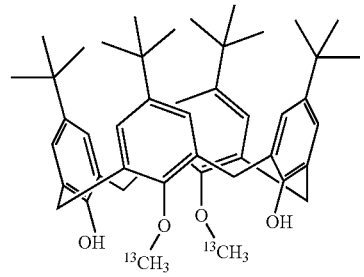

(5)

One or more ligands (e.g. calixarene-related compounds) can be coordinated to one or more metal colloids. Particularly useful metal colloids comprise a plurality of metal atoms selected from Ir, Pt, Pd and Au. An metal-containing colloid (e.g., gold colloid) composed of one or more noble metals and/or in conjunction with one or more non-noble metals can be used. In exemplary embodiments, a metal colloid comprises a plurality of Au atoms, for example in the form of $Au_x$, wherein x is selected from 2, 3, 4, 5, 6, 7, 8, 9, 10, 11, 12, 13, 14, 15, 16, 17, 18, 19 and 20. The metal colloid can be further substituted with a ligand, for example, with —CO or some other organic ligand.

In some embodiments, a plurality of the ligand (e.g. calixarene-related compound) is coordinated to a metal colloid. In some embodiments, 2, 3, 4 or 5 of the ligand (e.g. calixarene-related compound) are coordinated to the metal colloid. In some embodiments, a plurality of the metal colloid is coordinated to one or a plurality of the ligand (e.g. calixarene-related compound).

In some embodiments, a metal colloid is coordinatively saturated with respect to two or more ligands. The term "coordinatively saturated" refers to a metal colloid complexed to one or more ligands (e.g., calixarene-related moiety) such that any further ligand (e.g., a ligand of the same structure as that bound to the colloid) is not able to complex to the metal colloid. An exemplary mechanism for such exclusion of additional binding partners is steric hindrance. In various embodiments, a "coordinatively saturated" metal colloid is produced from a mixture in which there is a stoichiometric excess of the ligand in the mixture but the colloid does not complex all of the ligand in the mixture. In various embodiments, "coordinatively saturated" refers to a metal colloid bound to one or more ligand moieties, which, when contacted with a ligand moiety in a second complexation reaction under the same or different conditions as the first complexation reaction, does not complex additional ligand moieties.

The complexes described herein can be subjected to further conditions to provide for additional compounds. For example, a metal colloid can be formed by a process comprising performing a reaction on a complex described herein, wherein the reaction is selected from pyrolysis, thermal decomposition, oxidative decomposition and a combination thereof. Such metal colloids can have properties that make them suitable for the various reactions described herein, in particular catalysis.

Immobilization on a Substrate

The invention provides, as described herein, ligands (e.g. calixarene-related compounds), metal colloids and complexes that can be immobilized on a substrate. The ligand can be bound to the substrate through a linker or directly, i.e., without the need for derivatization of the ligand with a flexible tether. A metal colloid can be bound first to a substrate and subsequently complexed to a ligand or it can be bound to a ligand and subsequently bound to a substrate either through the ligand or through the metal colloid. Alternatively, the metal colloid can be contacted with a substrate to which a ligand is bound, thereby forming the immobilized complex. Methods of tethering ligands such as calixarenes to surfaces are generally known in the art. See, for example, US Publication 2005/0255332 A1 and U.S. Pat. No. 6,380,266 B1.

Exemplary substrate components include, but are not limited to metals, metallic or non-metallic oxides, glasses and polymers. A non-limiting list of useful substrates includes, silicon, tungsten, niobium, titanium, zirconium, manganese, vanadium, chromium, tantalum, aluminum, phosphorus, boron, rhodium, molybdenum, germanium, copper, platinum or iron. A preferred substrate is silica, most preferably silica possessing free hydroxyl groups. However, other inorganic oxide substrates may be used, preferably oxides of titanium, zirconium, germanium, tungsten, niobium, manganese, vanadium, chromium, tantalum, aluminum, phosphorus, boron rhodium, molybdenum, copper, platinum or iron, or another element that forms a stable aryloxide with the substrate. The substrate may be in any convenient physical form, such as gels, the interior or exterior pores of particles of various types, or planar surfaces such as wafers, chips, plates and the like, and surfaces or devices whose surfaces may be overlaid with a silica or other film. For silica substrates at least, due in part to the rigidity of the linkage between a calixarene or related compound and the substrate, this new method results in the highest reported site densities on a per gram of material basis for anchored calixarenes and/or related compounds. Metal oxides and zeolites (intact and delaminated) are exemplary substrates of use in conjunction with the compounds of the invention.

In an exemplary embodiment, the substrate is an inorganic oxide. Inorganic oxides of use in the present invention include, for example, $Cs_2O$, $Mg(OH)_2$, $TiO_2$, $ZrO_2$, $CeO_2$, $Y_2O_3$, $Cr_2O_3$, $Fe_2O_3$, $NiO$, $ZnO$, $Al_2O_3$, $SiO_2$ (glass), quartz, $In_2O_3$, $SnO_2$, $PbO_2$ and the like. The inorganic oxides can be utilized in a variety of physical forms such as films, supported powders, glasses, crystals and the like. A substrate can consist of a single inorganic oxide or a composite of more than one inorganic oxide. For example, a composite of inorganic oxides can have a layered structure (i.e., a second oxide deposited on a first oxide) or two or more oxides can be arranged in a contiguous non-layered structure. In addition, one or more oxides can be admixed as particles of various sizes and deposited on a support such as a glass or metal sheet. Further, a layer of one or more inorganic oxides can be intercalated between two other substrate layers (e.g., metal-oxide-metal, metal-oxide-crystal).

In these embodiments, an exemplary immobilization process includes contacting a ligand with a substrate that has been surface-modified by reaction with one or more polyhalides and/or polyalkoxides of an element capable of forming a stable aryloxide species with the substrate, or reacting the substrate with a ligand that has been previously modified or derivatized by reaction with said one or more polyhalides and/or polyalkoxides. In an alternate embodiment, the immobilization process includes reacting a polyhalide or polyalkoxide of one or more elements selected from silicon, tungsten, niobium, titanium, zirconium, manganese, vanadium, chromium, tantalum, aluminum, phosphorus, boron, rhodium, molybdenum, germanium, copper, platinum or iron, or another element that forms a stable aryloxide with the substrate, forming a modified substrate; and contacting the modified substrate with ligand so as to immobilize the ligand to the substrate through at least one phenolic oxygen linkage.

Inorganic crystals and inorganic glasses appropriate for substrate materials include, for example, LiF, NaF, NaCl, KBr, KI, $CaF_2$, $MgF_2$, $HgF_2$, BN, $AsS_3$, ZnS, $Si_3N_4$ and the like. The crystals and glasses can be prepared by art standard techniques. See, for example, Goodman, C. H. L., Crystal Growth Theory and Techniques, Plenum Press, New York 1974. Alternatively, the crystals can be purchased commercially (e.g., Fischer Scientific). The crystals can be the sole component of the substrate or they can be coated with one or more additional substrate components. Thus, it is within the scope of the present invention to utilize crystals coated with, for example one or more metal films or a metal film and an organic polymer. Additionally, a crystal can constitute a portion of a substrate which contacts another portion of the substrate made of a different material, or a different physical form (e.g., a glass) of the same material. Other useful substrate configurations utilizing inorganic crystals and/or glasses will be apparent to those of salt in the art.

Metals are also of use as substrates in the present invention. Exemplary metals of use in the present invention as substrates include, but are not limited to, gold, silver, platinum, palladium, nickel and copper. In one embodiment, more than one metal is used. The more than one metal can be present as an alloy or they can be formed into a layered "sandwich" structure, or they can be laterally adjacent to one another.

Organic polymers are a useful class of substrate materials. Organic polymers useful as substrates in the present invention include polymers which are permeable to gases, liquids and molecules in solution. Other useful polymers are those which are impermeable to one or more of these same classes of compounds.

Organic polymers that form useful substrates include, for example, polyalkenes (e.g., polyethylene, polyisobutene, polybutadiene), polyacrylics (e.g., polyacrylate, polymethyl methacrylate, polycyanoacrylate), polyvinyls (e.g., polyvinyl alcohol, polyvinyl acetate, polyvinyl butyral, polyvinyl chloride), polystyrenes, polycarbonates, polyesters, polyurethanes, polyamides, polyimides, polysulfone, polysiloxanes, polyheterocycles, cellulose derivative (e.g., methyl cellulose, cellulose acetate, nitrocellulose), polysilanes, fluorinated polymers, epoxies, polyethers and phenolic resins. See, Cognard, J. ALIGNMENT OF NEMATIC LIQUID CRYSTALS AND THEIR MIXTURES, in *Mol. Cryst. Liq. Cryst.* 1:1-74 (1982). Presently preferred organic polymers include polydimethylsiloxane, polyethylene, polyacrylonitrile, cellulosic materials, polycarbonates and polyvinyl pyridinium.

The surface of a substrate of use in practicing the present invention can be smooth, rough and/or patterned. The surface can be engineered by the use of mechanical and/or chemical techniques. For example, the surface can be roughened or patterned by rubbing, etching, grooving, stretching, and the oblique deposition of metal films. The substrate can be patterned using techniques such as photolithography (Kleinfield et al., *J. Neurosci.* 8: 4098-120 (1998)), photoetching, chemical etching and microcontact printing (Kumar et al., *Langmuir* 10: 1498-511 (1994)). Other techniques for forming patterns on a substrate will be readily apparent to those of skill in the art.

The size and complexity of the pattern on the substrate is controlled by the resolution of the technique utilized and the purpose for which the pattern is intended. For example, using microcontact printing, features as small as 200 nm have been layered onto a substrate. See, Xia et al., *J. Am. Chem. Soc.* 117: 3274-75 (1995). Similarly, using photolithography, patterns with features as small as 1 μm have been produced. See, Hickman et al., *J. Vac. Sci. Technol.* 12: 607-16 (1994). Patterns that are useful in the present invention include those which comprise features such as wells, enclosures, partitions, recesses, inlets, outlets, channels, troughs, diffraction gratings and the like.

Using recognized techniques, substrates with patterns having regions of different chemical characteristics can be produced. Thus, for example, an array of adjacent, isolated features is created by varying the hydrophobicity/hydrophilicity, charge or other chemical characteristic of a pattern constituent. For example, hydrophilic compounds can be confined to individual hydrophilic features by patterning "walls" between the adjacent features using hydrophobic materials. Similarly, positively or negatively charged compounds can be confined to features having "walls" made of compounds with charges similar to those of the confined compounds. Similar substrate configurations are also accessible through microprinting a layer with the desired characteristics directly onto the substrate. See, Mrkish, et al., *Ann. Rev. Biophys. Biomol. Struct.* 25:55-78 (1996).

In various exemplary embodiments, the substrate is a zeolite or zeolite-like material. In one embodiment, the complexes of the invention are attached to a substrate by the surface functionalization of ITQ-2-type layered and zeolitic materials. An exemplary attachment is effected via ammoniation of the substrate. The invention provides such functionalized materials covalently-bound to ligands. In an exemplary embodiment, the functionalized surfaces will are used to nucleate and grow metal colloids on the surface of the material.

Ligands can be immobilized onto silica or other substrates as mentioned above without the need for synthetic derivatization with flexible linker groups that contain carbon, sulfur, etc. The resulting immobilized ligands and related compounds possess lipophilic cavities that can be accessed with gas physisorption experiments at cryogenic temperatures, as well as with neutral organic molecules at room temperature. Phenol and nitrobenzene adsorb reversibly from aqueous solution within this class of materials.

The resulting immobilized ligands and related compounds can entrap moieties including small molecules, proteins and ions (both cations and anions), and thus may be used for a number of functions, including in membranes, as selective catalysts, in specific adsorption or trapping of a species in a gas stream, in high-pressure liquid chromatography or gas chromatographic columns, and in chemical sensing. See, Katz et al., *Langmuir* 22: 4004-4014 (2006).

In various embodiments, the invention provides a method for the immobilization of a ligand (e.g., a calixarene-related compound) to a substrate by one of two means: (a) by contacting the ligand with a substrate that has been surface modified by reaction with a polyhalide or polyalkoxide as described below, or (b) by reaction of a substrate with a ligand that has been previously modified or derivatized by reaction with such a polyhalide or polyalkoxide.

One exemplary embodiment of this invention is the use of a silicon halide or alkoxide to modify a silica substrate and immobilize the ligand to the substrate via silica-oxygen bonds. However, as previously discussed, the substrate and/or the modifying agent may be an oxide, polyhalide or polyalkoxide of another element. The modifying agents may contain the same element as the primary element on the substrate (e.g. aluminum alkoxides used to modify an aluminum oxide substrate) or they may contain different elements (e.g. silicon tetrahalide used to modify an aluminum oxide substrate). When alkoxides are used in this invention, the substrate-modifying element of the alkoxide (silicon, another non-metal, or a metal) becomes bonded directly to phenolic oxygen atoms of the ligand, and an alcohol corresponding to the alkoxide is split off. Preferred alkoxides used as substrate modifiers in this invention include methoxides, ethoxides and other alkoxides having up to four carbon atoms per alkoxide group.

In another preferred embodiment, a halide or alkoxide of a transition metal or a polyvalent non-metal other than silicon is used to immobilize a ligand (e.g. calixarene or a calixarene-related compound) to a substrate. The metal or non-metal may be any that forms a stable aryloxide with the substrate, including but not limited to silicon, tungsten, niobium, titanium, zirconium, iron, manganese, vanadium, chromium, tantalum, aluminum, phosphorus, boron, rhodium, molybdenum, germanium, copper, platinum or iron.

Synthesis

The ligands (e.g. calixarene-related compounds), metal colloids and complexes thereof described herein can be synthesized by methods within the abilities of those of skill in the art. Exemplary syntheses are set forth herein, however, it will be apparent to those of skill that additional practical synthetic pathways exist and can be devised.

Methods of making gold colloids of the invention are exemplified by reference to the schemes set forth below, showing the synthesis of precursors:

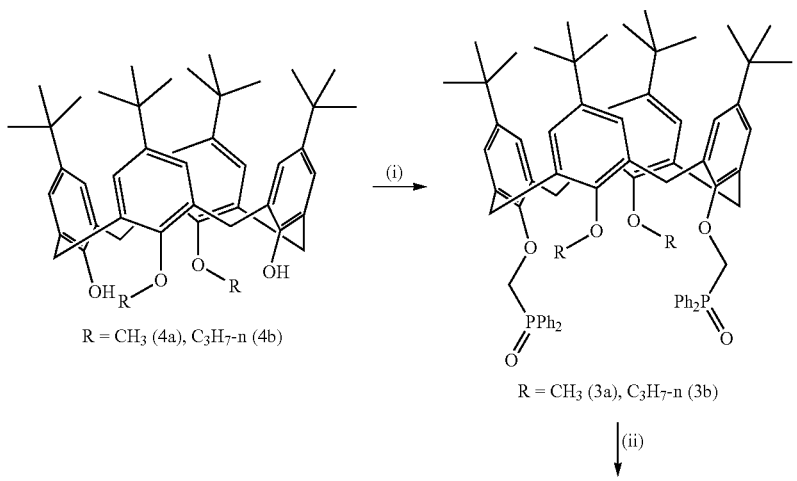
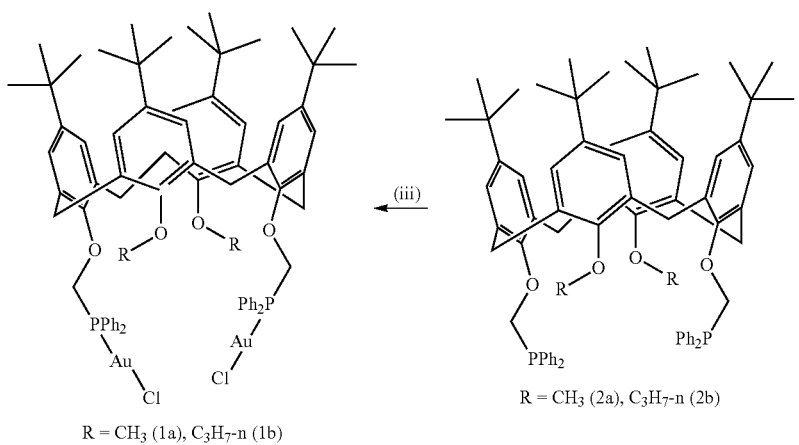
(i) Ph₂(O)CH₂OTs, NaH, THF/DMF
(ii) PhSiH₃, toluene
(iii) AuSMe₂Cl, CH₂Cl₂
(a)
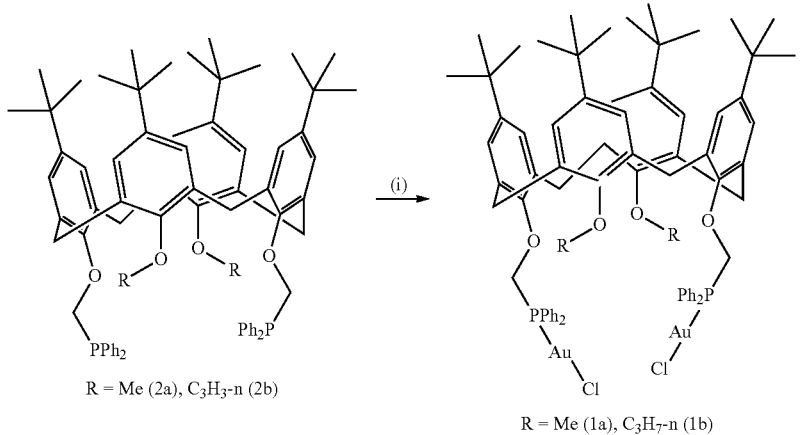

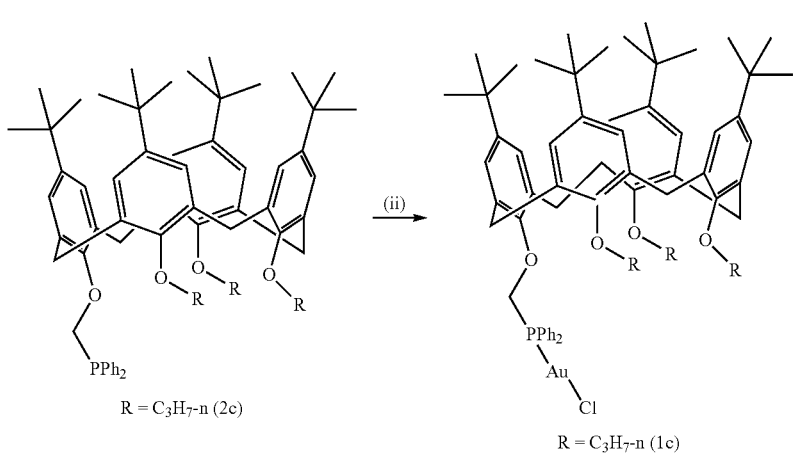

(b)

R = C₃H₇-n (2c)

R = C₃H₇-n (1c)

The precursor 1d can be made using similar schemes with ligand 2d.

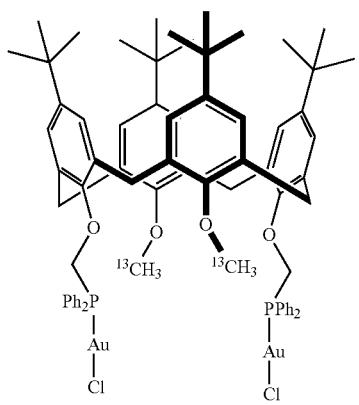

(1d)

Those of skill in the art will appreciate that the method set forth above is applicable to any metal salt. Exemplary metal salts of use in the present invention satisfy at least the criterion that the metal salt coordinate to a coordinating atom of the linker on the ligand to form a complex.

Thus, in one aspect, the invention provides methods of synthesizing a ligand-bound metal colloid. In one embodiment, the method comprises (a) contacting, in a solvent, a ligand with a metal salt under conditions appropriate to cause reaction between the ligand and the metal salt, wherein the ligand comprises a linker comprising a coordinating atom, thereby forming a metal-ligand precursor; and (b) contacting the metal-ligand precursor with a reductant, wherein the metal-ligand precursor, the reductant or both are sparingly soluble in the solvent, thereby synthesizing the complex.

In some embodiments, the metal salt is a metal halide salt. In exemplary embodiments, the metal salt comprises a noble metal atom, such as gold.

In some embodiments, the solvent is an alcohol. In exemplary embodiments, the solvent is ethanol.

In some embodiments, the ligand is one of the ligands of a complex disclosed herein, or is a ligand disclosed herein. In exemplary embodiments, the ligand is a calixarene-related compound.

In exemplary embodiments, the ligand is a calixarene-related compound selected from a calixarene phosphine, a calixarene phosphinite, a calixarene phosphonite, a calixarene phosphite and a calixarene phosphoramidite.

In exemplary embodiments, the ligand is a calixarene carbene.

In exemplary embodiments, the ligand is a calixarene-related compound selected from a calixarene pyridine, a calixarene bipyridine, a calixarene terpyridine, a calixarene pyrazole, a calixarene phenanthroline, a calixarene isonitrile, a calixarene amide, a calixarene amine, a calixarene amine oxide, a calixarene nitroso, a calixarene nitro and a calixarene carbamate.

In exemplary embodiments, the ligand is a calixarene-related compound selected from a calixarene carboxylate, a calixarene alkoxide, a calixarene peroxo, a calixarene phenoxide, a calixarene ester, a calixarene ether, a calixarene acetylacetonate and a calixarene carbonate.

In some embodiments, the calixarene-related compound is the calixarene-related compound of a complex described herein or a calixarene-related compound described herein The schemes above are directed to a compound in which a ligand (calixarene-related compound) is a mono-dentate moiety. As will be appreciated, linkers having higher denticity are also of use. When a bidentate calixarene-related compound is utilized as a ligand, the colloids of this compound and others can be prepared in one of several geometries. For example, diradial bridging, axial-radial bridging, diaxial bridging, axial-radial bridging.

Uses

In one aspect, the invention provides processes that utilize the metal colloids or metal complexes disclosed herein. For a review of methods of using gold colloids applicable to the materials of the invention, see Mallouk et al., *J. Am. Chem. Soc.*, 2009, 131: 7938-7939.

In exemplary embodiments, the materials of the invention are of use in methods of ultratrace detection (including for cancer biomarker detection (d) above; DNA detection (See, L. H. Wang et al. in *Gold Bulletin* volume 41 pages 37-41 (2008) and Q. Q. Zhang et al. in *Nanoscale Research Letters* volume 4 pages 216-220 (2009)), imaging (where gold colloid conjugate can be used as a biomolecular marker), drug delivery (See C. R. Patra in Journal of Biomedical Nanotechnology volume 4 pages 99-132 (2008 and reference (b) above) and general biomedical applications in P. Perriat et al. in *Annales De Chimie-Science Des Materiaux* volume 31 pages 351-367 (2006), DNA/RNA delivery, therapy (for antisense oligonucleotide-modified gold colloid agents, See a (viii) above), and in nanofabrication (where small size is used to make a high capacity for information storage See, T. Bjornholm in Current Opinion in Colloid & Interface Science volume 14 pages 126-134 (2009) and T. H. LaBean in Materials Today volume 12 pages 24-32 (2009).

An additional application of metal colloids possessing accessible areas according to the invention is metal catalysis ((a) Goodman, W., Chen, M. Catalytically active gold: From colloids to ultrathin films. *Acc. Chem. Res.*, 39, 739-746 (2006). (b) Choudhary, T. V., Goodman, D. W. Oxidation catalysis by supported gold nano-clusters. *Top. Catal.* 21, 25-34 (2002). (c) Turner, M., Golovko, V. B., Vaughan, O. P. H., Abdulkin, P., Berenguer-Murcia, A., Tikhov, M. S., Johnson, B. F. G., Lambert, R. M. Selective oxidation with dioxygen by gold colloid catalysts derived from 55-atom clusters. *Nature*, 454, 981-U31 (2008). (d) Roldan, A., Gonzalez, S., Ricart, J. M., Illas, F. Critical Size for O-2 Dissociation by Au Colloids. *Chem. Phys. Chem.*, 10, 348 (2009) (e) Lee, S., Molina, L. M., Lopez, M. J., Alonso, J. A., Hammer, B., Lee, B., Seiferi, S., Winans, R. E., Elam, J. W., Pellin, M. J., Vajda, S. Selective Propene Epoxidation on Immobilized Au6-10 Clusters: The Effect of Hydrogen and Water on Activity and Selectivity. *Angew. Chem., Int. Ed.*, 48, 1467-1471 (2009). (f) Hughes, M. D., Xu, Y.-J., Jenkins, P., McMorn, P., Landon, P., Enache, D. I., Carley, A. F., Attard, G. A., Hutchings, G. J., King, F., Stitt, E. H., Johnston, P., Griffin, K., Kiely, C. J. Tunable gold catalysts for selective hydrocarbon oxidation under mild conditions. *Nature*, 437, 1132-1135 (2005). (g) Byrne, M. Electrocatalytic reduction of ethylene on gold and other substrates. *J. Chem. Soc. Faraday Transactions I*, 68, 1898 (1972). (h) Bond, G. C., Sermon, P. A., Webb, G., Buchanan, D. A., Wells, P. B. Hydrogenation over supported gold catalysts. *J. Chem. Soc. Chem. Commun.*, 44-45 (1973). (i) Sermon, P. A., Bond, G. C., Wells, P. B. Hydrogenation of alkenes over supported gold. *J. Chem. Soc. Faraday Transactions I*, 75, 385-394 (1979). (j) Naito, S., Tanimoto, M. Mechanism of deuterium addition and exchange of propene over silica-supported gold and silver catalysts. *J. Chem. Soc. Faraday Transactions I*, 84, 4115-4124 (1988)).

Haruta and others have shown that it is small gold colloids that are required for catalysis whose properties are different from that of the bulk (See, A. Haruta in Chemical Record volume 3 pages 75-87 (2003) for need for particles less than 300 atoms of gold). Gates et al. have underlined the critical problem with small metal colloids is lack of stability (See Gates et al., *Nature* 372: 346 (1994)). There is also a critical need for accessibility on gold colloids for catalysis, as has been stressed in the literature (See, C. L. Friend et al. in J. Phys. Chem. C volume 113 pages 3232-3238 (2009) and M. Bäumer et al. in Chem Phys Chem volume 7 pages 1906-1908 (2006)). The present invention provides stable small gold colloids with gold atom (gold surface area) accessibility.

The metal colloids can also be conjugated to binding partners for various applications including, but not limited to, nucleic acids, polypeptides, functional and structural proteins (e.g., enzymes, antibodies, antibody fragments), carbohydrates, natural and synthetic polymers, solid supports, small molecules (e.g., drugs, pesticides, agents of war) and lipids.

Conjugation can be performed using a ligand (e.g., calixarene) directly as in: (i) *Bioconjugate Chemistry* volume 19 pages 751-758 by C. Geraci et al.; (ii) C. Geraci et al. in *Langmuir* volume 24 pages 6194-6200; (iii) C. Geraci et al. in *Tetrahedron* volume 63 pages 10758-10763, or it can be performed by attaching molecule to gold surface typically performed through thiol (sulfhydryl) linkage (or combinations of both methods). Examples of the latter include gold conjugation to:

(a) Thiolated single-stranded DNA is commercially available from Integrated DNA Technologies (Coralville, Iowa) and Fidelity Systems (Gaithersburg, Md.) and can also be synthesized using standard equipment such as a Expedite 8909 Nucleotide Synthesis System using standard solid-phase synthesis and reagents (Glen Research, Sterling, Va.). This type of thiolated DNA is used extensively for DNA conjugation to gold. See (i) Alivisatos et al. in *Nano Letters* volume 8 pages 1202-1206 (2008); (ii) C. A. Mirkin et al. in *Nano Letters* volume 7 pages 3818-3821 (2007); (iii) Suzuki et al. in *J. Am. Chem. Soc.* volume 131 pages 7518-7519 (2009).; (iv) Alivisatos et al. in *J. Am. Chem. Soc.* volume 130 pages 9598-9605 (2008).; (v) Dubertret et al. in *Nature Biotechnology* volume 19 pages 365-370 (2001); (vi) A. P. Alivisatos et al. in *Nature* volume 382 pages 609-611 (1996); (vii) C. A. Mirkin et al. in *Nature* volume 382 pages 607-609 (1996). Related systems are locked nucleic acid-colloid conjugates (viii) See C. A. Mirkin et al. in *Chem Bio Chem* volume 8 pages 1230-1232 (2007);

(b) Ethidium interacalator using an ethidium thiolate (R. W. Murray et al. in *Analytical Chemistry* volume 74 pages 4320-4327 (2002);

(c) RNA through a sulfhydryl link See C. A. Mirkin et al. in *J. Am. Chem. Soc.* volume 131 pages 2072-2073 (2009);

(d) Peptides that have been evolved to bind to gold See N. L. Rosi et al. in *J. Am. Chem. Soc.* volume 130 pages 13555-13557 (2008);

(e) HIV therapeutics that become more effective via multivalency have been attached employing a mercaptobenzoic acid linker See C. Melander et al. in *J. Am. Chem. Soc.* volume 130 pages 6896-6897 (2008); and (f) Glucose oxidase See C. Sun et al. in Sensors and Actuators B volume 109 pages 367-374 (2005).

The metal colloids and complexes disclosed herein can be used to catalyze processes including those known in the art to be catalyzed by metal-mediated processes, such as olefin rearrangements, hydroformylation of olefins, and cycloaddition of terminal alkanes, as well as other processes such as oxidation processes, hydrogenation processes, and acid-catalyzed reactions. In an exemplary embodiment, the composition of the invention is useful as a hydroprocessing catalyst. Other processes in which the compounds and complexes of the invention find use include propane hydrogenolysis, CO hydrogenation, toluene hydrogenation, methanation, intramolecular hydroamination, asymmetric isomerization of primary allylic alcohols, allylic amination, hydroamination, hydrothiolation, C—H bond arylation of heteroarenes using iodoarenes, [2+2+2] cycloadditions, and carbonylation, methane hydroxylation, and naphthenic ring opening (See U.S. Pat. No. 5,763,731). Still further processes include hydrogenation reactions, such as of $\alpha,\beta$-unsaturated aldehydes; cyclization reactions, such as of terpenoids (e.g., transformation of citronellal to menthol); ring opening reactions, such as of cycloalkyls (e.g. conversion of methylcyclohexane to dimethylpentane, or naphthenic ring opening); steam catalytic reforming of NO and hydroconversion reactions, such as of cycloalkyls (e.g. cyclohexene). (See Vuori et al., Catal. Lett., 2009, 131: 7-15 and U.S. Pat. No. 5,763,731) Generally useful reactions include oxidations and reductions performed on an organic molecule, e.g. alkyl, heteroalkyl, cycloalkyl, heterocycloalkyl, aryl or heteroaryl, any of which is optionally substituted.

Accordingly, in one embodiment, a catalytic process comprises reducing an organic molecule by contacting the organic molecule with (a) a complex or a metal colloid disclosed herein and (b) a reductant. In some embodiments, the organic molecule is an unsaturated molecule. In some embodiments, the organic molecule is a substituted or unsubstituted alkyl (for example, an unsaturated alkyl, such as an unsaturated $C_1$, $C_2$, $C_3$, $C_4$, $C_5$ or $C_6$ alkyl). In some embodiments, the reducing step comprises hydrogenation, for example, using $H_2$ as a reductant.

In one embodiment, a catalytic process comprises oxidizing an organic molecule by contacting the organic molecule with (a) a complex or a metal colloid disclosed herein and (b) an oxidant. In some embodiments, the oxidizing step comprises hydroxylation.

EXAMPLES

Example 1

Synthesis of Calixphosphine Ligands

Di-alkylated calix[4]arenes 4a,b are used as starting precursors for calixarene phosphorylation. Diphenylphosphorylmethyl-4-methylbenzenesulfonate is used due to its previously described efficiency for synthesis of calixarenes possessing more than one phosphoryl group. Calixarenephosphine oxides 3a,b are synthesized by refluxing 4a,b with $Ph_2POCH_2Ts$ in the presence of a slight excess of sodium hydride in THF/DMF (10/1 v/v) mixture for 48 h, according to a previously published procedure. Calixarene phosphine oxides 3a,b adopt a cone conformation which is confirmed by the presence of an AB spin system of methylene bridge hydrogens and by the presence of a single resonance in the $^{31}P$ NMR spectrum. Synthesis of calix[4]arene phosphines 2a,b has been performed by heating calixarene-phosphinoxides 3a,b with a large excess of phenylsilane in toluene at 105° C. for 48 h. Dimethoxy-calixphosphine 2a exists as a mixture of conformers having free rotation of methoxylated phenolic rings through macrocyclic ring at room temperature. This conformational behavior causes broad resonances in $^1H$ NMR and two resonances in $^{31}P$ NMR at −21.10 and −21.96 ppm, which are characteristic of phosphines. The presence of bulky propoxy groups on the lower rim of calix[4]arenes prevents ring inversion, and endows conformational rigidity to cone shaped calix[4]arene-phosphine 2b.

Experimental Details

Materials.

All compounds were handled under dry nitrogen atmosphere. Anhydrous toluene, THF and DMF was purchased from Aldrich; starting p-tert-butylcalix[4]arene and all others reagents were of analytical grade and used as received. 2-Naphthalenethiol (2NT) was purchased from Aldrich and used as received. Calixarenes 4a, 4b, and 3a have been synthesized following a literature procedure. Dijkstra P J et al., J. Am. Chem. Soc., 1989, 111: 7567-7575; Gutsche C D et al., Tetrahedron, 1983, 38: 409-413; and Dieleman C B et al., J. Organometal. Chem., 1997, 545-546: 461-473. Diphenylphosphorylmethylenetosylate has been prepared according to published procedure. Marmor R S and Seyferth D, J. Org. Chem., 1969, 34: 748-749; and Wegener W, Zeitschrift Chem., 1971, 11: 262. $^1H$, $^{13}C$, and $^{31}P$ NMR spectra were recorded in $CDCl_3$ (293K) either on a Bruker AV-300 (300 MHz) instrument or on a AVB-400 (400 MHz) instrument at the UC Berkeley NMR Facility. $^1H$ NMR spectra are referenced to residual $CHCl_3$ (7.260 ppm), and $^{31}P$ NMR spectra are referenced relative to trimethyl phosphate. Analytical thin-layer chromatography is performed on precoated silica gel plates (0.25 mm, 60E-254, Selecto), and silica gel (Selecto 60) is used for column chromatography. FAB-MS spectra are recorded using O-nitrophenyl octyl ether (NPOE) or m-nitrobenzyl alcohol (NBA) as matrix at the UC Berkeley Mass Spectrometry Facility. All melting points are uncorrected.

General Procedure for the Synthesis of Calixarene-Phosphinoxides 3b

A mixture of calixarene 1b (0.35 mmol) and sodium hydride (0.78 mmol) in THF/DMF (10/1 v/v) is refluxed for 2 h. To the resulting yellow solution, $Ph_2P(O)CH_2OTs$ (0.78 mmol) is added. The reaction mixture is refluxed for 48 h. Excess sodium hydride is quenched with ~1.0 mL of methanol, and solvent is evaporated. The residue is dissolved in chloroform and washed with water twice. The organic phase is dried over $MgSO_4$ and evaporated to dryness.

5,11,17,23-Tetra-tert-butyl-25,26-bis(diphenylphosphinoylmethyleneoxy)-27,28-dipropoxy-calix[4]arene (cone) (3b)

Column chromatography with $CH_2Cl_2$/ethylacetate (1:0.5) affords 53% yield of white powder, $R_f$ 0.4: mp 134-138° C.; $^1H$ NMR (400 MHz, $CDCl_3$) δ 7.74-7.81 (m, 8H, $C_6H_5PO$), 7.40-7.46 (m, 6H, $C_6H_5PO$), 7.00 (s, 4H, ArH-m), 6.32 (s, 4H, ArH-m), 4.63, 4.64 (d, 4H, $^2J_{PH}$=2.4 Hz, $CH_2P$), 4.30 (d, $^2J$=12.8 Hz, 4H, $ArCH_2Ar$), 3.64 (m, 4H, $OCH_2$), 2.98 (d, $^2J$=12.8 Hz, 4H, $ArCH_2Ar$), 1.75 (m, 4H, $CH_2CH_3$), 1.29 (s, 18H, $C(CH_3)_3$), 0.79 (s, 18H, $C(CH_3)_3$), 0.72 (t, $^3J$=7.2 Hz, 6H, $CH_2CH_3$); $^{13}C$ NMR δ 154.52, 153.97, 144.51, 144.30, 135.22, 131.92, 131.53, 131.43, 131.27, 131.18, 130.98, 128.85, 128.73, 128.62, 128.50, 128.16, 125.51, 124.64, 73.49, 72.68, 33.96, 33.53, 31.68, 31.24, 31.10, 23.04, 10.39; $^{31}P$ NMR δ 24.81; Anal. Calcd for $C_{76}H_{90}O_6P_2$: C, 78.59; H, 7.81. Found: C, 78.41%; H, 7.60; FAB MS (+) m/z 1161.

General Procedure for the Synthesis of Calixarene-Phosphines 2a,b

A solution of calixarenes 3a, b (7.0 mmol) and $PhSiH_3$ (30 eq. excess for each $POPh_2$) in 15 mL of toluene is heated at 105° C. for 48 h. The progress of the reaction is monitored with $^{31}P$ NMR spectroscopy. The reaction mixture was evaporated to dryness in vacuo for 4 hours (0.05 mm Hg). The oily residue is subjected to purification.

5,11,17,23-Tetra-tert-butyl-25,26-bis[diphenylphosphinomethyleneoxy]-27,28-dimethoxycalix[4]arene (mixture of conformers) (2a)

Crystallization from ethanol/DCM (20/1) produces a white solid in 52% yield; mp 123-131° C.; $^1H$ NMR δ 7.33-7.55 (m, 40H, $C_6H_5P$), 7.09 (s, 6H, ArH), 7.00 (s, 2H, ArH), 6.91 (s, 2H, ArH), 6.41 (s, 2H, ArH), 6.38 (s, 4H, ArH), 4.56 (m, 8H, $OCH_2$+$ArCH_2Ar$), 4.25 (d, 4H, $^2J$=13.6 Hz, $ArCH_2Ar$), 3.60-4.00 (m, 6H, $ArCH_2Ar$), 3.52 (s, 6H, $OCH_3$), 3.31 (s, 3H, $OCH_3$), 3.09 (d, 4H, $^2J$=13.6 Hz, $ArCH_2Ar$), 2.98 (m, 2H, $ArCH_2Ar$), 2.69 (s, 3H, $OCH_3$), 1.33, 1.02, 0.78 (three s, 72H, $C(CH_3)_3$); $^{13}C$ NMR δ 155.77, 145.09, 136.83, 136.70, 135.94, 133.23, 133.05, 131.58, 128.90, 128.54, 128.48, 125.30, 124.36, 60.56, 38.00, 34.16, 33.60, 31.76, 31.57, 31.32, 31.10; $^{31}P$ NMR 6-21.12, −21.99; Anal. Calcd for $C_{72}H_{82}O_4P_2$: C, 80.57; H, 7.70. Found: C, 80.46; H, 7.59; FAB MS (+) m/z 1073.

5,11,17,23-Tetra-tert-butyl-25,26-bis(diphenylphosphinomethyleneoxy)-27,28-dipropoxy-calix[4]arene (cone) (2b)

Flash chromatography with $CH_2Cl_2$ affords 41% yield of white powder, $R_f$ 0.9; mp 128-132° C.; $^1H$ NMR δ 7.47 (m, 8H, $C_6H_5P$), 7.32 (m, 12H, $C_6H_5P$), 7.00 (s, 4H, ArH), 6.49 (s, 4H, ArH), 4.70 (d, 4H, $^2J_{PH}$=2.4 Hz, $CH_2P$), 4.38 (d, 4H, $^2J$=12.4 Hz, $ArCH_2Ar$), 3.73 (m, 4H, $OCH_2$), 3.09 (d, 4H, $^2J$=12.4 Hz, $ArCH_2Ar$), 1.94 (m, 4H, $CH_2CH_3$), 1.27 (s, 18H, $C(CH_3)_3$), 0.89 (s, 18H, $C(CH_3)_3$), 0.75 (t, 6H, $^3J$=7.2 Hz, $CH_2CH_3$); $^{13}C$ NMR δ154.56, 153.59, 153.52, 144.43, 144.34, 136.95, 136.82, 135.11, 134.05, 133.18, 133.06, 132.87, 132.11, 128.66, 128.43, 128.36, 128.09, 125.25, 124.58, 33.95, 33.63, 31.65, 31.53, 32.20, 23.27, 10.06; $^{31}P$ NMR δ −22.28; Anal. Calcd for $C_{76}H_{90}O_4P_2$: C, 80.82; H, 8.03. Found: C, 80.67; H, 7.64; FAB MS m/z (+) 1129.

Synthesis of Gold Precursors

Au(I)-calixarene complexes tert-butyl-calix[4]-$(OR)_{4-x}$-$(OCH_2PPh_2AuCl)_x$ (x=2, R=$CH_3$ (1a) $C_3H_7$-n (1b); x=1, R=$C_3H_7$-n (1c)) are synthesized via replacement of sulfide group in $Au(SMe_2)Cl$ by a stoichiometric amount of phosphine. Such a substitution reaction has been used previously for Au(I)-calixarene phosphine complex synthesis. Complexes 1a, 1b, and 1c are isolated in pure form via crystallization from $CH_2Cl_2$/hexane, and all consist of purely cone conformer as determined using $^{31}P$ and $^1H$ NMR spectroscopies in $CDCl_3$. Preference for the cone over possible partial cone and 1,3-alternate conformers in complex 1a can be observed by the following data. All three conformers are present via $^1H$ NMR spectroscopy (ratio of partial cone to 1,3-alternate to cone of 32:20:48) for the free (uncoordinated) methoxy-substituted calixarene ligand 2a in $CDCl_3$ solution at −57° C. The observed exclusivity of the cone conformation following gold complexation in 1a is most likely because it is the only conformer that circumvents juxtaposing bulky tert-butyl and gold substituents. This speaks to the sterically demanding nature of gold atoms within complexes 1a-c, and has further repercussions on the organization of gold as discussed below.

In the cases of 1a, 1b and 1d, the corresponding ligands 2a, 2b or 2d are each separately reacted with two equivalents of $Au(SMe_2)Cl$ in $CH_2Cl_2$ for 20 minutes at room temperature in the dark. The cloudy mixtures are filtered to obtain a clear solution which is evaporated to a white powder. Crystals of 1a, 1b and 1d are obtained by slow evaporation in 50:50 hexane:$CH_2Cl_2$ mixtures. 1c is synthesized following the same procedure using 2c and 1 equivalent of $Au(SMe_2)Cl$. All complexes are white powders that yield optically clear colorless solutions when dissolved in dichloromethane, i.e., no solids are visible.

Complexes 1a, 1b, and 1c are characterized via single-crystal X-ray diffraction in FIG. 1 (selected bond lengths and angles in Table 2). Comparison of the solid-state structures of 1a and 1b highlights a significant difference in gold atom organization with respect to the calixarene lower-rim oxygen plane. Both gold atoms are located on the same side of this plane in the structure of 1a. Consistent with σ (C—H)-π interactions between both phenyl groups of the coordinated $PPh_2$ and methoxy lower-rim substituents, the pair of distances between the aromatic ring (centroid) and the C of the methoxy substituent found in the structure of 1a is 3.5 Å. In contrast, in the structure of 1b, the sterically unfavorable interaction of bulky gold and lower-rim propoxy groups prevents both gold atoms to be on the same side of the calixarene lower-rim oxygen plane. The steric role of the propoxy groups in defining the organization of $AuPPh_2Cl$ substituents described above is further elucidated with DFT B3LYP/LACV3P*+ calculations of 1a and 1b. These calculations demonstrate that the crystal structure conformation of 1b is at least 2.4 kcal/mol lower in electronic energy than the lowest energy conformer in which the two $AuPPh_2Cl$ units are on the same face of the plane defined by the calixarene lower rim oxygens, and predict that the population of conformers should be >99% in the form observed in the crystal structure.

Single Crystal Structures of Au Precursors

TABLE 1

Single crystal structures of Au precursors.

| | 1a | 1b | 1c | 2b |
|---|---|---|---|---|
| chemical formula | $C_{79.50}H_{100}Au_2Cl_2O_4P_2$ | $C_{76}H_{90}Au_2Cl_2O_4P_2$ | $C_{66}H_{85}AuClO_4P$ | $C_{76}H_{90}O_4P_2$ |
| formula weight | 1646.45 | 1594.25 | 1205.73 | 1129.42 |
| space group | I2/a | P2$_1$/c | P2$_1$/c | P$\bar{1}$ |
| color | colorless | colorless | colorless | colorless |
| a (Å) | 19.590(4) | 14.6239(10) | 19.695(10) | 13.9923(5) |
| b (Å) | 22.495(4) | 25.8803(18) | 14.974(7) | 15.1673(5) |
| c (Å) | 20.590(4) | 21.5065(15) | 20.876(10) | 17.3281(6) |
| α (°) | 90 | 90 | 90 | 83.2070(10) |
| β (°) | 105.26(3) | 108.7620(10) | 96.290(6) | 81.5680(10) |
| γ (°) | 90 | 90 | 90 | 63.9150(10) |
| V (Å$^3$) | 8753(3) | 7707.1(9) | 6120(5) | 3261.19(19) |
| temperature (K) | 163(2) | 273(2) | 153(2) | 100(2) |
| Z | 4 | 4 | 4 | 2 |
| R[F$^2$ > 2σ(F$^2$)] | 0.028 | 0.049 | 0.049 | 0.058 |
| wR(F$^2$) | 0.031 | 0.148 | 0.118 | 0.172 |
| G.O.F. | 1.34 | 0.78 | 1.02 | 1.54 |

TABLE 2

Selective bonding lengths, angles, and torsion angles.

| | Bonding | Length (Å) | Angle | Angle (degree) |
|---|---|---|---|---|
| 1a | Au1—Cl2 | 2.277 | O1—C23—P1 | 107.7 |
| | P1—Au1 | 2.226 | C23—P1—Au1 | 114.9 |
| | C23—P1 | 1.829 | P1—Au1—Cl2 | 174.16 |
| | O1—C23 | 1.428 | Au1—P1—C23—O1 | −56.2 |
| 1b | Au1—Cl1 | 2.2876 | P1—Au1—Cl1 | 176.96 |
| | Au2—Cl2 | 2.272 | P2—Au2—Cl2 | 177.61 |

TABLE 2-continued

Selective bonding lengths, angles, and torsion angles.

|    | Bonding  | Length (Å) | Angle         | Angle (degree) |
|----|----------|------------|---------------|----------------|
|    | Au1—P1   | 2.2229     | C45—P1—Au1    | 116.1          |
|    | Au2—P2   | 2.2240     | C61—P2—Au2    | 113.7          |
|    | P1—C45   | 1.838      | O1—C45—P1     | 114.7          |
|    | P2—C68   | 1.825      | O3—C61—P2     | 107.8          |
|    | O1—C45   | 1.427      | Au1—P1—C45—O1 | 51.9           |
|    | O3—C61   | 1.432      | Au2—P2—C61—O3 | −63.7          |
|    |          |            | P1—C45—O1—C1  | −80.0          |
|    |          |            | P2—C61—O3—C23 | 164.3          |
| 2b | O1—C45   | 1.419      | O1—C45—P1     | 116.9          |
|    | O3—C49A  | 1.377      | O3—C49A—P2A   | 113.3          |
|    | O3—C49B  | 1.496      | O3—C49B—P2B   | 126.8          |
|    | C45—P1   | 1.867      | P1—C45—O1—C1  | 53.0           |
|    | C49A—P2A | 1.878      | P2A—C49A—O3—C23 | 37.7         |
|    | C49B—P2B | 1.906      | P2B—C49B—O3—C23 | −78.1        |
| 1c | Au1—Cl1  | 2.2637     | C13—P1—Au1    | 113.4          |
|    | P1—Au1   | 2.2180     | C1—P1—Au1     | 112.9          |
|    | C13—P1   | 1.819      | O1—C13—P1     | 111.0          |
|    | O1—C13   | 1.411      | C14—O1—C13    | 108.6          |
|    |          |            | Au1—P1—C13—O1 | −58.9          |

Postsynthetic Modification of Gold Nanoparticles with 2a and 2c

Gold colloids are synthesized from tetraoctylammonium bromide (20 equivalent)—stabilized $HAuCl_4$/dichloromethane solution. Briefly, 1.25- and 2-monolayer equivalent calix[4]arene, 2a or 2c, is added to 4-nm gold colloid solution containing 200 µM gold atoms, which produces 2a- and 2c-bound gold colloids.

Synthesis of Reduced Gold Colloids

Gold colloid synthesis is achieved via reduction of each precursor complex in an ethanolic solution of $NaBH_4$. In a typical preparation, 4 equivalents (with respect to Au) of $NaBH_4$ are added to a suspension of Au precursor complex in ethanol, and the resulting mixture is stirred for 40 minutes at room temperature, filtered, and evaporated in vacuo. Of critical importance in this synthesis is the limited solubility of both $NaBH_4$ and Au(I) complex 1a-c in ethanol, which effectively enforces a low concentration of both species in solution during reduction and has been used previously for the synthesis of $Au_{11}$ colloids. Solvents such as dichloromethane, benzene, and THF completely solubilize both components and subsequently fail to produce a uniform distribution of small gold colloids after reduction. The resulting colloidal gold products consisting of 1a-red, 1b-red, and 1c-red are washed in water and hexane (no hexane wash for 1c-red), dried, and characterized using spectroscopy and STEM.

Exemplary Syntheses

Synthesis of Gold Colloid 1a-Red.

3.9 equivalents (with respect to Au atoms) of $NaBH_4$ (50 mg) are added to a suspension of 0.166 mmol (255 mg) of gold precursor complex 1a in 80 mL of anhydrous ethanol. The disappearance of the starting precursor gold complex from the reaction mixture is monitored via thin-layer chromatography in dichloromethane. The resulting mixture is stirred for 40 minutes at room temperature, filtered, and evaporated in vacuo. The resulting gold cluster product is washed with ~150 mL of degassed (pH 7) water, and the resulting solid is dried under vacuum, and subsequently washed with ~10 mL hexane and then again dried under vacuum. This synthesizes 130 mg of final 1a-red after purification.

Synthesis of Gold Colloid 1b-Red.

3.6 equivalents (with respect to Au atoms) of $NaBH_4$ (18 mg) are added to a suspension of 0.066 mmol (105 mg) of gold precursor complex 1b in 30 mL of anhydrous ethanol. The remaining procedures are identical to the synthesis of 1a-red except the volume of solvent used for washing is adjusted proportionally to the number of moles of calixarene in the synthesis relative to 1a-red.

Synthesis of Gold Colloid 1c-Red.

3.8 equivalents (with respect to Au atoms) of $NaBH_4$ (6 mg) are added to a suspension of 0.041 mmol (50 mg) of gold precursor complex 1b in 20 mL of anhydrous ethanol. The remaining procedures are identical to the synthesis of 1a-red except only water was used as a solvent for washing, and the amount of water was adjusted proportionally to the number of moles of calixarene in the synthesis relative to 1a-red.

UV-Vis spectroscopy of gold colloids is performed with a UV-Vis spectrometer (Cary-400, Bruker). The fluorescence of 2NT adsorbed on colloidal gold is measured with a steady-state fluorimeter (F-4500, Hitachi) operating at 950 V and 5 nm of excitation/emission slit width. The solvent used for fluorescence studies is dichloromethane, and the excitation wavelength is 283 nm. Transmission electron micrographs of gold clusters were observed with 200 kV FEI monochromated F20 UT Tecnai (National Center for Electron Microscopy, Lawrence Berkeley National Laboratory). XPS (X-ray photoelectron spectroscopy) of gold colloids was performed by depositing gold colloids onto a silicon wafer using a double-sided tape. XPS analysis was performed using a Ulvac Phy Quantera Scanning Microprobe operating with a spectral resolution of 1.05 eV. The energy scale of the spectrometer was calibrated using Ag photoemission peaks in accord with standard practice. Resulting XPS results were corrected using C is peak at 284.6 eV.

The UV-visible spectra of 1a-red in $CH_2Cl_2$ solution consists of a prominent band near 415 nm, which falls within the region characteristic of bands found for small $Au_n$ clusters where n is approximately 11. HAADF-STEM demonstrates a 0.9±0.1 nm core diameter for 1a-red in FIG. 2a, and this size is also characteristic of small $Au_n$ clusters. ESI mass spectrometry of 1a-red exhibits a complex pattern of multiple peaks out of which $[Au_{11}L_2Cl_3]^{2+}$ (L=calixarene phosphine ligand) could be identified as a doubly charged molecular ion (see supporting information). Elemental analysis and X-ray photoelectron spectroscopy of 1a-red both show a Au to phosphine molar ratio of near unity (or, equivalently, a gold to calixarene molar ratio of approximately two), and an extraordinarily low gold mass fraction of 21%. This appears to be one of the lowest metal-to-ligand mass ratios measured for a gold colloid, and requires a small gold core, consistent with HAADF-STEM results above, as well as mono-dentate binding of some diphosphine ligands in 1a-red. Elemental analysis for an $Au_{11}$ core in 1a-red requires five calixarene ligands; however, molecular mechanics calculations demonstrate that only two calixarene phosphine ligands have enough space to bind in a bidentate fashion to the $Au_{11}$ core. Such a decreased ligand denticity in 1a-red relative to the maximum is consistent with observations in other gold colloid systems when considering the excess unbound ligand present in solution during reduction of 1a-c. $^{31}$P NMR spectroscopy of 1a-red shows two resonances centered at δ 23.7 ppm and 24.6 ppm at −60° C. in $CD_2Cl_2$. These resonances are different than the distinct δ 22.5 ppm resonance observed for the unreduced 1a at −60° C. in $CD_2Cl_2$. The former resonance is downfield ~45 ppm relative to the corresponding free ligand 2a, consistent with previously observed chemical shift differences between free and gold surface-bound states of triphenylphosphine ligands. The 24.6 ppm downfield resonance in the $^{31}$P NMR spectrum is consistent with phosphine oxide, and XPS estimates a phosphine to phosphine-oxide ratio of 2.25±0.36 in 1a-red.

Figure 2:
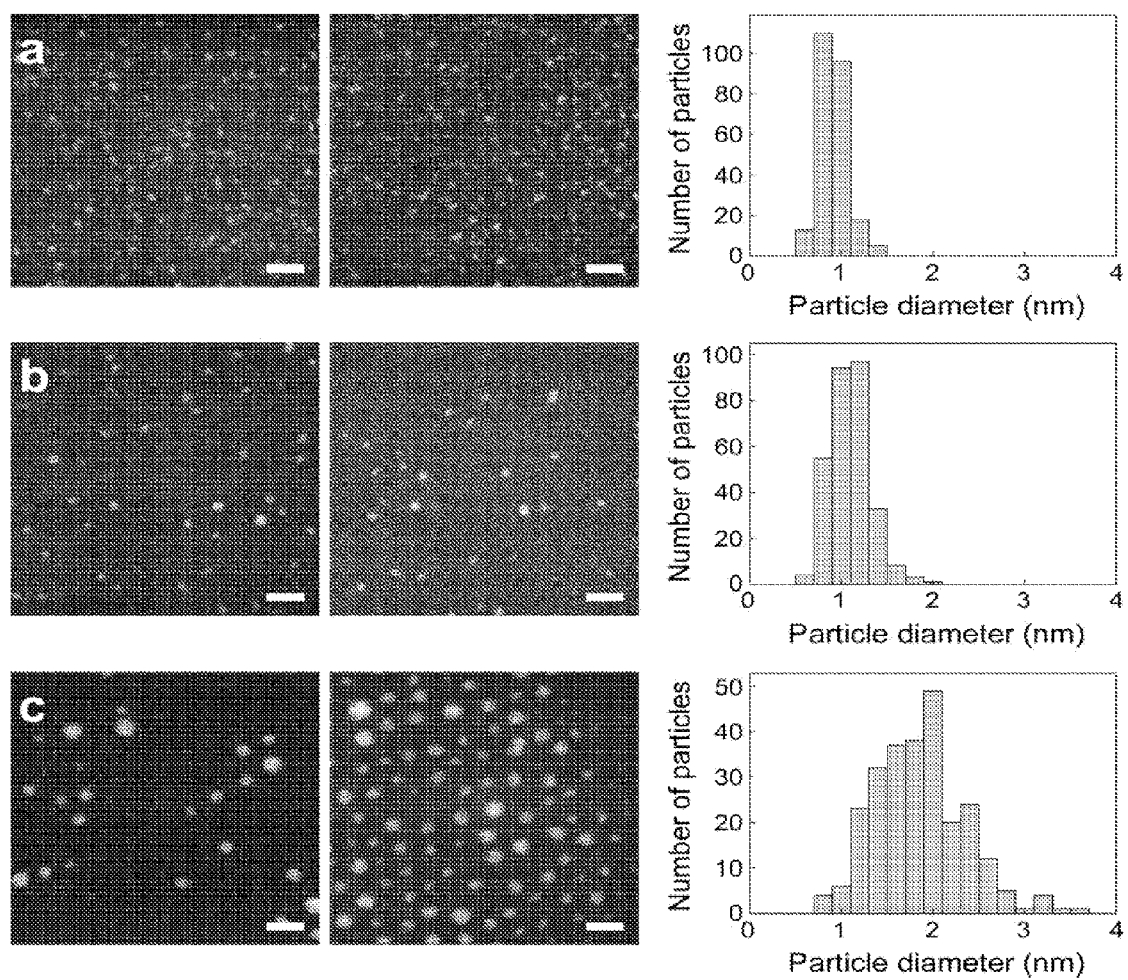
FIG. 2 displays HAADF-STEM images of (a) 1a-red (0.9±0.1 nm, 242 particles), (b) 1b-red (1.1±0.2 nm, 295 particles), and (c) 1c-red (1.9±0.5 nm, 257 particles). The scale bar represents 5 nm.

STEM data for 1b-red and 1c-red demonstrate significantly larger core diameters of 1.1±0.2 nm and 1.9±0.5 nm, respectively, in FIG. 2. The presence of a clearly identifiable surface plasmon resonance absorption band in the UV-Vis spectrum of 1c-red in $CH_2Cl_2$ solution, near 520 nm, further confirms the presence of larger colloids that are not present in either 1a-red or 1b-red. XPS of 1a-red shows a Au $4f_{7/2}$ binding energy peak centered at 84.15 eV, and a FWHM (full width at half maximum) of 1.64 eV for this peak. This breadth is larger than the 1.23 eV and 1.11 eV breadths observed for the same corresponding peaks in 1b-red and 1c-red, respectively, which have binding energies of 83.65 eV and 83.55 eV, respectively. The increased breadth of the Au $4f_{7/2}$ peak in 1a-red suggests various discrete, cluster-like electronic states in 1a-red, which is consistent with its larger binding energy and its significantly lower gold mass fraction relative to 1b-red and 1c-red as summarized in Table 1. Altogether, the data above suggest a correlation between small colloid size and ability of the precursor ligand 2a to chelate to the surface during colloid nucleation and growth. This requires both phosphine groups to coordinate to gold on the same face of the calixarene lower rim, and is only possible for complex 1a of the three investigated (vide supra).

Fluorescence of 2NT on Gold Clusters

Figure 3:
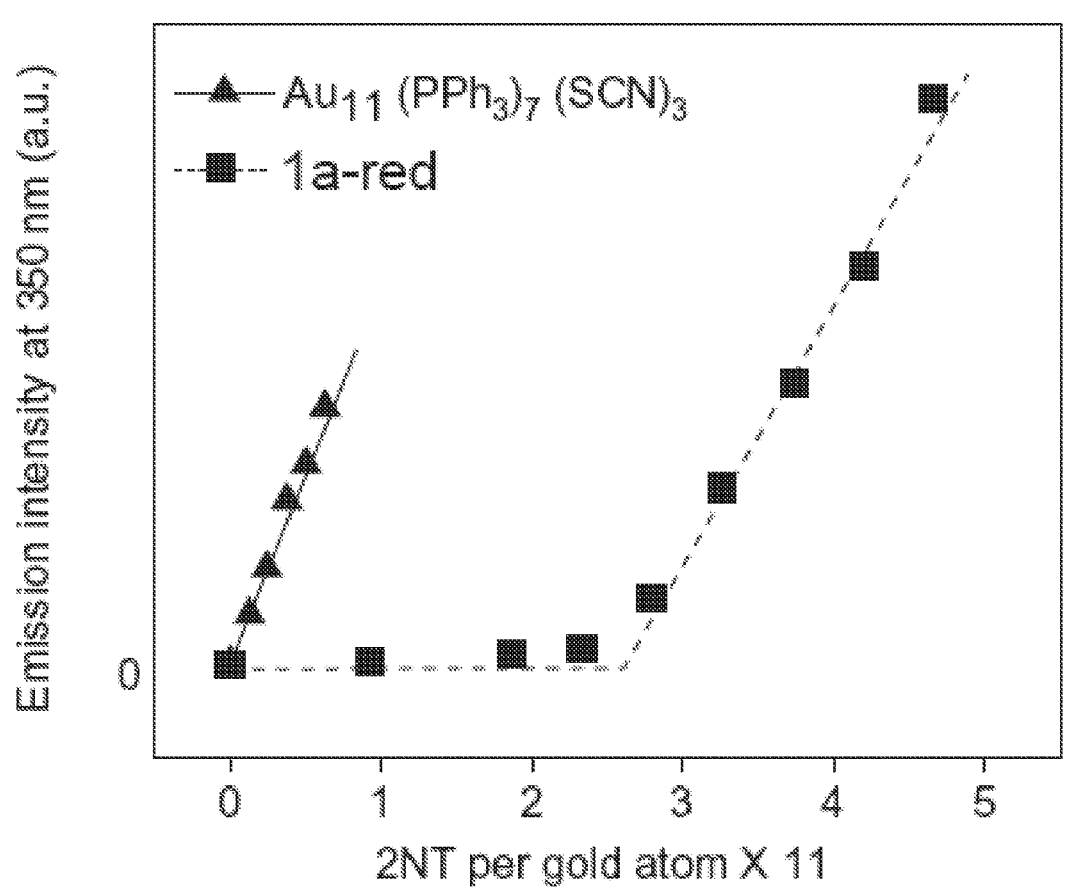
FIG. 3 displays the Fluorescence emission intensity of 2NT on 1a-red (square) and $Au_{11}(PPh_3)_7(SCN)_3$ (triangle) depending on 2NT added. Each solution contains 55 µM of gold atoms in dichloromethane and excited at 283 nm. Emission intensity was subtracted by baseline of dichloromethane solvent.

The amount of accessible gold surface can be elucidated using the chemisorption probe 2-naphthalenethiol (2NT), since this probe has been previously shown to bind areas between adsorbed calixarenes on gold colloids.

colloids is one relying on fraction of surface atoms bound with 2NT because it accounts for surface area to volume variations between differently sized colloids. Using this basis results in 25.0% of gold surface atoms bound with 2NT in 1a-red, and lower values of 8.0% and 2.1% for gold colloids 1b-red and 1c-red, respectively. Control experiments with $Au_{11}$ clusters consisting of neutral $Au_{11}(PPh_3)_7(SCN)_3$ (shown in FIG. 3) and cationic $[Au_{11}(PPh_3)_8Cl_2]PF_6$ do not demonstrate 2NT binding ability presumably due to coordinative saturation. These control experiments rule out the possibility of thiol-phosphine exchange as the reason for the 2NT binding, which have been observed previously under conditions of large excesses of thiol.

In another control, the synthesis and reduction of the Au(I) complex 1d results in a $^{13}$C-labeled gold cluster 1d-red. $^{13}$C-labeled 2d is then used as a sensitive probe of free ligand in solution, and the results rule out the possibility of 1d in solution after 2NT binding and also the release of the corresponding phosphine oxide ligand in solution after 2NT binding. Additional controls demonstrate no 2NT binding for molecular complexes 1a, 1b and 1c, excluding the possibility of apparent binding due to traces of unreduced complex in solution.

The data in Table 3 summarize the percentage of bound gold atoms after 2NT chemisorption, and demonstrate that the fraction of bound surface atoms decreases monotonically with increasing particle size in the order 1a-red>1b-red>1c-red>(4 nm-1c)-red (same as (4 nm-1a)-red). The trend in the 2NT binding data above cannot be explained by surface area-to-volume considerations given the surface atom basis data in Table 1 (Corma A et al., Supported Gold Nanoparticles as Oxidation Catalysts in Nanoparticles and Catalysts, 389-426 (Wiley VCH Verlag 2008)), and the trend (for example, accessibility in 1c-red versus (4 nm-1c)-red) also cannot be explained on the basis of the radius of curvature, which has previously been reported to account for 1.4-fold increases in the available surface area for 1.6-nm gold clusters when compared with bulk gold surfaces. Considering the footprint of the 2NT probe (>24.4 Å$^2$), the actual quantity of gold atoms within these accessible gaps must be significantly more than the fraction of surface atoms bound to 2NT in Table 3. Accessibility decreases by less than 20% in 1a-red after storage in the dark at room temperature for 6 months, and all clusters reported here are air- and water-stable. All results discussed above have been reproduced on at least three different synthesis batches.

Figure 4:
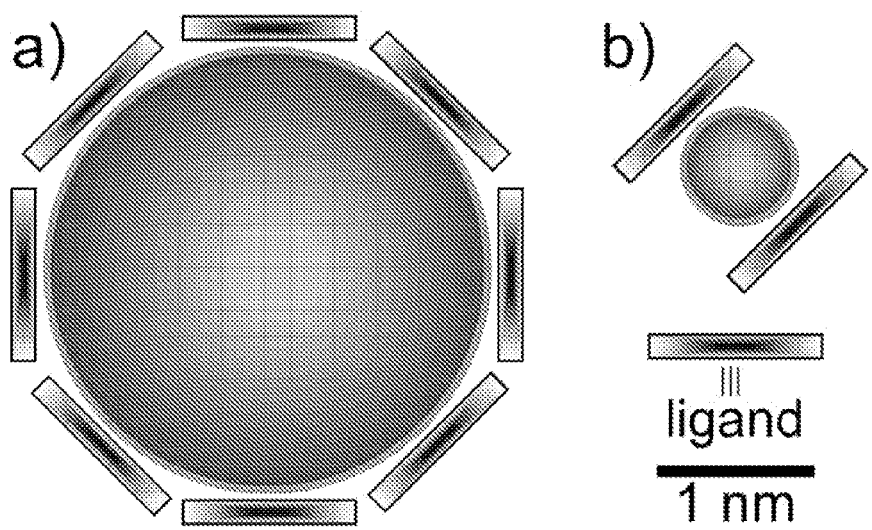
FIG. 4 is a schematic illustration of calix[4]arene-bound (a) 4 nm gold colloid and (b) subnanometer gold colloid. Insufficient space to bind another calix[4]arene in (b) causes the creation of small-molecule-sized voids that are slightly smaller than the size of a calix[4]arene and are a significant fraction of total colloid surface area. (c) Fraction of gold surface atoms that are bound with 2NT (lower-bound) versus colloid diameter as measured using HAADF-STEM.
Figure 4:
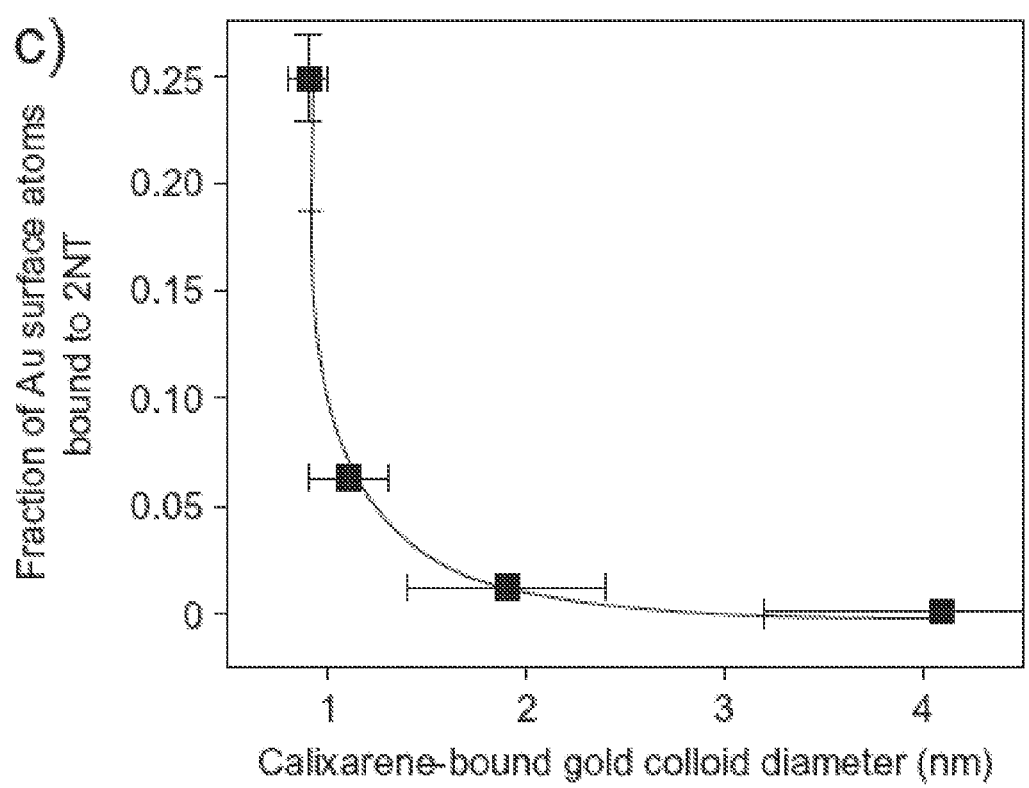
Figure 5:
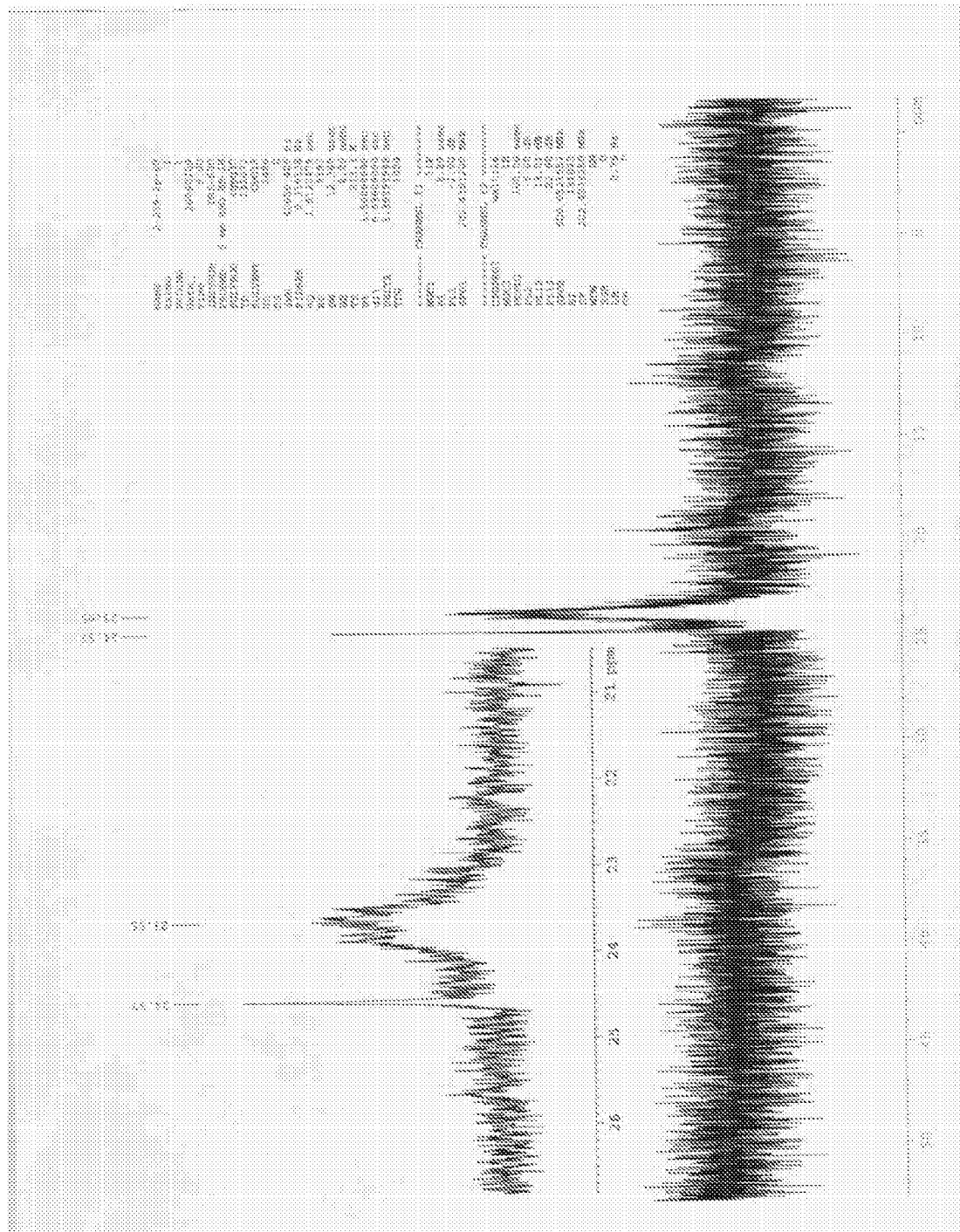
FIG. 5 is the $^{31}P$ NMR spectrum of 1a-red at −60° C.
Figure 6:
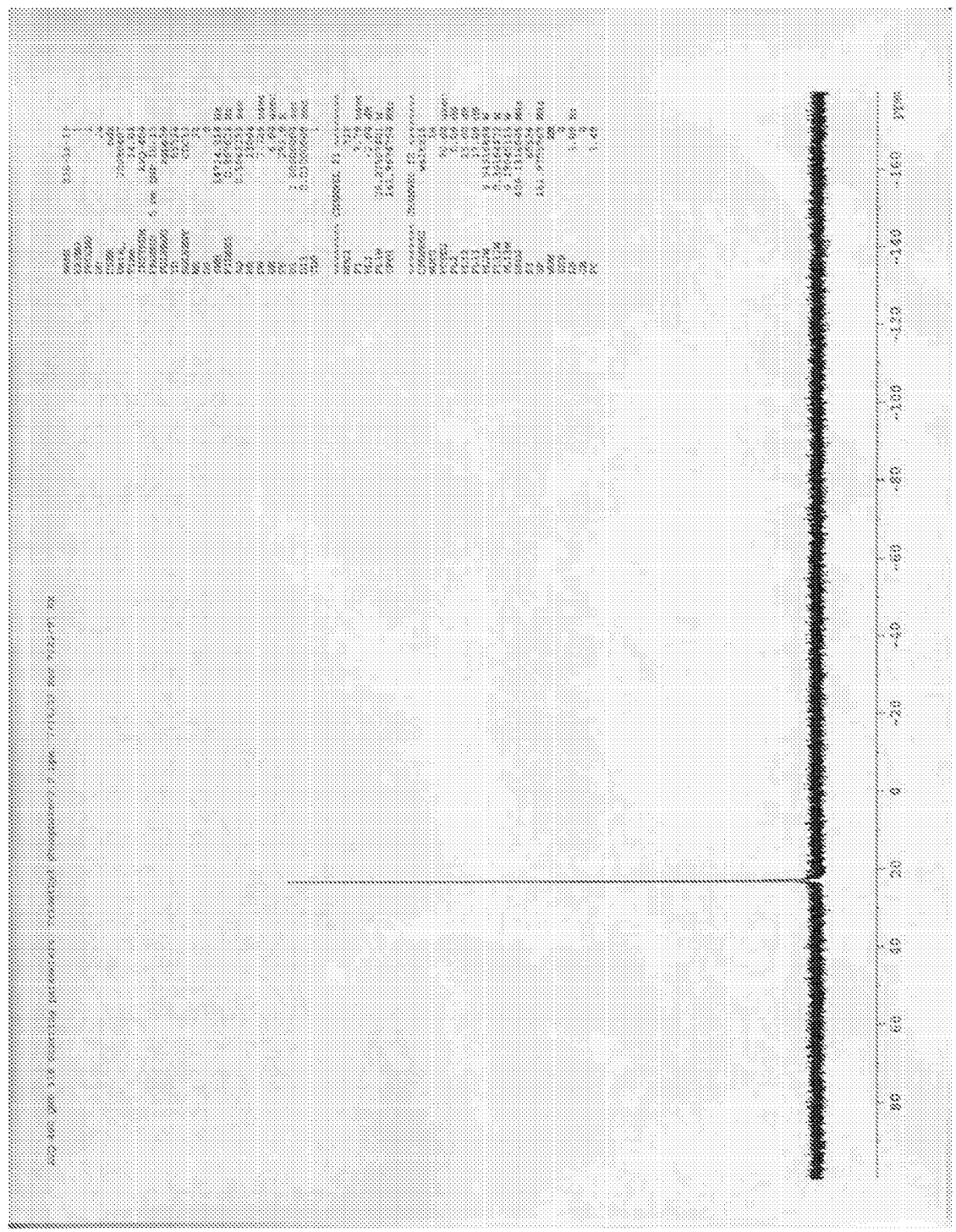
FIG. 6 is the $^{31}P$ NMR spectrum of 1a at room temperature.
Figure 7:
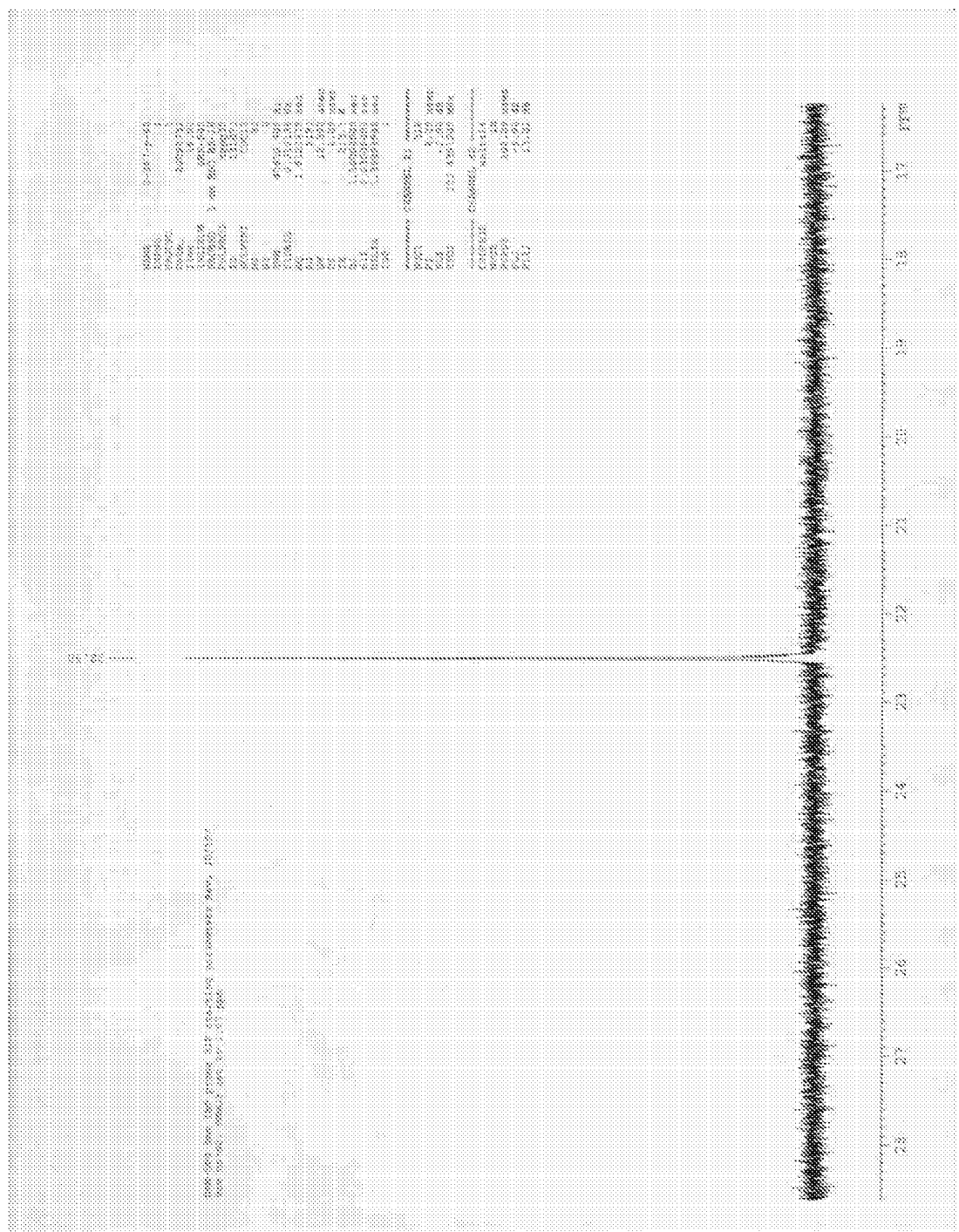
FIG. 7 is the $^{31}P$ NMR spectrum of 1a at −60° C.
Figure 8:
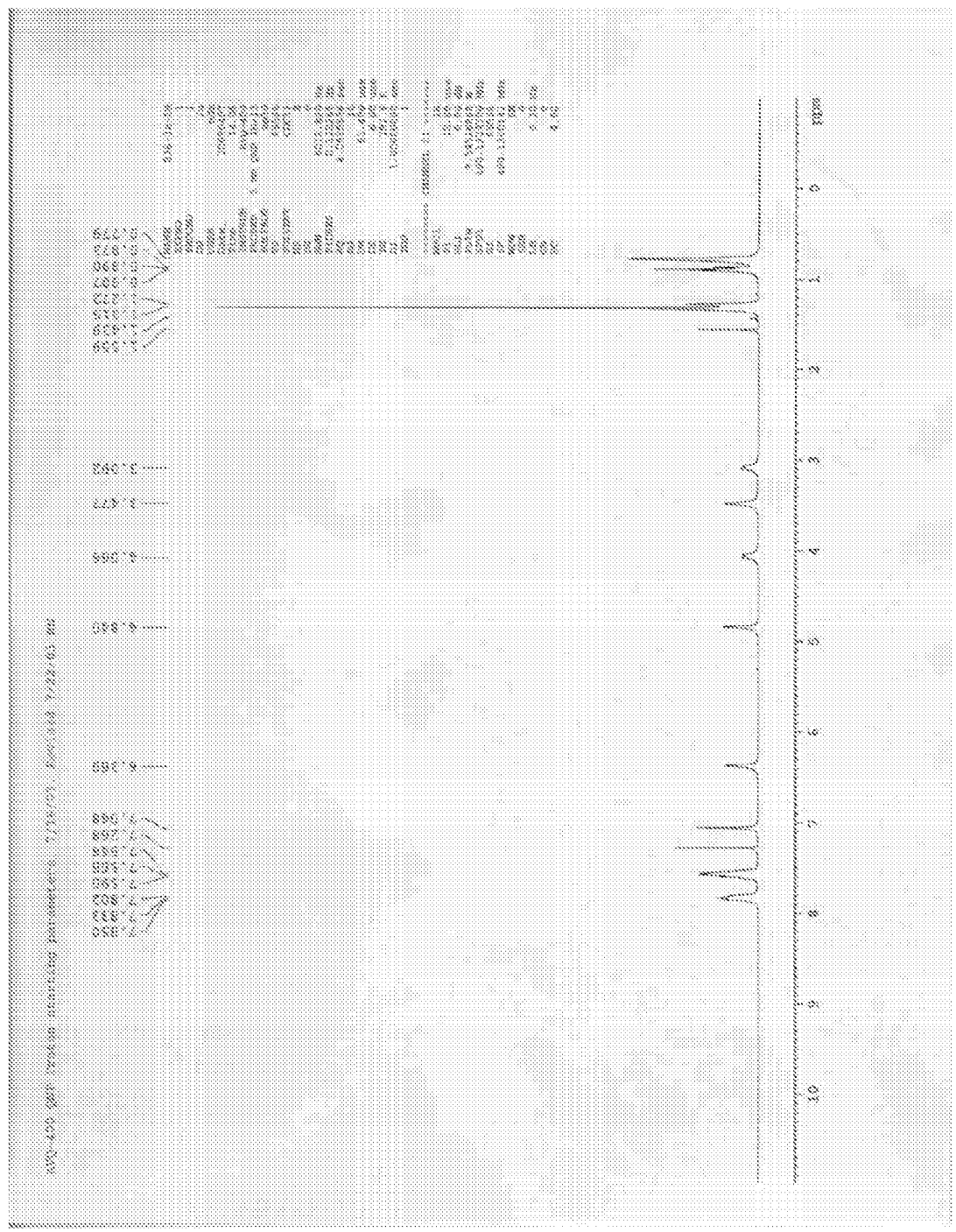
FIG. 8 is the $^1H$ NMR spectrum of 1a at room temperature.
Figure 9:
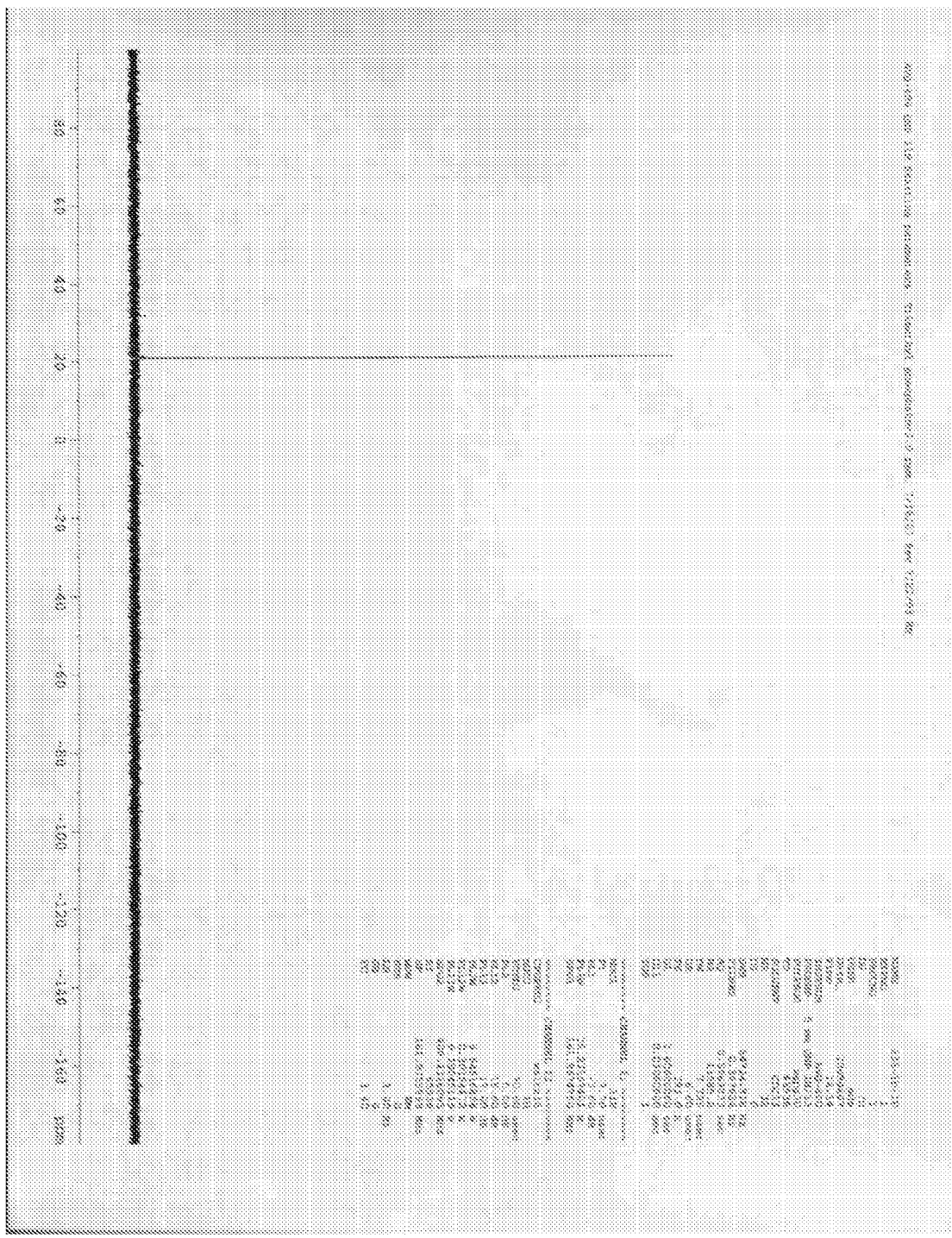
FIG. 9 is the $^{31}P$ NMR spectrum of 1b at room temperature.
Figure 10:
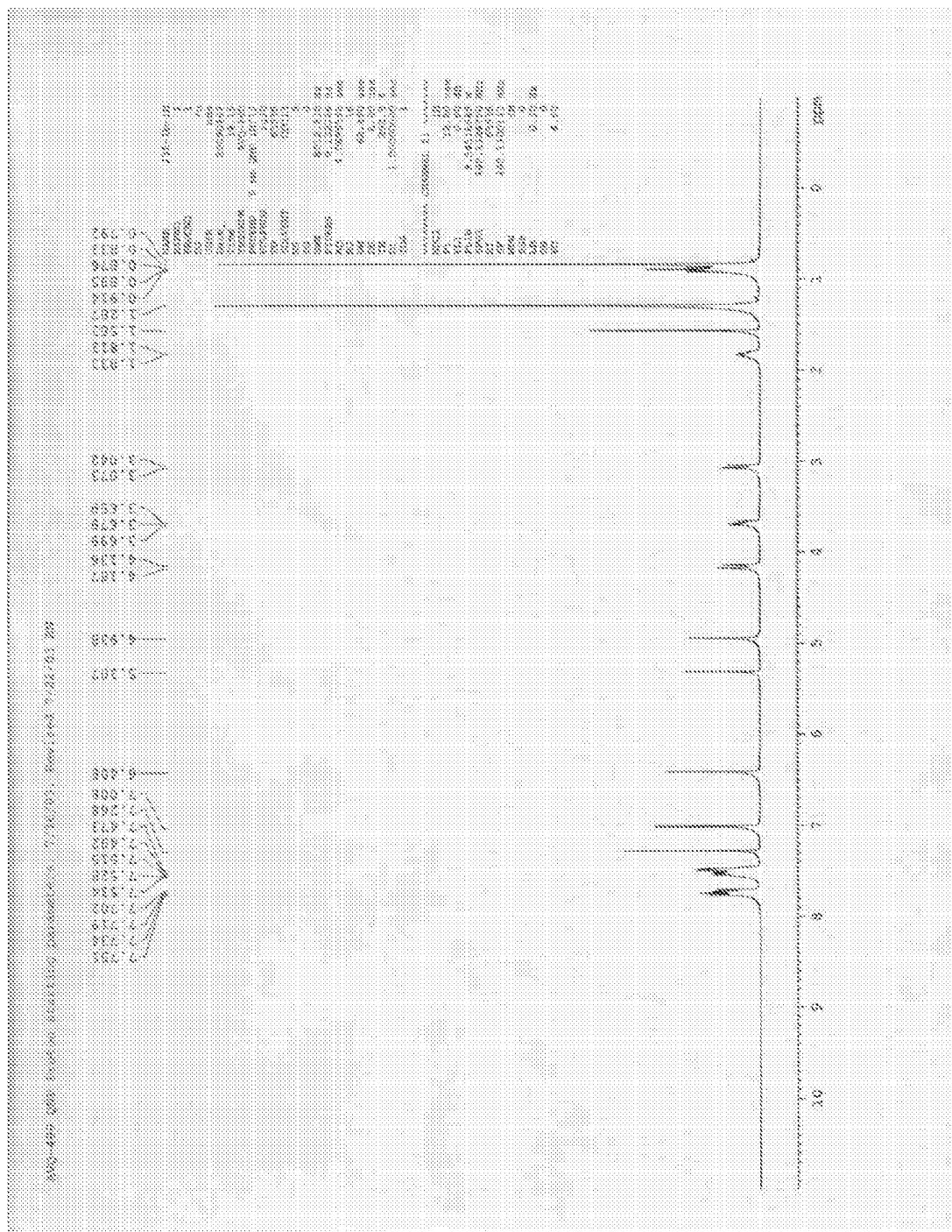
FIG. 10 is the $^1H$ NMR spectrum of 1b at room temperature.
Figure 11:
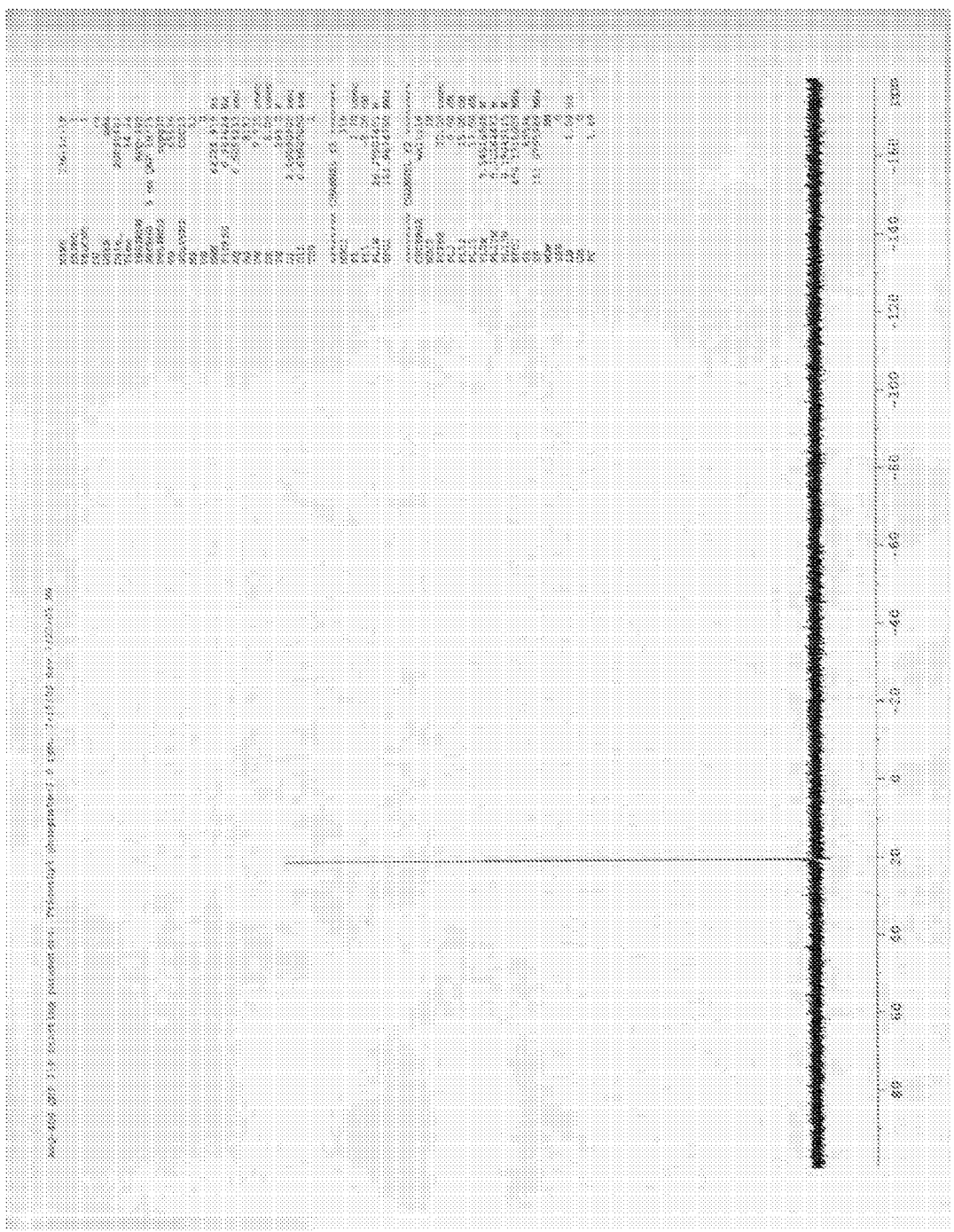
FIG. 11 is the $^{31}P$ NMR spectrum of 1c at room temperature.
Figure 12:
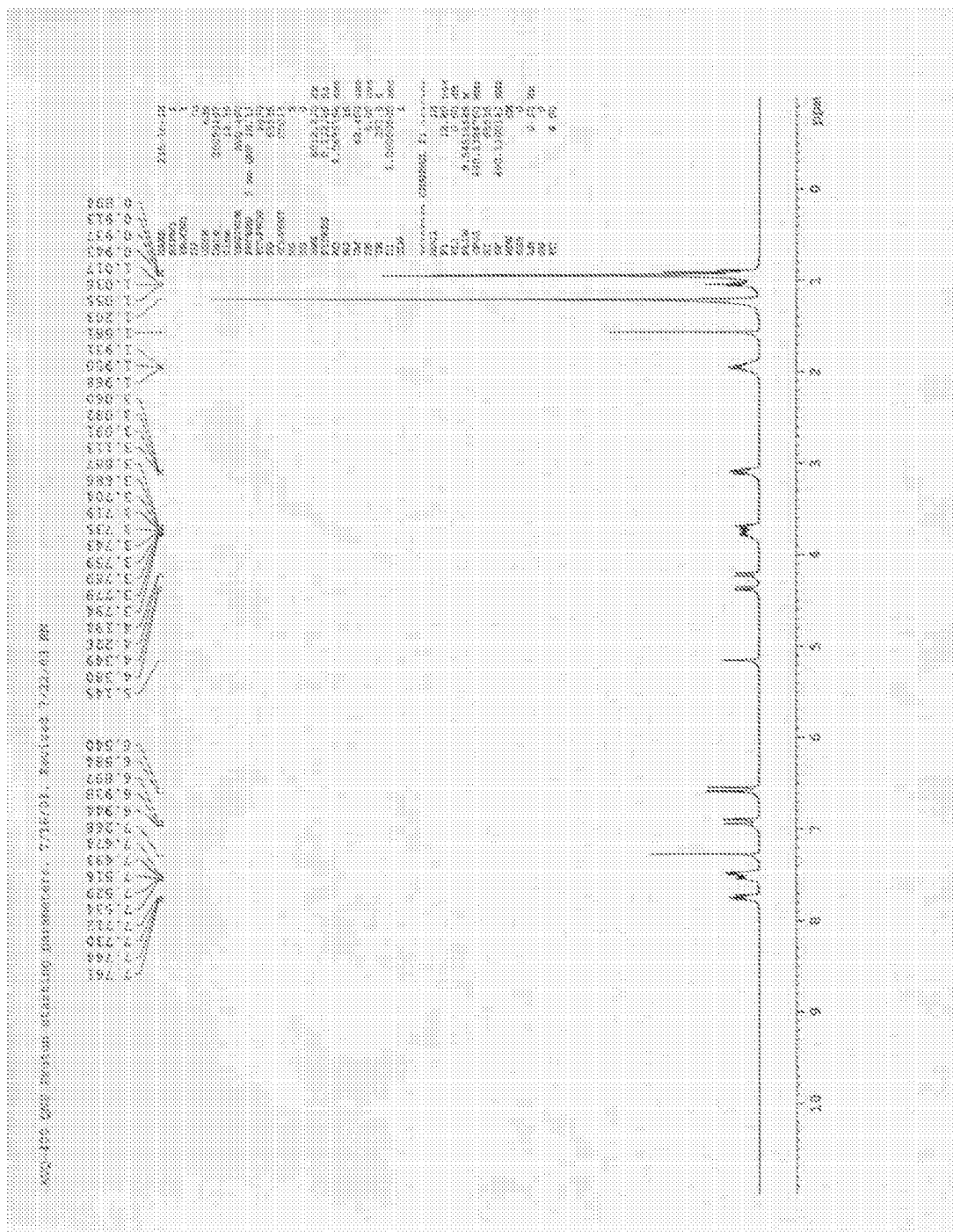
FIG. 12 is the $^1H$ NMR spectrum of 1c at room temperature.
Figure 13:
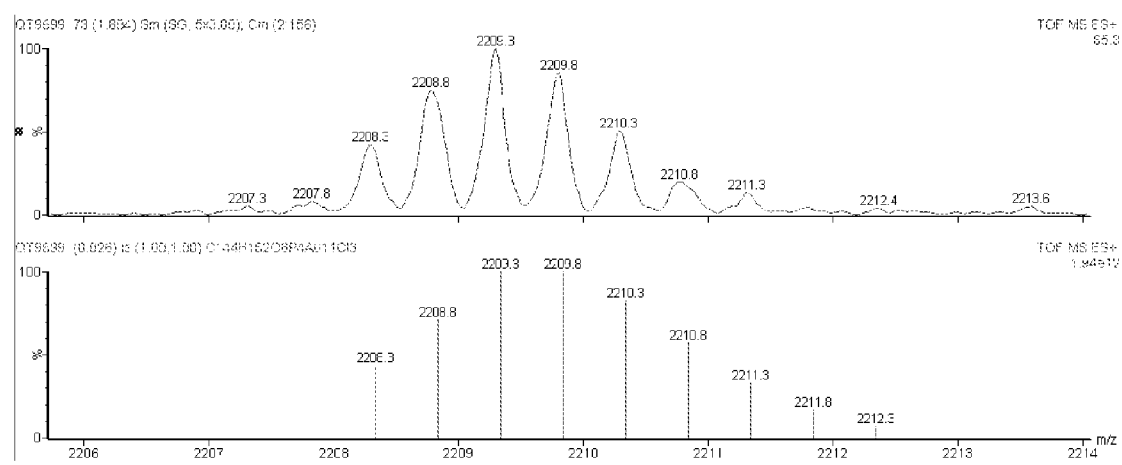
FIG. 13 is the ESI mass spectrum showing a molecular ion fragment in 1a-red (top) and theoretical simulation of $[Au_{11}L_2Cl_3]^{2+}$. L=tert-butyl-calix[4]—$(OMe)_2$ $(OCH_2PPh_2)_2$ (bottom).
Figure 14:
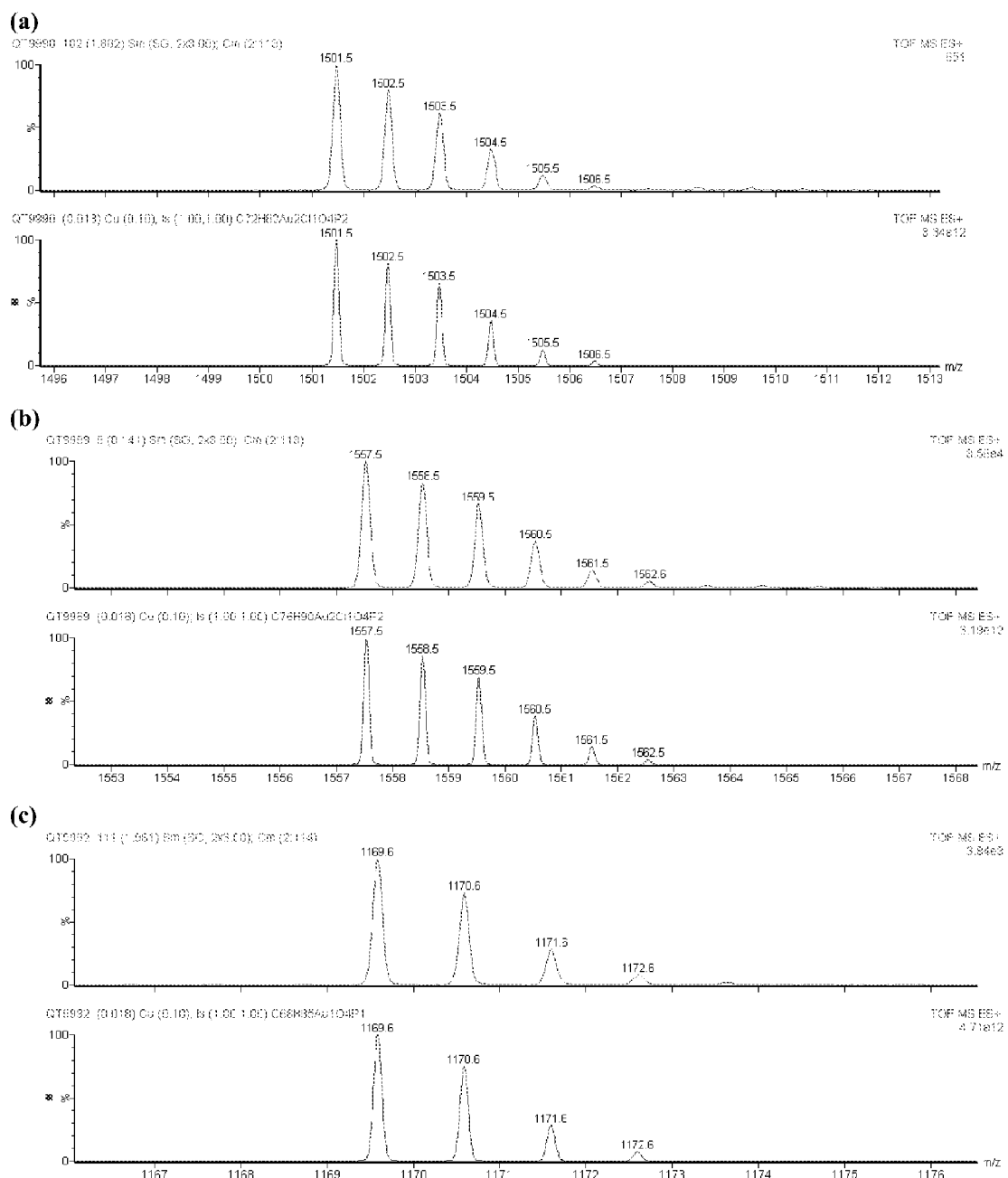
FIG. 14 is the ESI mass spectra (top) and theoretical simulations (bottom) of $[M-Cl]^+$ molecular ions of precursors, (a) 1a, (b) 1b, and (c) 1c.
Figure 15:
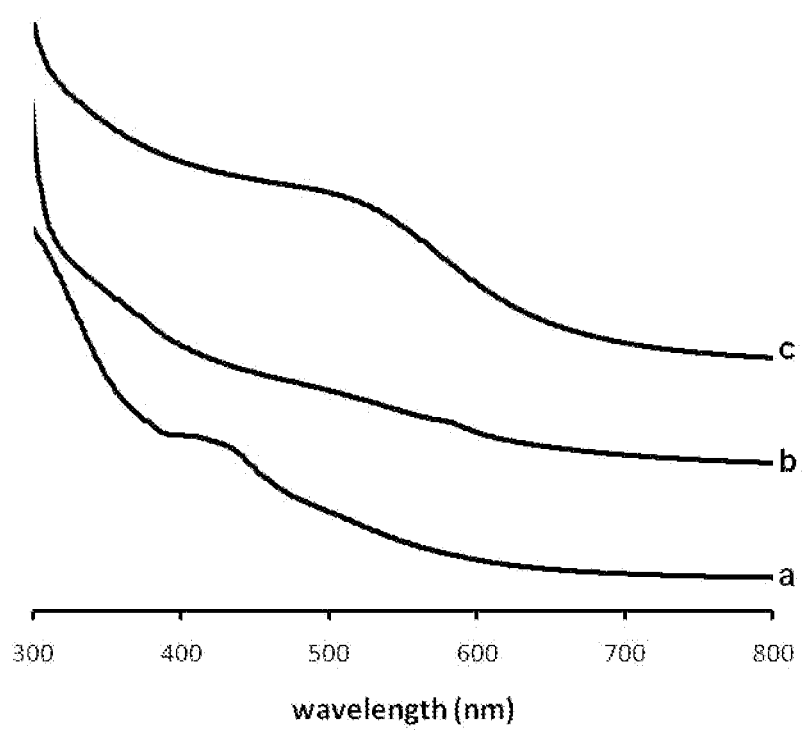
FIG. 15 is the UV-Visible spectra of 1a-red, 1b-red and 1c-red in $CH_2Cl_2$.
Figure 16:
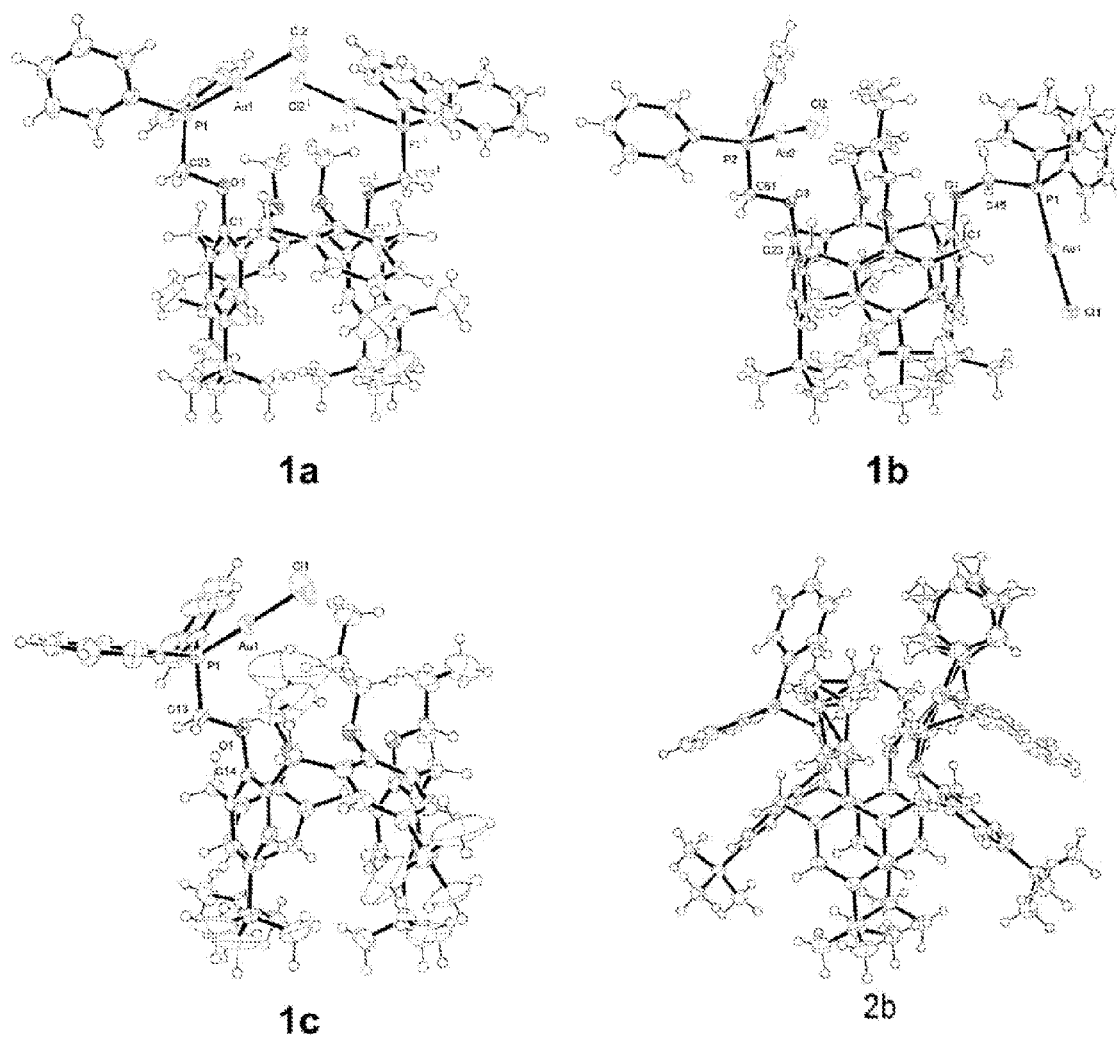
FIG. 16 is the single crystal structures of 1a, 1b, 1c, and 2b. The solvent molecules in 1a and 1b are removed. Each thermal ellipsoid, except hydrogen atoms, represents 50% of possibility.
Figure 17:
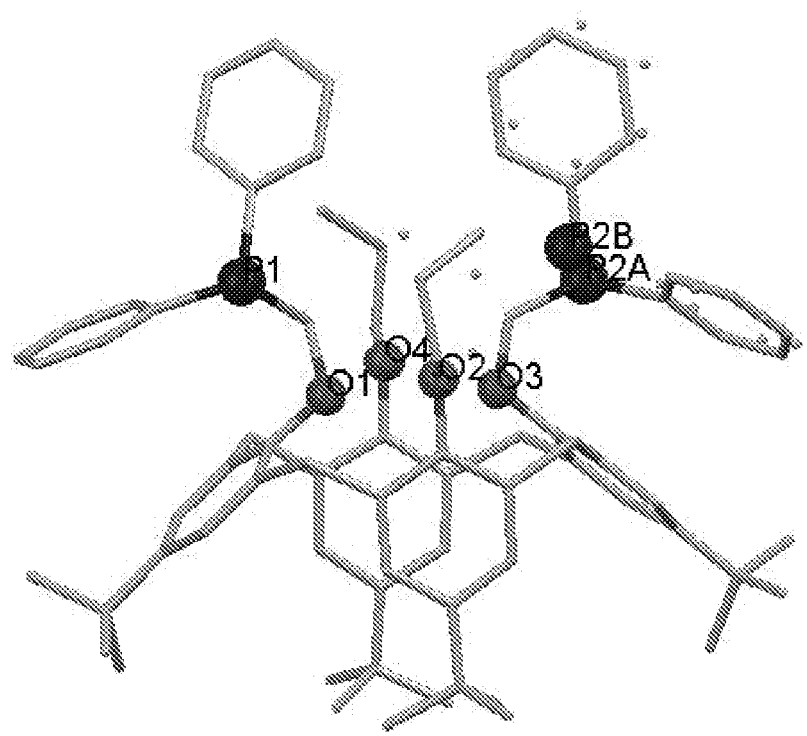
FIG. 17 is the single crystal X-ray crystallographic structure of tert-butyl-calix[4]-$(OR)_2(OCH_2PPh_2)_2$ $(R=C_3H_7-n)$. Despite the disorder in one of the phosphine groups (i.e., P2A, 77%, P2B, 23%) both phosphine groups are organized above the lower rim oxygen plane.
Figure 18:
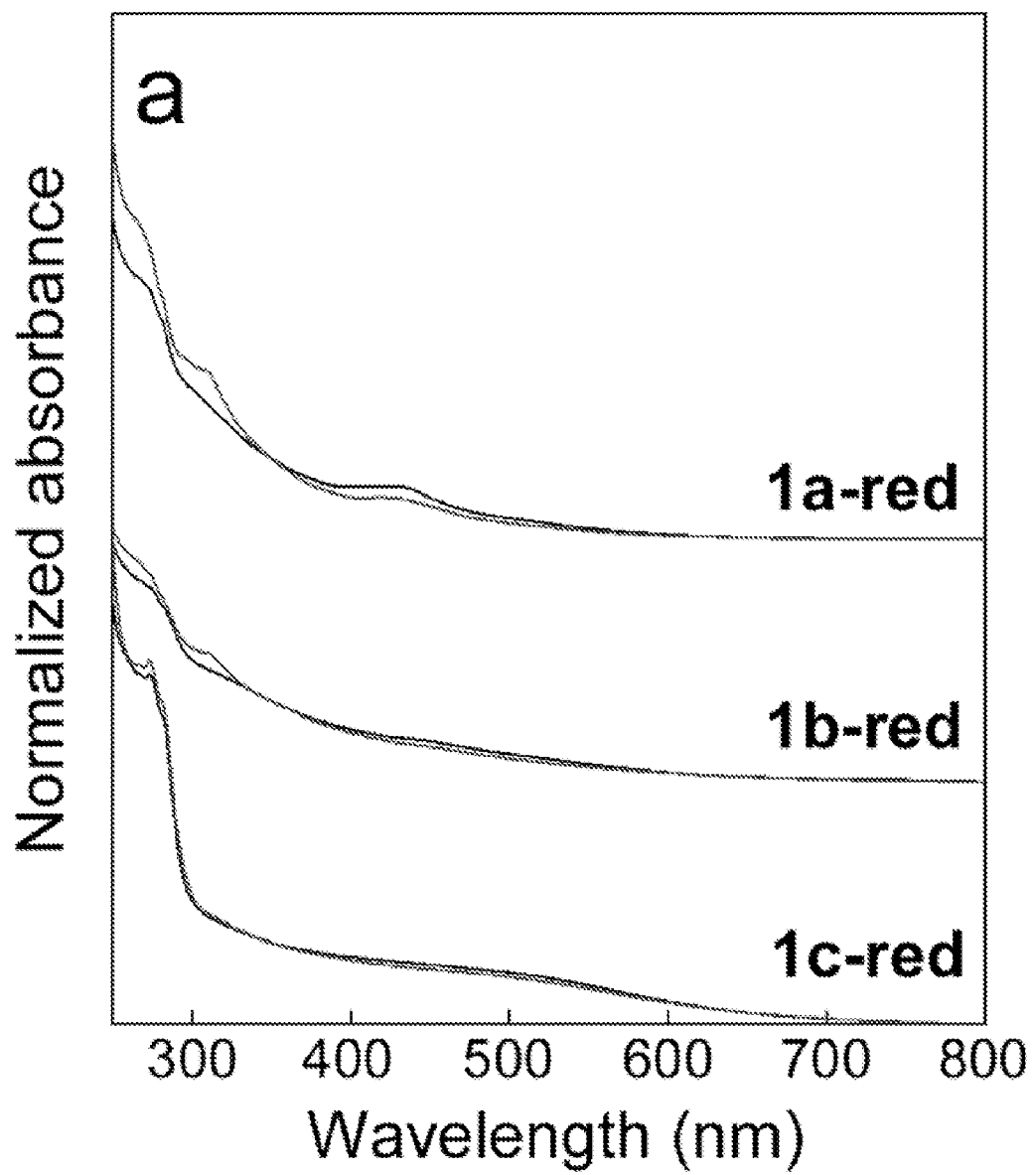
FIG. 18 is the (a) UV-Vis spectra of clusters before (black) and after (red) 5 μM of 2NT addition to 1a-red, 1b-red, and 1c-red. The spectra are normalized at 350 nm.
Figure 19:
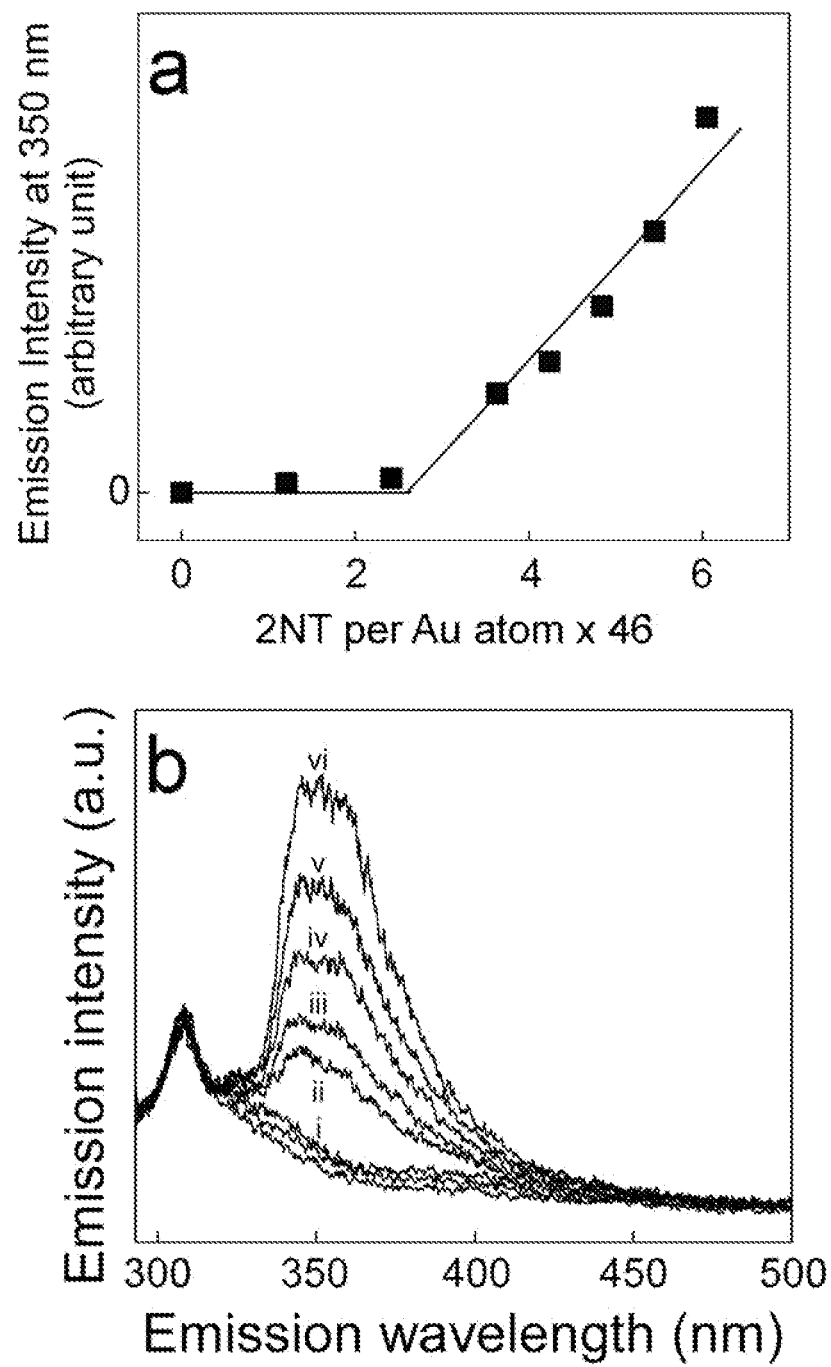
FIG. 19 shows (a) the fluorescence emission intensity and (b) emission spectra of 2NT on 1b-red. 2NT per Au colloid is 0.92 (i), 1.38 (ii), 1.61 (iii), 1.84 (iv), 2.07 (v), and 2.30 (vi), respectively. Each solution contains 4.35 uM of Au colloids in dichloromethane and excited at 283 nm. The colloid concentration is calculated assuming the Au colloid powder consists of 38 wt % gold (based on XPS result) and each colloid consists of 46 gold atoms (based on TEM images).
Figure 20:
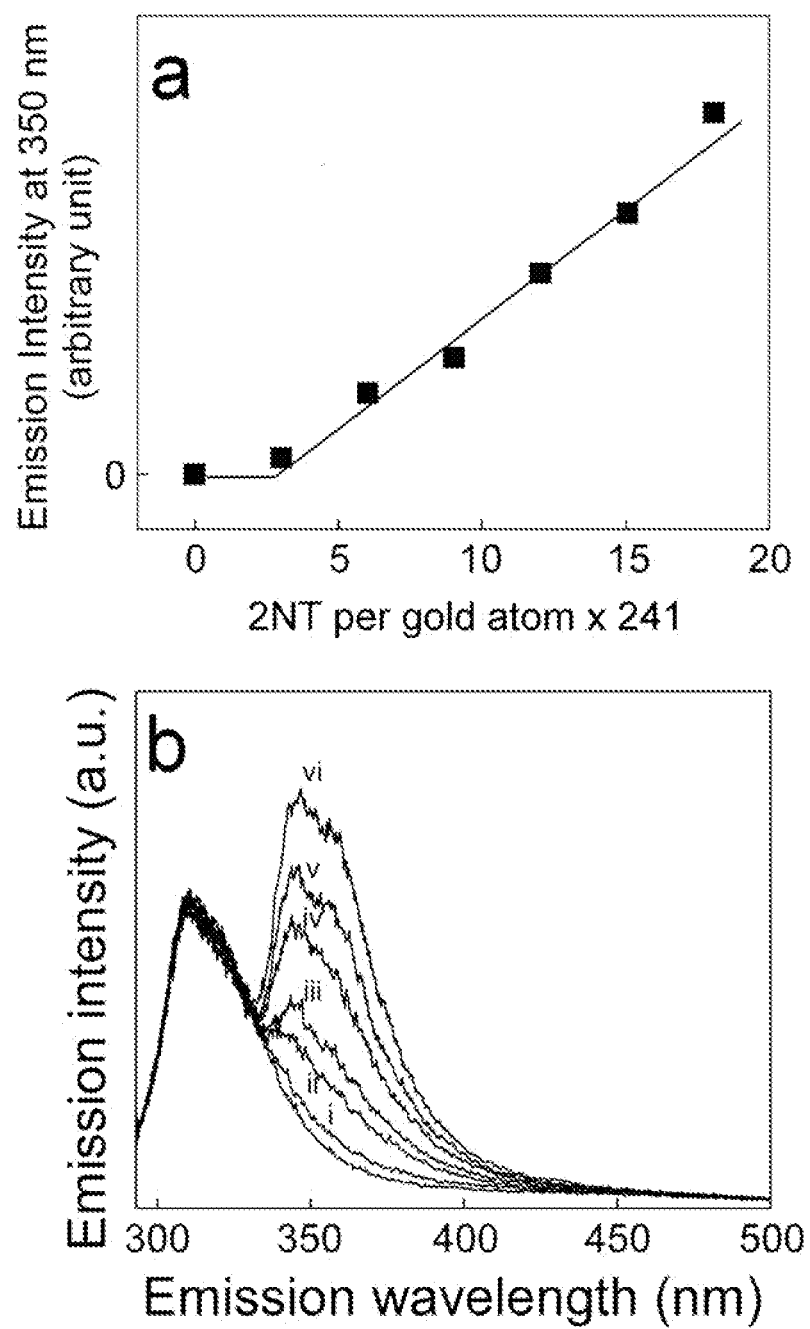
FIG. 20 shows (a) the fluorescence emission intensity and (b) emission spectra of 2NT on 1c-red. 2NT per Au colloid is 1.21 (i), 2.41 (ii), 3.62 (iii), 4.82 (iv), 6.03 (v), and 7.23 (vi), respectively. Each solution contains 0.83 uM of Au colloids in dichloromethane and excited at 283 nm. The colloid concentration is calculated assuming the Au colloid powder consists of 100% gold and each colloid consists of 241 Au atoms (based on TEM images).
Figure 21:
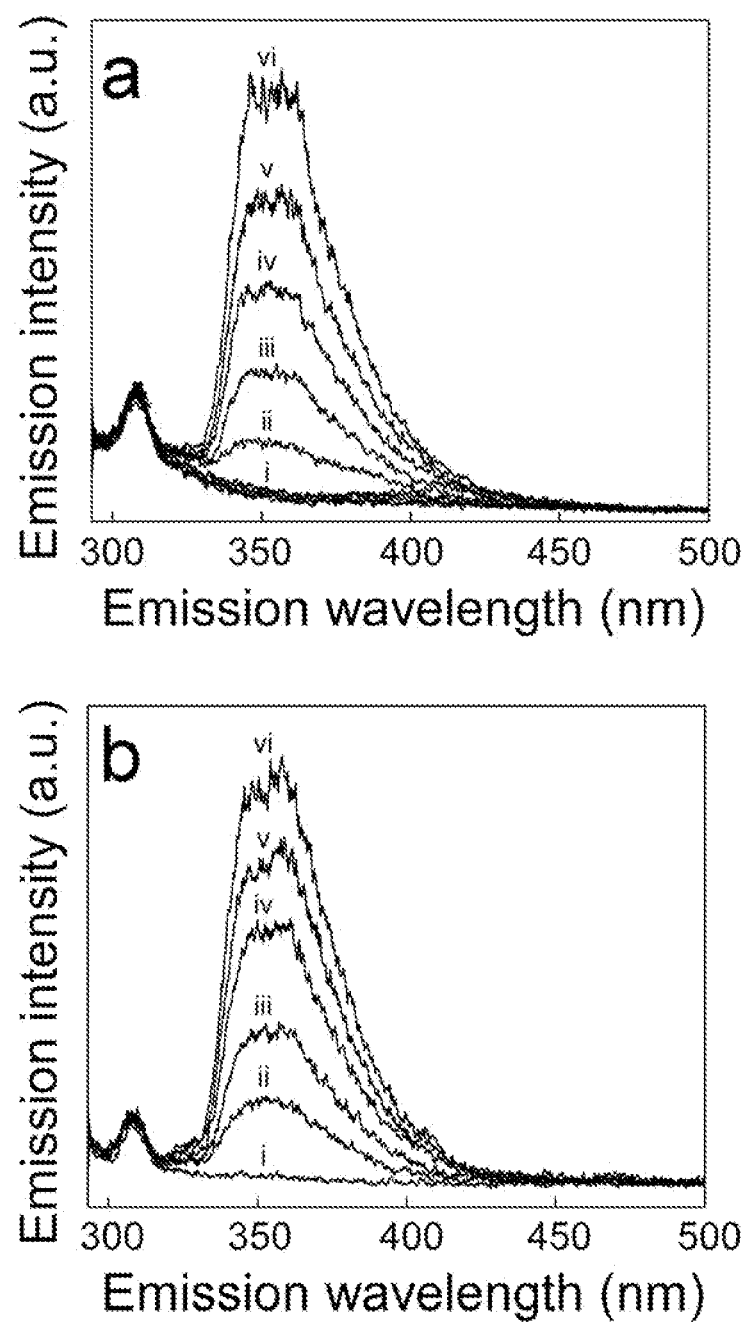
FIG. 21 is the fluorescence emission spectra of 2NT on (a) 1a-red and (b) $Au_{11}(PPh_3)_7(SCN)_3$. 2NT per $Au_{11}$ fragment is 1.15 (i), 1.38 (ii), 1.61 (iii), 1.84 (iv), 2.07 (v), and 2.30 (vi) in (a), and 0 (i), 0.125 (ii), 0.25 (iii), 0.375 (iv), 0.5 (v), and 0.625 (vi) in (b), respectively. Each solution is assumed to contain 5 μM of $Au_{11}$ fragments in dichloromethane and excited at 283 nm.
Figure 22:
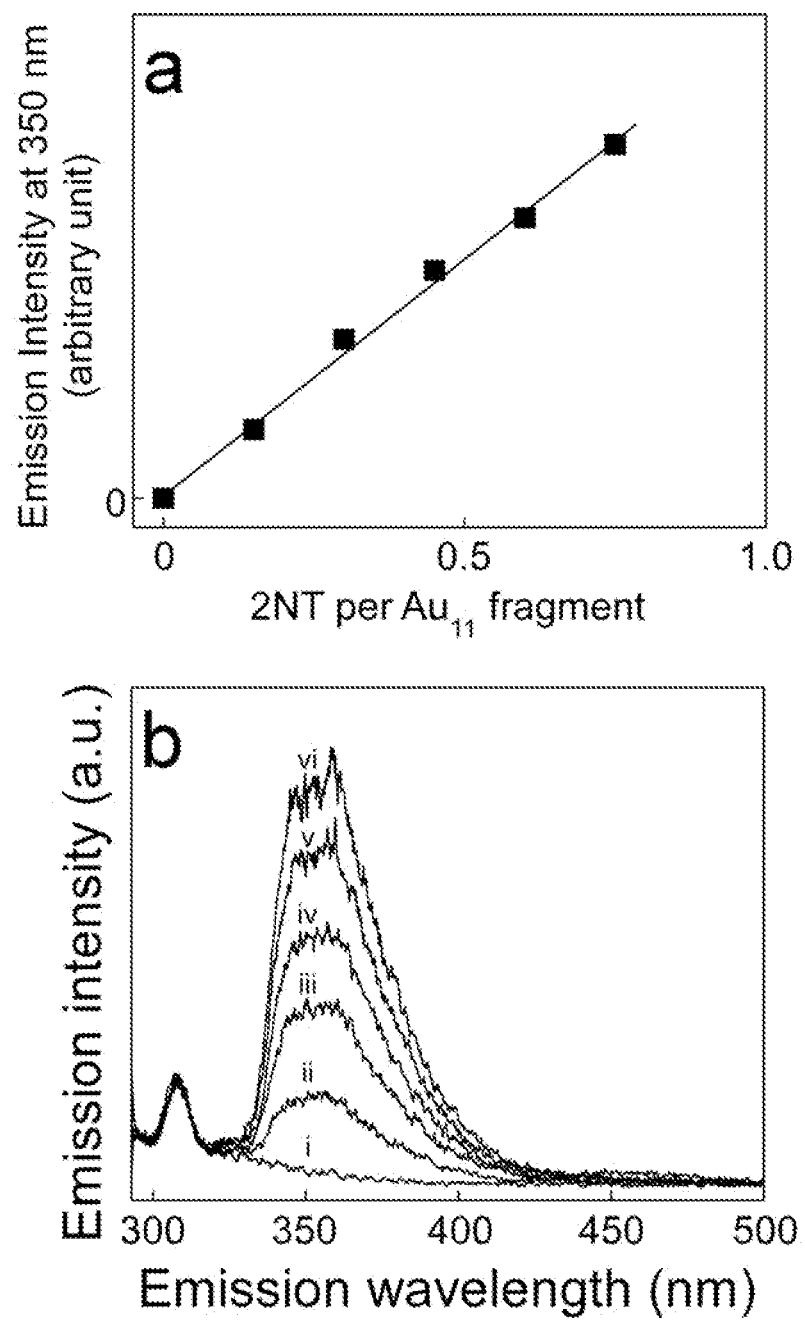
FIG. 22 shows (a) Fluorescence emission intensity and (b) emission spectra of 2NT on $[Au_{11}(PPh_3)_8Cl_2]PF_6$. 2NT per Au11 fragment is 0 (i), 0.15 (ii), 0.3 (iii), 0.45 (iv), 0.6 (v), and 0.75 (vi), respectively. Each solution contains 5 μM of $Au_{11}$ fragments in dichloromethane and excited at 283 nm.
Figure 23:
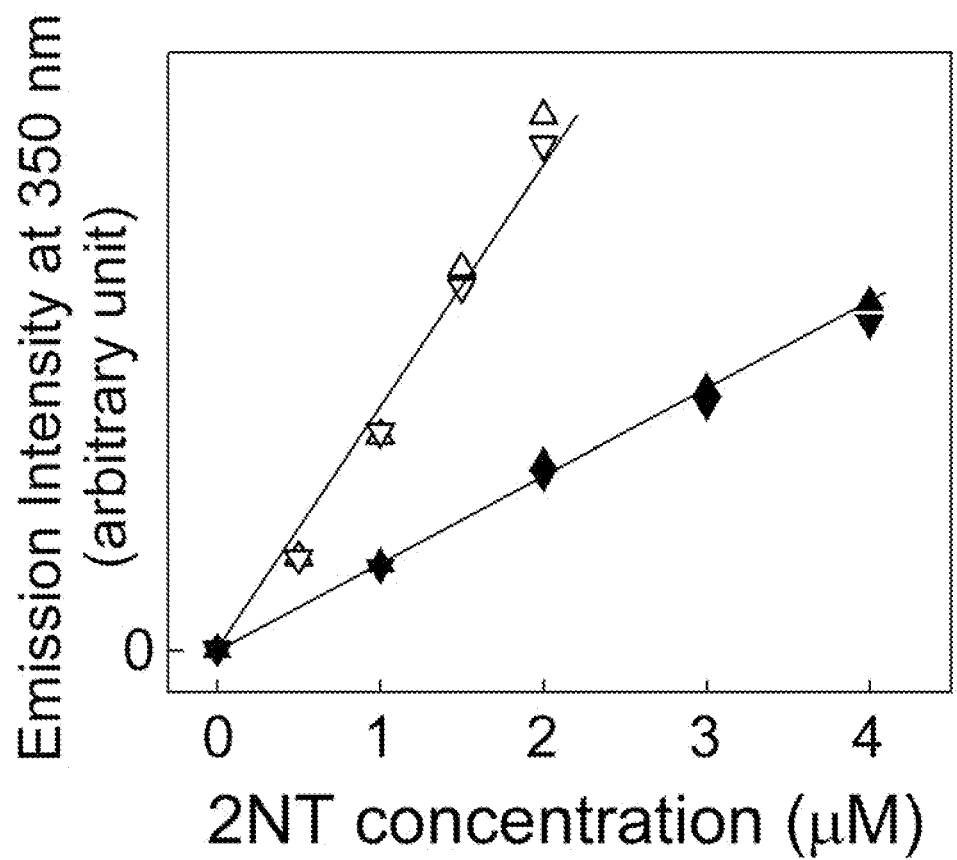
FIG. 23 shows the fluorescence emission intensity of 2NT on postsynthetically 2a- and 2c-bound 4-nm gold colloids (▲: 1.25-monolayer equivalent 2a-bound colloids, ▼: 2-monolayer equivalent 2a-bound colloids, Δ: 1.25-monolayer equivalent 2a-bound colloids, ∇: 2-monolayer equivalent 2a-bound colloids). 2a- and 2c-bound colloids are relevant to 1a-red and 1c-red.
Figure 24:
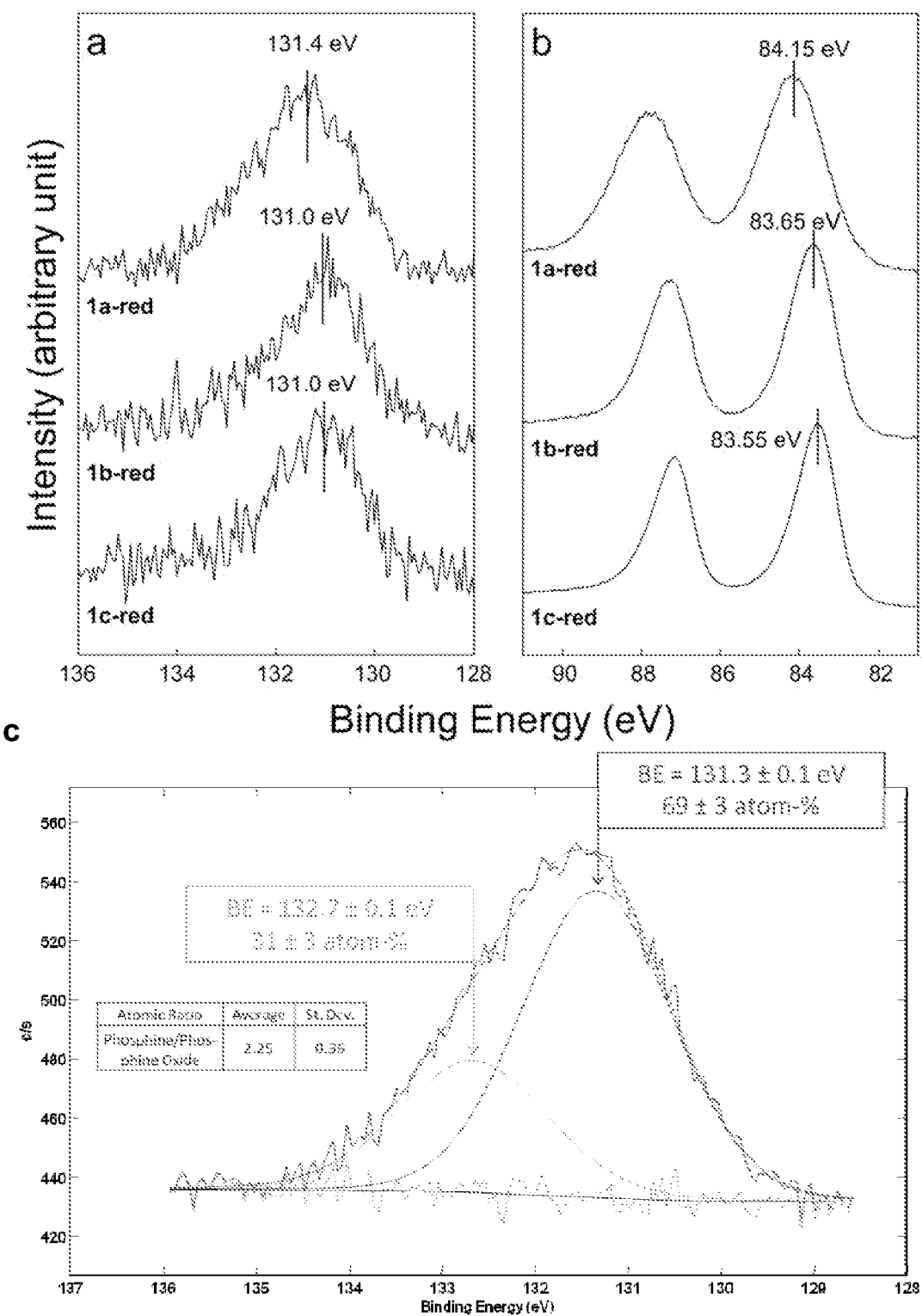
FIG. 24 shows (a) P 2p and (b) Au 4f XPS results of 1a-red, 1b-red, and 1c-red. Deconvolution of 1a-red results in (a) is shown in (c). Binding energy is corrected by C 1s at 284.8 eV.
Figure 25:
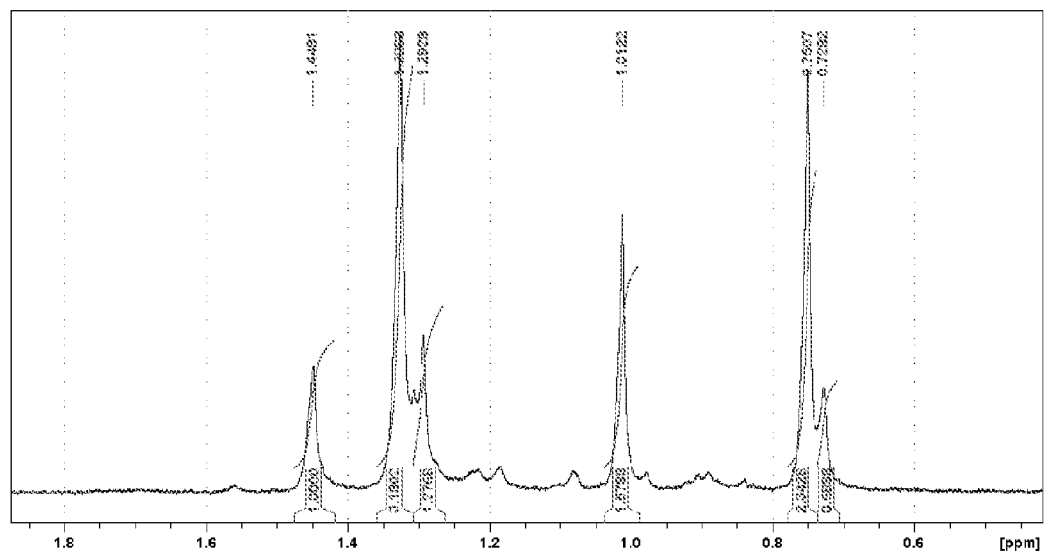
FIG. 25 shows (a) $^1$H NMR of aliphatic region of calixarene at −57° C. (CDCl$_3$, DRX-500 MHz) with (b) assignment of conformers.
Figure 25:
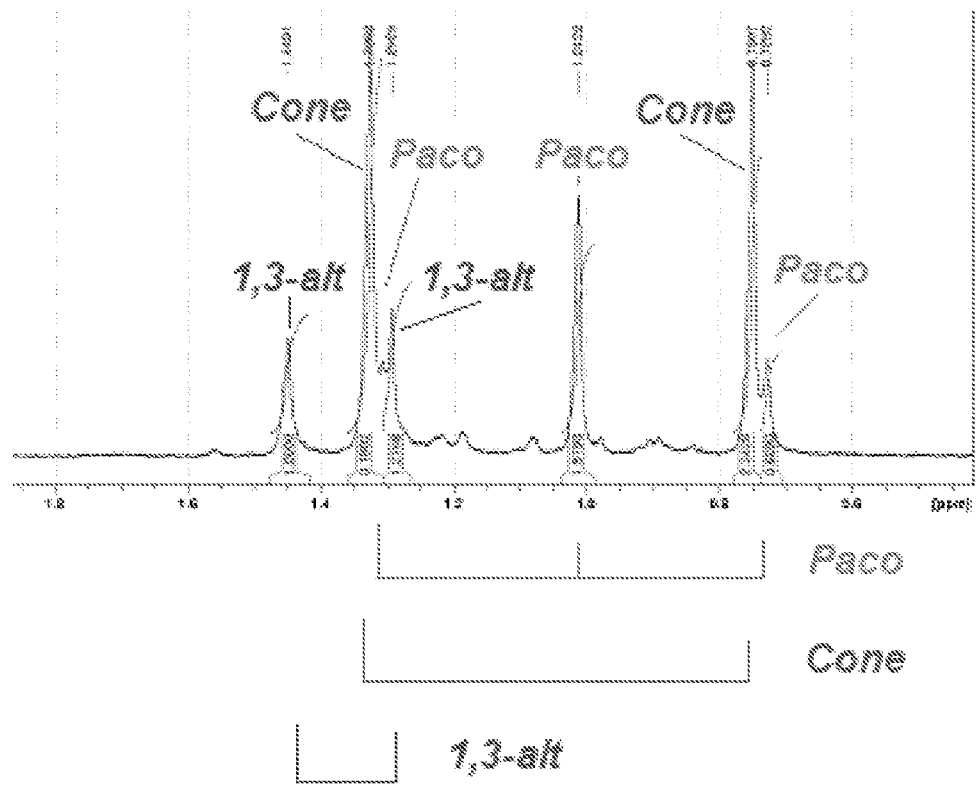
Figure 26:
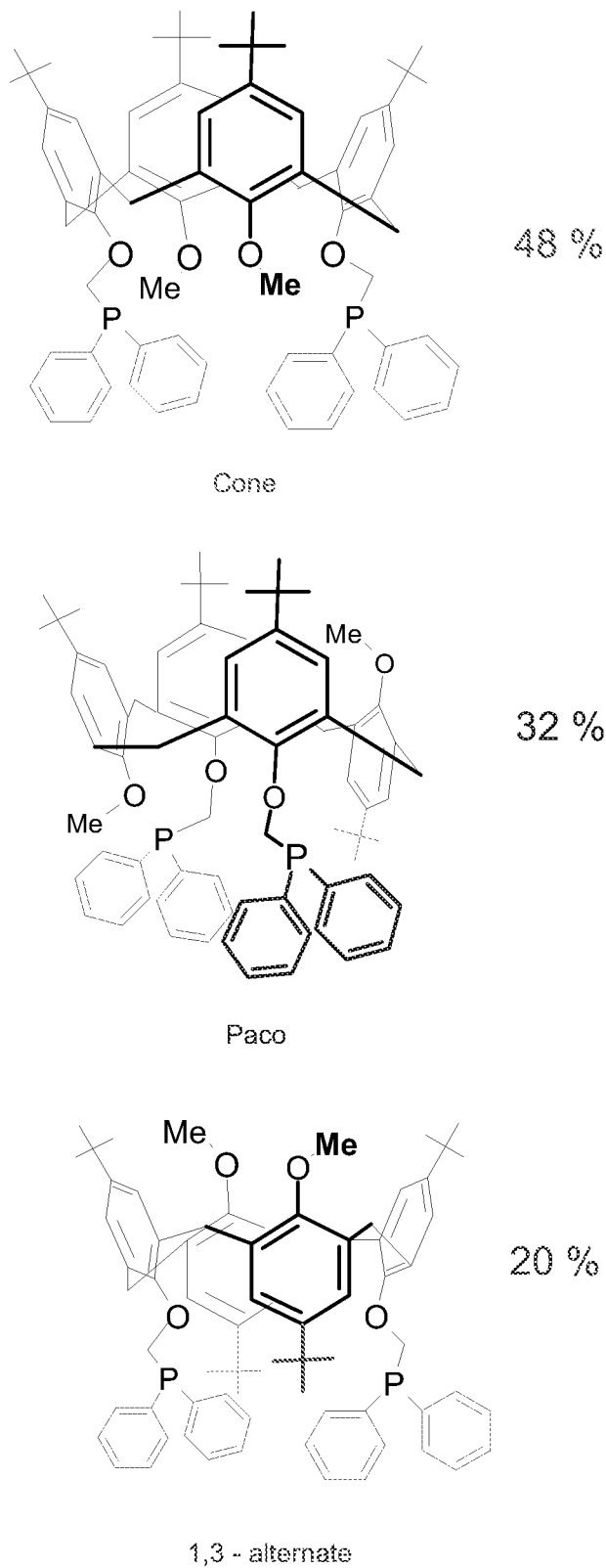
FIG. 26 is a calculated distribution of conformers.
Figure 27:
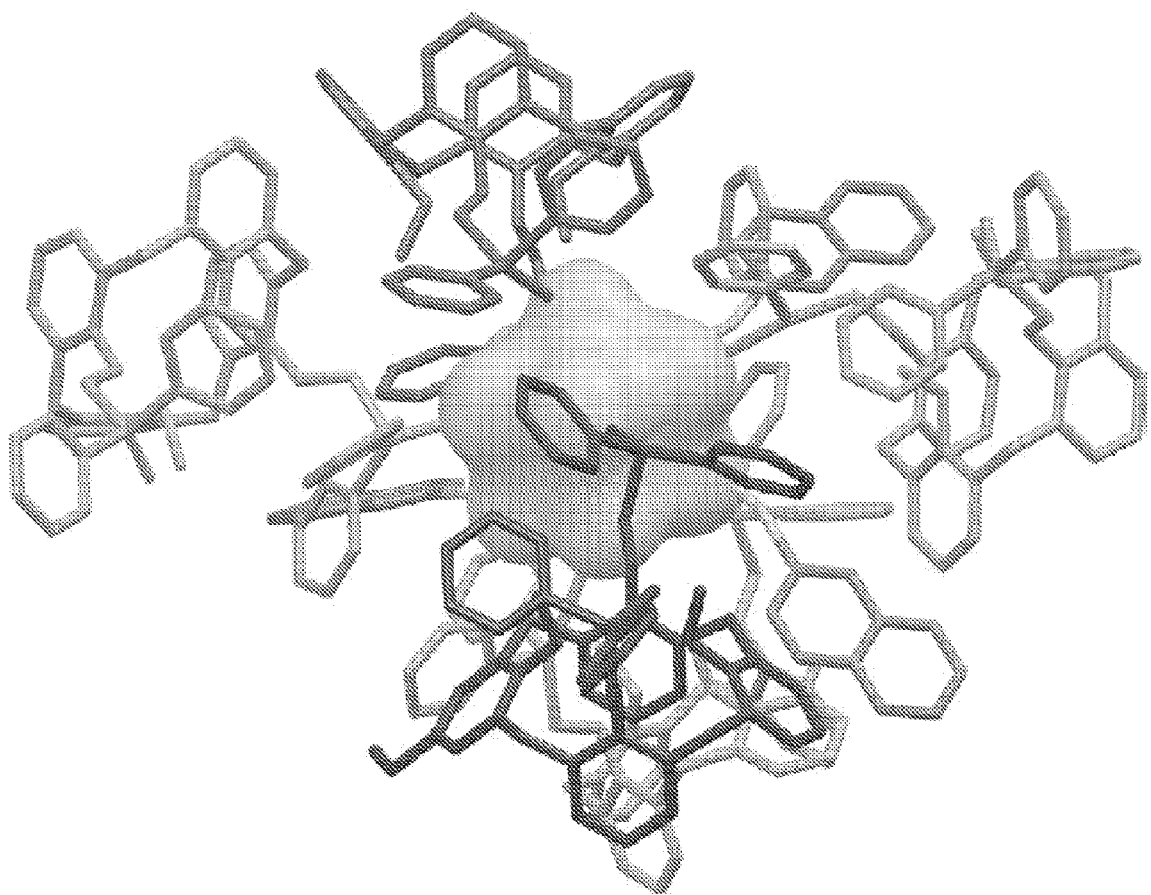
FIG. 27 is a schematic illustration of 1a-red that is consistent with XPS and elemental analysis (ICP) results and the size observed via HAADF-STEM. It consists of a $Au_{11}$ metal colloidal core to which are bound five calixarene phosphine ligands. Two of these calixarene phosphines are bound in a bidentate fashion to the gold surface, and the remaining three are bound in a monodentate fashion such that the unbound P is in the oxidation state +5 as phosphine oxide. Calixeranes were manually placed on the gold surface in such a fashion as to minimize VDW conflicts. Then the system was subject to minimization with the OPLS forcefield in Maestro 9.5, Macromodel 9.7 (2009 Schrodinger, LLC) with bonds to the Au atoms constrained. For clarity, tert-butyl groups and hydrogens were included in the calculation but are undisplayed.

The data above provide proof of enhanced amount of accessible surface available in small gold colloids that are surface-modified with calixarene ligands as shown in FIG. 4. This enhanced accessibility likely stems from a packing problem when colloid core size is smaller than the size of a calixarene ligand. Few accessible spaces are created on larger particles presumably due to close packing of calix[4]arene ligands on the surface in either mono- or bidentate fashion. However, on a smaller colloid, a packing problem results, which creates accessibility because of the impossibility of binding a non-integer numbers of ligands on one hand and having gaps commensurate in size to a small molecule that is slightly smaller than a tert-butylcalix[4]arene. The quantity of gold atoms within these accessible gaps is a significant fraction of the total surface in a small colloid such as 1a-red. FIG. 4c represents the sharp variation of fraction of surface gold atoms bound to 2NT probe as colloidal gold size changes. This data clearly demonstrates the sharp increase in the fraction of surface that is accessible for small gold colloid sizes. An illustration of the mechanism governing this sharp increase is shown schematically in FIG.

TABLE 3

Summary of Characterization Data for Gold Colloids

| Gold Colloid | Diameter (nm)[a] | Au/P[b] | Au (Wt %)[b] | Percent of Au Atoms Bound with 2NT[d] (Percent of Au Surface Atoms Bound with 2NT)[e] |
|---|---|---|---|---|
| 1a-red | 0.9 ± 0.1 | 1.11 ± 0.11 | 21[c] | 25.0 (25.0) |
| 1b-red | 1.1 ± 0.2 | 1.78 ± 0.09 | 38 | 6.3 (8.0) |
| 1c-red | 1.9 ± 0.5 | 3.25 ± 0.15 | 40 | 1.2 (2.1) |
| (4 nm-1a)-red | 4.1 ± 0.9 | N/D | N/D | 0.0 (0.0) |
| (4 nm-1c)-red | 4.1 ± 0.9 | N/D | N/D | 0.0 (0.0) |
| (4 nm-3)-red | 4.1 ± 0.9 | N/D | N/D | 1.4 (4.8)[f] |

[a]Based on HAADF-STEM.
[b]Based on XPS.
[c]Verified using ICP analysis.
[d]Based on steady-state fluorescence measurement assuming a stoichiometry of one Au atom bound per chemisorbed 2NT.
[e]Value represents lower bound on the percent of surface accessible assuming a 2NT footprint of 24.4 Å$^2$. See discussion in reference.
[f]Data taken from Ha et al., Langmuir, 2009, 25: 10548-10553.

Table 3 summarizes the percentage of bound gold atoms after 2NT chemisorption in 1a-red, 1b-red, and 1c-red and demonstrates varying degrees of accessibility in the three gold colloids. Data in FIG. 3 demonstrate that the percentage of total gold atoms that are coordinated to 2NT in 1a-red is 25.0%. his is eighteen-fold higher than previously observed for 4 nm gold colloids modified with a larger calix[6]arene phosphine ligand, which corresponded to at least 13% of the gold surface being accessible in the calix[6]arene-bound 4 nm gold colloids based on 2NT footprint area. The most appropriate basis to use in interpreting accessibility in gold

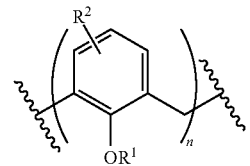

wherein n is an integer selected from 3, 4, 5, 6, 7, 8, 9, 10, 11, 12, 13, 14, 15 and 16;

$R^1$ is a moiety selected from substituted or unsubstituted alkyl, substituted or unsubstituted heteroalkyl, substituted or unsubstituted aryl, substituted or unsubstituted heteroaryl, and a linker; and at least one $R^1$ is the linker; and $R^2$ is a moiety selected from hydrogen, substituted or unsubstituted alkyl, substituted or unsubstituted aryl, substituted or unsubstituted heteroaryl, alcohol, sulfonic acid, phosphine, carbene, phosphonate, phosphonic acid, phosphine oxide, thiol, sulfoxide, ketone, aldehyde, ester, ether, amine, quaternary ammonium, phosphonium, imine, amide, imide, imido, nitro, carboxylic acid, disulfide, carbonate, isocyanate, carbodiimide, carboalkoxy, carbamate, acetal, ketal, boronate, cyanohydrin, hydrazone, oxime, oxazole, oxazoline, oxalane, hydrazide, enamine, sulfone, sulfide, sulfenyl, halogen and a combination thereof.

4a-b. In summary, 1a-red is a unique gold colloid that combines features that have been previously deemed to be incompatible for a colloid in solution: small size, robustness of a calixarene-bound colloid, and an extraordinarily high degree of metal surface accessibility. As such it is expected to find broad applicability in a variety of areas such as those mentioned above.

The articles "a," "an" and "the" as used herein do not exclude a plural number of the referent, unless context clearly dictates otherwise. The conjunction "or" is not mutually exclusive, unless context clearly dictates otherwise. The term "include" is used to refer to non-exhaustive examples.

All references, publications, patent applications, issued patents, accession records and databases cited herein, including in any appendices, are incorporated by reference in their entirety for all purposes.

We claim:

1. A complex comprising:
   (a) a metal colloid comprising three or more metal atoms; and
   (b) two or more ligands, each ligand comprising a linker, wherein the linker comprises a coordinating atom coordinated to one of the metal atoms
   wherein at least two of the ligands are larger than the metal colloid.

2. The complex of claim 1 wherein the metal colloid is accessible to a probe molecule smaller than the ligand.

3. The complex of claim 1 wherein at least about a percentage selected from 5%, 6%, 7%, 8%, 9%, 10%; 11%, 12%, 13%, 14%, 15%, 16%, 17%, 18%, 19%, 20%, 21%, 22%, 23%, 24%, 25%, 26%, 27%; 28%, 29%, 30%, 31%, 32%, 33%, 34%, 35%, 36%, 37%, 38%, 39% and 40% of the surface metal atoms are accessible to a probe molecule smaller than the ligand.

4. The complex of claim 1 wherein at least about a percentage selected from 5%, 6%, 7%, 8%, 9%, 10%, 11%, 12%, 13%, 14%, 15%, 16%, 17%, 18%, 19%, 20%, 21%, 23%, 24%, 25%, 26%, 27%; 28%, 29%, 30%, 31%, 32%, 33%, 34%, 35%, 36%, 37%, 38%, 39% and 40% of the surface area of the metal colloid is accessible to a probe molecule smaller than the ligand.

5. The complex of claim 2 wherein the probe molecule is 2-naphthalenethiol.

6. The complex of claim 1 wherein the metal colloid has a diameter that is about a length selected from 0.5 nm, 0.6 nm, 0.7 nm, 0.8 nm, 0.9 nm, 1.0 nm, 1.1 nm, 1.2 nm, 1.3 nm, 1.4 nm, 1.5 nm, 1.6 nm, 1.7 nm, 1.8 nm, 1.9 nm, 2.0 nm, 2.1 nm, 2.2 nm, 2.3 nm, 2.4 nm and 2.5 nm.

7. The complex of claim 1 wherein the metal colloid comprises 3, 4, 5, 6, 7, 8, 9, 10, 11, 12, 13, 14, 15, 16, 17, 18, 19 or 20 metal atoms.

8. The complex of claim 1 wherein the metal atoms are noble metal atoms.

9. The complex of claim 1 wherein the metal atoms are each Au.

10. The complex of claim 1 wherein at least one of the ligands is a calixarene-related compound.

11. The complex of claim 1 wherein at least one of the ligands is a calixarene-related compound having the formula:

12. The complex of claim 11 wherein $R^2$ is substituted or unsubstituted alkyl.

13. The complex of claim 11 wherein $R^2$ is selected from $C_1$, $C_2$, $C_3$, $C_4$, $C_5$ and $C_6$ alkyl.

14. The complex of claim 11 wherein $R^2$ is tert-butyl.

15. The complex of claim 11 wherein $R^2$ is in the para position relative to $-OR^1$.

16. The complex of claim 11 wherein $R^1$ is substituted or unsubstituted alkyl.

17. The complex of claim 11 wherein $R^1$ is selected from $C_1$, $C_2$, $C_3$, $C_4$, $C_5$ or $C_6$ alkyl.

18. The complex of claim 11 wherein $R^1$ is methyl.

19. The complex of claim 1 wherein the linker is a moiety selected from phosphine, substituted or unsubstituted alkyl, substituted or unsubstituted heteroalkyl, substituted or unsubstituted aryl and substituted or unsubstituted heteroaryl.

20. The complex of claim 1 wherein the linker is a moiety selected from alkyl and heteroalkyl, which is optionally substituted with one or more alkyl group substituents in addition to the coordinating atom.

21. The complex of claim 1 wherein the linker is substituted with a moiety selected from alcohol, sulfonic acid, phosphine, phenyl, imidazolium, carbene, phosphonate, phosphonic acid, phosphine oxide, thiol, sulfoxide, ketone, aldehyde, ester, ether, amine, quaternary ammonium, phosphonium, imine, amide, imide, imido, nitro, carboxylic acid, disulfide, carbonate, isocyanate, carbodiimide, carboalkoxy, carbamate, acetal, ketal, boronate, cyanohydrin, hydrazone, oxime, oxazole, oxazoline, oxalane, hydrazide, enamine, sulfone, sulfide, sulfenyl, halogen and a combination thereof.

22. The complex of claim 1 wherein the linker is a phosphine.

23. The complex of claim 21 wherein the phosphine is $-Y^1P(Y^2)(Y^3)$,
    wherein $Y^1$ is selected from a bond, substituted or unsubstituted alkyl, substituted or unsubstituted heteroalkyl, substituted or unsubstituted aryl and substituted or unsubstituted heteroaryl; and $Y^2$ and $Y^3$ are independently selected from substituted or unsubstituted alkyl, substituted or unsubstituted heteroalkyl, substituted or unsubstituted aryl and substituted or unsubstituted heteroaryl.

24. The complex of claim 23 wherein $Y^2$ and $Y^3$ are each substituted or unsubstituted aryl.

25. The complex of claim 23 wherein $Y^2$ and $Y^3$ are each phenyl.

26. The complex of claim 23 wherein $Y^1$ is substituted or unsubstituted alkyl.

27. The complex of claim 23 wherein $Y^1$ is $C_1$, $C_2$, $C_3$, $C_4$, $C_5$ or $C_6$ alkyl.

28. The complex of claim 23 wherein $Y^1$ is methyl.

29. The complex of claim 23 wherein $Y^1$ is a bond.

30. The complex of claim 1 wherein the linker is a carbene.

31. The complex of claim 30 wherein the carbene is an alkyl substituted by an imidazolium moiety.

32. The complex of claim 30 wherein the carbene is methyl substituted by an imidazolium moiety.

33. The complex of claim 1 wherein the coordinating atom is selected from phosphorus, carbon, nitrogen and oxygen.

34. The complex of claim 1 wherein n is 4.

35. The complex of claim 1 wherein at least one of the ligands comprises two linkers.

36. The complex of claim 1 wherein 2, 3, 4, 5, 6 or 7 of the ligands are coordinated to the metal colloid.

37. The complex of claim 1 wherein the metal colloid is coordinatively saturated with respect to the two or more ligands.

38. The complex claim 1 wherein a plurality of the metal colloid is coordinated to the two or more ligands.

39. The complex of claim 1 immobilized on a substrate.

40. The complex of claim 39 wherein the ligand or the metal colloid is directly bound to the substrate.

41. A metal colloid formed by a process comprising performing a reaction on the complex of claim 1 wherein the reaction is selected from pyrolysis, thermal decomposition, oxidative decomposition and a combination thereof.

42. A method of synthesizing the complex of claim 1, the method comprising (a) contacting, in a solvent, a ligand with a metal salt under conditions appropriate to cause reaction between the ligand and the metal salt, wherein the ligand comprises a linker comprising a coordinating atom, thereby forming a metal-ligand precursor; and (b) contacting the metal-ligand precursor with a reductant, wherein the metal-ligand precursor, the reductant or both are sparingly soluble in the solvent, thereby synthesizing the complex.

43. The method of claim 42 wherein the metal salt is a metal halide salt.

44. The method of claim 42 wherein the metal salt comprises a noble metal atom.

45. The method of claim 42 wherein the solvent is an alcohol.

46. The method of claim 42 wherein the solvent is ethanol.

47. The method of claim 42 wherein the ligand is one of the ligands of the complex of claim 1.

48. The method of claim 42 wherein the ligand is a calixarene-related compound.

49. The method of claim 48 wherein the calixarene-related compound is selected from a calixarene phosphine, a calixarene phosphinite, a calixarene phosphonite, a calixarene phosphite and a calixarene phosphoramidite.

50. The method of claim 48 wherein the calixarene-related compound is a calixarene carbene.

51. The method of claim 48 wherein the calixarene-related compound is selected from a calixarene pyridine, a calixarene bipyridine, a calixarene terpyridine, a calixarene pyrazole, a calixarene phenanthroline, a calixarene isonitrile, a calixarene amide, a calixarene amine, a calixarene amine oxide, a calixarene nitroso, a calixarene nitro and a calixarene carbamate.

52. The method of claim 48 wherein the calixarene-related compound is selected from a calixarene carboxylate, a calixarene alkoxide, a calixarene peroxo, a calixarene phenoxide, a calixarene ester, a calixarene ether, a calixarene acetylacetonate and a calixarene carbonate.

53. A catalytic process comprising reducing an organic molecule by contacting the organic molecule with (a) the complex of claim 1 or the metal colloid of claim 41 and (b) a reductant.

54. A catalytic process comprising oxidizing an organic molecule by contacting the organic molecule with (a) the complex of claim 1 or the metal colloid of claim 41 and (b) an oxidant.

55. The complex of claim 1 wherein the two or more ligands are calixarene-related compounds.

* * * * *